United States Patent
Jia et al.

(10) Patent No.: US 12,513,676 B2
(45) Date of Patent: Dec. 30, 2025

(54) COMMUNICATIONS METHOD AND APPARATUS FOR IMPROVED CONFIGURATION OF A BANDWIDTH PART

(71) Applicant: Huawei Technologies Co., Ltd., Shenzhen (CN)

(72) Inventors: Qiong Jia, Shanghai (CN); Jiayin Zhang, Shanghai (CN); Weiwei Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 18/300,874

(22) Filed: Apr. 14, 2023

(65) Prior Publication Data

US 2023/0254836 A1 Aug. 10, 2023

Related U.S. Application Data

(63) Continuation of application No. PCT/CN2020/121696, filed on Oct. 16, 2020.

(51) Int. Cl.
*H04W 72/0457* (2023.01)
*H04L 5/00* (2006.01)
*H04W 72/0453* (2023.01)

(52) U.S. Cl.
CPC ....... *H04W 72/0457* (2023.01); *H04L 5/0044* (2013.01); *H04L 5/0094* (2013.01); *H04W 72/0453* (2013.01)

(58) Field of Classification Search
CPC .......... H04W 72/0457; H04W 72/0453; H04L 5/0044; H04L 5/0094; H04L 5/001
See application file for complete search history.

(56) References Cited

U.S. PATENT DOCUMENTS

| | | | |
|---|---|---|---|
| 2019/0069198 A1 | 2/2019 | Gheorghiu et al. | |
| 2019/0159182 A1 | 5/2019 | Ranta-aho et al. | |
| 2019/0373667 A1* | 12/2019 | Jeon | H04L 49/25 |
| 2020/0154377 A1* | 5/2020 | Qian | H04L 5/0048 |
| 2020/0163113 A1* | 5/2020 | Zhu | H04L 5/0053 |
| 2020/0235877 A1* | 7/2020 | Manolakos | H04W 64/00 |
| 2020/0267730 A1* | 8/2020 | Kim | H04W 72/0453 |

FOREIGN PATENT DOCUMENTS

| | | |
|---|---|---|
| CN | 109819520 A | 5/2019 |
| CN | 111034068 A | 4/2020 |
| CN | 111385901 A | 7/2020 |
| WO | 2020204438 A1 | 10/2020 |

OTHER PUBLICATIONS

ZTE, et al., "Introducing per BWP SSB configuration", 3GPP TSG-RAN WG2 Meeting #101bis, R2-184374, Apr. 16-20, 2018, 6 Pages, Sanya, China.

* cited by examiner

*Primary Examiner* — Brandon J Miller
(74) *Attorney, Agent, or Firm* — SLATER MATSIL, LLP

(57) ABSTRACT

A communications method and apparatus. The method includes: determining configuration information of a bandwidth part (BWP), and sending the configuration information of the BWP. The BWP includes at least one resource block, the at least one resource block is located on at least one carrier, location information of different carriers in a system is determined based on a reference frequency domain location, and the configuration information of the BWP indicates a location of the at least one resource block based on the reference frequency domain location.

18 Claims, 18 Drawing Sheets

| 1st bit | 2nd bit | 3rd bit | 4th bit | 5th bit |
|---------|---------|---------|---------|---------|
| 6th bit | 7th bit | 8th bit | 9th bit | 10th bit |
| 11th bit | 12th bit | 13th bit | 14th bit | 15th bit |
| 16th bit | 17th bit | 18th bit | 18th bit | 19th bit |

↑ Corresponding to an RB 15

(a)

| 0 | 0 | 0 | 0 | 0 |
|---|---|---|---|---|
| 1 | 1 | 1 | 1 | 1 |
| 1 | 1 | 1 | 1 | 1 |
| 1 | 1 | 1 | 1 | 1 |

(b)

| 0 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |

| $1^{st}$ bit | $2^{nd}$ bit | $3^{rd}$ bit | $4^{th}$ bit |
|---|---|---|---|
| $5^{th}$ bit | $6^{th}$ bit | $7^{th}$ bit | $8^{th}$ bit |
| $9^{th}$ bit | $10^{th}$ bit | $11^{th}$ bit | |

Corresponding to an RB 16 and an RB 17

(a)

| 0 | 0 | 0 | 0 |
|---|---|---|---|
| 1 | 1 | 1 | 1 |
| 1 | 1 | 1 | 1 |
| 1 | 1 | 1 | |

(b)

| 0 | 1 | 1 | 1 |
|---|---|---|---|
| 1 | 1 | 1 | 1 |
| 1 | 1 | 1 | 1 |
| 1 | 1 | 0 | |

| 1st bit | 2nd bit | 3rd bit | 4th bit | 5th bit |
|---|---|---|---|---|
| 6th bit | 7th bit | 8th bit | 9th bit | 10th bit |
| 11th bit | 12th bit | 13th bit | 14th bit | 15th bit |
| 16th bit | | | | |

↖ Corresponding to a BWP-RB 15

(b)

| 0 | 0 | 0 | 0 | 0 |
|---|---|---|---|---|
| 0 | 1 | 1 | 1 | 1 |
| 0 | 0 | 0 | 0 | 0 |
| 0 | | | | |

FIG. 4D (a)

| 1st bit | 2nd bit | 3rd bit | 4th bit |
|---|---|---|---|
| 5th bit | 6th bit | 7th bit | 8th bit |

↖ Corresponding to a BWP-RB 8 and a BWP-RB 9

(b)

| 0 | 0 | 1 | 1 |
|---|---|---|---|
| 0 | 0 | 0 | 0 |

FIG. 4E

| 1st bit | 2nd bit | 3rd bit | 4th bit | 5th bit |
|---|---|---|---|---|
| 6th bit | 7th bit | 8th bit | 9th bit | 10th bit |
| 11th bit | 12th bit | 13th bit | 14th bit | 15th bit |
| 16th bit | 17th bit | 18th bit | 19th bit | 20th bit |
| 21st bit | 22nd bit | | | |

Corresponding to an RB 20

(a)

| 0 | 0 | 0 | 0 | 0 |
|---|---|---|---|---|
| 0 | 1 | 1 | 1 | 1 |
| 0 | 0 | 0 | 0 | 0 |
| 0 | 0 | 0 | 0 | 0 |
| 0 | 0 | | | |

| 1st bit | 2nd bit | 3rd bit | 4th bit |
|---|---|---|---|
| 5th bit | 6th bit | 7th bit | 8th bit |
| 9th bit | 10th bit | 11th bit | |

Corresponding to an RB 16 and an RB 17

(a)

| 0 | 0 | 0 | 0 |
|---|---|---|---|
| 0 | 0 | 1 | 1 |
| 0 | 0 | 0 | |

COMMUNICATIONS METHOD AND APPARATUS FOR IMPROVED CONFIGURATION OF A BANDWIDTH PART

CROSS-REFERENCE TO RELATED APPLICATIONS

This application is a continuation of International Application No. PCT/CN2020/121696, filed on Oct. 16, 2020, the disclosure of which is hereby incorporated by reference in its entirety.

TECHNICAL FIELD

This application relates to the field of wireless communications technologies, and in particular, to a communications method and apparatus.

BACKGROUND

A concept of a bandwidth part (BWP) is introduced to a 5th generation (5G) new radio (NR) system completed in the 3rd Generation Partnership Project (3GPP).

In the conventional technology, a transmission resource is divided based on a common resource block. Then, a configured bandwidth of a carrier is defined based on the common resource block, and a BWP is further configured on a configured bandwidth of each carrier. In this way, one BWP is a segment of contiguous frequency resources on one cell carrier. A network side device may configure BWP-related information for a terminal side device by using higher layer signaling, and the BWP-related information includes a BWP identifier, configuration information corresponding to the BWP identifier, and the like. After a BWP is configured and activated, the BWP is referred to as an active BWP. Data and control information that are sent by the terminal side device on an uplink or data and control information that are received by the terminal side device on a downlink are limited to the active BWP.

In the BWP configuration manner in the conventional technology, resource scheduling is limited to the BWP on the configured bandwidth of the carrier. Therefore, in a high-bandwidth or high-frequency scenario, the BWP configuration manner in the conventional technology causes a waste of resource scheduling and relatively large signaling overheads.

SUMMARY

This application provides a communications method and apparatus, to improve BWP configuration and resource scheduling flexibility and reduce signaling overheads in a high-bandwidth or high-frequency scenario.

According to a first aspect, this application provides a communications method, including: determining configuration information of a BWP; and sending the configuration information of the BWP. The BWP includes at least one resource block, the at least one resource block is located on at least one carrier, location information of different carriers in a system is determined based on a reference frequency domain location, and the configuration information of the BWP is used to indicate a location of the at least one resource block based on the reference frequency domain location.

The method may be performed by a first communications apparatus, and the first communications apparatus is a transmitting end apparatus. For example, the first communications apparatus may be a network device. The first communications apparatus may be a communications device, or a communications apparatus, for example, a chip, that can support the communications device in implementing a function required in the method. For example, when the communications method is applied to an NR system, the first communications apparatus may be an access network device, a chip that is disposed in the access network device and that is configured to implement a function of the access network device, or another component configured to implement the function of the access network device.

In this embodiment of this application, an ultra-high bandwidth may be implemented by aggregating a plurality of radio frequency carriers. Resource division is performed on the aggregated carriers based on a same reference frequency domain location, and then the BWP is configured by using the reference frequency domain location as a reference point. In different BWP configuration manners, there is no need to first determine a configured bandwidth of the carrier and then configure the BWP on the configured bandwidth of the carrier, but the configuration information of the BWP may be directly determined based on the reference frequency domain location. This improves BWP configuration flexibility, and reduces BWP configuration complexity and possible signaling overheads during resource scheduling. Further, when the network device performs resource scheduling, because the BWP covers all or some resources on one or more carriers, the network device may perform flexible resource scheduling on the entire BWP, and does not need to perform scheduling for each carrier. This can reduce scheduling complexity, and reduce signaling overheads.

In a possible implementation, the at least one resource block is contiguous, and the configuration information of the BWP includes an offset of a start resource block on the BWP relative to the reference frequency domain location and a quantity of the at least one resource block.

According to the foregoing method, considering that the resource blocks on the BWP are contiguous resource blocks, all the resource blocks included in the complete BWP are indicated by indicating the offset of the start resource block on the BWP relative to the reference frequency domain location and the quantity of the at least one resource block. BWP configuration is no longer limited to the carrier, and therefore BWP configuration is no longer related to carrier configuration. This can implement flexible BWP configuration.

In a possible implementation, the BWP includes N resource block sets, resource blocks in each of the N resource block sets are contiguous, and the configuration information of the BWP includes an offset of a start resource block in each of the N resource block sets relative to the reference frequency domain location and a quantity of resource blocks in each of the N resource block sets, where N is a positive integer.

According to the foregoing method, considering that the resource blocks on the BWP are non-contiguous resource blocks, the resource blocks on the BWP can be classified into the N resource block sets. The resource blocks in each of the N resource block sets are contiguous, and the N resource block sets may be contiguous or non-contiguous. In this way, the non-contiguous resources on the BWP can be indicated. The configuration information of the BWP indicates a resource block set, which is not limited to a manner in which the configuration information of the BWP indicates contiguous resource blocks on the carrier. This improves flexibility of the configuration information of the BWP.

In a possible implementation, the configuration information of the BWP is a bitmap, where a start bit in the bitmap indicates a resource block corresponding to the reference frequency domain location, each bit in the bitmap corresponds to one of the at least one resource block, and the bit is used to indicate whether the corresponding resource block belongs to the BWP.

A location of each resource block on the BWP relative to the reference frequency domain location is indicated by using the bitmap. A terminal device may determine indexes of all resource blocks included in the BWP relative to the reference frequency domain locations, to determine the location of each resource block on the BWP. The location of the resource block on the BWP relative to the reference frequency domain location can be indicated, which is not limited to a manner in which the configuration information of the BWP indicates contiguous resource blocks on the carrier. This improves flexibility of the configuration information of the BWP.

In a possible implementation, the configuration information of the BWP is a bitmap, where the BWP includes M resource block subsets, each resource block subset includes a plurality of resource blocks, a start bit in the bitmap indicates a resource block subset corresponding to the reference frequency domain location, one bit in the bitmap corresponds to one of the M resource block subsets, and the bit is used to indicate whether the corresponding resource block subset belongs to the BWP, where M is a positive integer.

A location of each resource block subset on the BWP relative to the reference frequency domain location is indicated by using the bitmap. This can improve BWP configuration flexibility, and reduce bitmap overheads.

In a possible implementation, the configuration information of the BWP further includes an offset of a start resource block on the at least one carrier relative to the reference frequency domain location.

According to the foregoing method, a plurality of carriers used for carrier aggregation can correspond to a same reference frequency domain location, so that resource rasters of the plurality of carriers used for carrier aggregation are the same. This helps subsequent uniform BWP configuration. In addition, the configuration information of the BWP is used to indicate offsets of start resource blocks on different carriers relative to the reference frequency domain location, and there is no need to indicate a corresponding offset relative to the reference frequency domain location for each carrier. This reduces signaling overheads.

In a possible implementation, the method further includes: sending carrier configuration information, where the carrier configuration information includes an offset of a start resource block on the at least one carrier relative to the reference frequency domain location.

According to the foregoing method, a plurality of carriers used for carrier aggregation can correspond to a same reference frequency domain location, so that resource rasters of the plurality of carriers used for carrier aggregation are the same. This helps subsequent uniform BWP configuration. In addition, the carrier configuration information can be indicated based on a requirement, and the offset of the start resource block on the at least one carrier relative to the reference frequency domain location does not need to be carried in the configuration information of the BWP. This improves indication flexibility.

According to a second aspect, this application provides a communications method, including: determining configuration information of a guard band; and sending the configuration information of the guard band. The guard band is located on a bandwidth part BWP, the BWP includes at least one resource block, the at least one resource block is located on at least one carrier, and location information of different carriers in a system is determined based on a reference frequency domain location. The configuration information of the guard band is used to indicate a location of the guard band on the BWP.

The method may be performed by a first communications apparatus, and the first communications apparatus is a transmitting end apparatus. For example, the first communications apparatus may be a network device. The first communications apparatus may be a communications device, or a communications apparatus, for example, a chip, that can support the communications device in implementing a function required in the method. For example, when the communications method is applied to an NR system, the first communications apparatus may be an access network device, a chip that is disposed in the access network device and that is configured to implement a function of the access network device, or another component configured to implement the function of the access network device.

In this embodiment of this application, an ultra-high bandwidth may be implemented by aggregating a plurality of radio frequency carriers. Resource division is performed on the aggregated carriers based on a same reference frequency domain location, and then the BWP is configured by using the reference frequency domain location as a reference point. This improves BWP configuration flexibility, and reduces BWP configuration complexity and possible signaling overheads during resource scheduling. Further, when the network device performs resource scheduling, because the BWP covers all or some resources on one or more carriers, the network device may perform flexible resource scheduling on the entire BWP, and does not need to perform scheduling for each carrier. This can reduce scheduling complexity, and reduce signaling overheads. Therefore, in some scenarios, when a signal is sent only on resource blocks on some carriers on the BWP, to avoid interference to another system deployed on a neighboring carrier, the guard band may be set on the BWP by using the foregoing method. A terminal device may determine, by using the configuration information of the guard band, an available resource block on the BWP that is configured by the network device for the terminal device. This ensures performance of the BWP.

In a possible implementation, the configuration information of the guard band is used to indicate a location of the guard band relative to a start resource block on the BWP.

According to the foregoing method, the configuration information of the guard band may be configured based on the start resource block on the BWP. Therefore, a location of a resource block on the guard band relative to the start resource block on the BWP may be used as the configuration information of the guard band, to indicate the location of the guard band. This reduces complexity of configuring guard bands on different BWPs.

In a possible implementation, resource blocks included in the guard band are contiguous, and the configuration information of the guard band includes an offset of a start resource block on the guard band relative to the start resource block on the BWP and a quantity of resource blocks included in the guard band.

Considering that the resource blocks included in the guard band on the BWP are contiguous, to reduce signaling overheads, the location of the guard band on the BWP may be determined by using the offset of the start resource block on the guard band relative to the start resource block on the BWP and the quantity of resource blocks included in the guard band.

In a possible implementation, the configuration information of the guard band includes offsets of all resource blocks on the guard band relative to the start resource block on the BWP.

According to the foregoing method, locations of all the resource blocks on the guard band can be directly indicated. Complexity of configuring the guard band by the first communications apparatus can be effectively reduced, especially when the quantity of resource blocks on the guard band is relatively small.

In a possible implementation, the guard band includes A guard band resource block sets, resource blocks in each of the A guard band resource block sets are contiguous, and the configuration information of the guard band includes an offset of a start resource block in each of the A guard band resource block sets relative to the start resource block on the BWP and a quantity of resource blocks in each of the A guard band resource block sets, where A is a positive integer.

According to the foregoing method, considering that the resource blocks on the guard band are non-contiguous resource blocks, the resource blocks on the guard band can be classified into the A guard band resource block sets, so that the non-contiguous resources on the guard band can be indicated. This improves flexibility of the configuration information of the guard band.

In a possible implementation, the configuration information of the guard band is a bitmap, and a start bit in the bitmap indicates the start resource block on the BWP, where one bit in the bitmap corresponds to one of all resource blocks on the guard band, and the bit is used to indicate whether the corresponding resource block belongs to the guard band.

A location of each resource block on the guard band relative to the start resource block on the BWP is indicated by using the bitmap. The terminal device may determine indexes of all resource blocks included in the guard band relative to the start resource block on the BWP, to determine the location of each resource block on the guard band. This improves flexibility of the configuration information of the guard band.

In a possible implementation, the configuration information of the guard band is a bitmap, where the guard band includes B resource block subsets, each resource block subset includes a plurality of resource blocks, each bit in the bitmap corresponds to one of the B resource block subsets, and the bit is used to indicate whether the corresponding resource block subset belongs to the guard band, where B is a positive integer.

A location of each resource block subset on the guard band relative to the start resource block on the BWP is indicated by using the bitmap, so that the location of each resource block subset on the guard band relative to the start resource block on the BWP can be determined. In this way, flexibility of the configuration information of the guard band can be improved, and overheads of the bitmap can be reduced.

In a possible implementation, the configuration information of the guard band is used to indicate a location of the guard band relative to the reference frequency domain location.

According to the foregoing method, the location of the guard band can be indicated based on the reference frequency domain location. This improves flexibility of configuring the guard band.

In a possible implementation, resource blocks included in the guard band are contiguous, and the configuration information of the guard band includes a location of a start resource block on the guard band relative to the reference frequency domain location and a quantity of resource blocks included in the guard band.

Considering that the resource blocks included in the guard band on the BWP are contiguous, to reduce signaling overheads, the location of the guard band on the BWP may be determined by using the offset of the start resource block on the guard band relative to the reference frequency domain location and the quantity of resource blocks included in the guard band.

In a possible implementation, the configuration information of the guard band includes locations of all resource blocks on the guard band relative to the reference frequency domain location.

According to the foregoing method, locations of all the resource blocks on the guard band can be directly indicated. Complexity of configuring the guard band by the first communications apparatus can be effectively reduced, especially when the quantity of resource blocks on the guard band is relatively small.

In a possible implementation, the guard band includes A guard band resource block sets, resource blocks in each of the A guard band resource block sets are contiguous, and the configuration information of the guard band includes an offset of a start resource block in each of the A contiguous guard band resource block sets relative to the reference frequency domain location and a quantity of resource blocks in each of the A guard band resource block sets, where A is a positive integer.

According to the foregoing method, considering that the resource blocks on the guard band are non-contiguous resource blocks, the resource blocks on the guard band can be classified into the A guard band resource block sets, so that the non-contiguous resources on the guard band can be indicated. This improves flexibility of the configuration information of the guard band.

In a possible implementation, the configuration information of the guard band is a bitmap, where a start bit in the bitmap indicates a resource block corresponding to the reference frequency domain location, one bit in the bitmap corresponds to one of all resource blocks on the guard band, and the bit is used to indicate whether the corresponding resource block belongs to the guard band.

A location of each resource block on the guard band relative to the reference frequency domain location is indicated by using the bitmap. The terminal device may determine indexes of all resource blocks included in the guard band relative to the reference frequency domain location, to determine the location of each resource block on the guard band. This improves flexibility of configuring the configuration information of the guard band.

In a possible implementation, the configuration information of the guard band is a bitmap, where the guard band includes B resource block subsets, each resource block subset includes a plurality of resource blocks, a start bit in the bitmap indicates a resource block subset corresponding to the reference frequency domain location, each bit in the bitmap corresponds to one of the B resource block subsets, and the bit is used to indicate whether the corresponding resource block subset belongs to the guard band, where B is a positive integer.

A location of each resource block subset on the guard band relative to the reference frequency domain location is indicated by using the bitmap, so that the terminal device can determine a location of each resource block on the guard band based on indexes of all resource block subsets included in the guard band relative to the reference frequency domain location. This improves flexibility of configuring the configuration information of the guard band.

In a possible implementation, a physical resource block index range on the BWP is determined based on a quantity of resource blocks on the BWP; and a physical resource block index location is determined by using a resource block index location on the BWP and the resource block on the BWP based on the reference frequency domain location.

According to the foregoing method, the physical resource block on the BWP can be configured based on the reference frequency domain location. This reduces complexity of configuring the physical resource block on the BWP.

$$n_{RB}{}^{\mu}=n_{PRB}{}^{\mu}+N_{BWP}{}^{start,\mu}\mu n_{PRB}{}^{\mu}n_{RB}{}^{\mu}$$
$$N_{BWP}{}^{start,\mu}N_{BWP}{}^{size,\mu}-1N_{BWP}{}^{size,\mu}$$

In a possible implementation, the physical resource block index location satisfies:

$$n_{RB}{}^{\mu}=n_{PRB}{}^{\mu}+N_{BWP}{}^{start,\mu}\mu n_{PRB}{}^{\mu}n_{RB}{}^{\mu}$$
$$N_{BWP}{}^{start,\mu}N_{BWP}{}^{size,\mu}-1N_{BWP}{}^{size,\mu},$$

where there is a correspondence between and a subcarrier spacing on the BWP, indicates the physical resource block index location on the BWP, is a common resource block RB index location determined based on the reference frequency domain location, is a common resource block index that is determined based on the reference frequency domain location and that is relative to the start resource block on the BWP, and the physical resource block index range on the BWP is [0,], where indicates a quantity of available resource blocks on the BWP that is determined based on the subcarrier spacing and a bandwidth size.

In a possible implementation, the at least one carrier includes a first carrier and a second carrier, where a physical resource block index range on the BWP includes a physical resource block index range on the first carrier and a physical resource block index range on the second carrier, the physical resource block index range on the first carrier is determined based on a quantity of resource blocks on the first carrier, the physical resource block index range on the second carrier is determined based on a quantity of resource blocks on the second carrier, and a frequency domain location of the first carrier is less than a frequency domain location of the second carrier; a physical resource block index location on the first carrier is determined based on the following locations: a resource block index location on the BWP; and a common resource block index location that is determined based on the reference frequency domain location and that is relative to the resource block on the BWP or a common resource block index location that is determined based on the reference frequency domain location and that is relative to the resource block on the first carrier; and a physical resource block index location on the second carrier is determined based on the following locations: the resource block index location on the BWP and a common resource block index location that is determined based on the reference frequency domain location and that is relative to the resource block on the second carrier.

According to the foregoing method, physical resource blocks can be configured for different carriers based on different carriers on the BWP. This implements applicability of configuration of the physical resource block on the BWP, and is compatible with existing configuration of the physical resource block.

$$n_{RB}{}^{\mu}=n_{PRB}{}^{\mu}+\max\{N_{BWP}{}^{start,\mu},$$
$$N_{carrier,1}{}^{start,\mu}\}\mu n_{PRB}{}^{\mu}n_{RB}{}^{\mu}N_{BWP}{}^{start,\mu}$$
$$N_{carrier,1}{}^{start,\mu}\{\ \}N_{carrier,1}{}^{size,\mu}-1N_{carrier,1}{}^{size,\mu}$$

In a possible implementation, the physical resource block index location on the first carrier satisfies:

$$n_{RB}{}^{\mu}=n_{PRB}{}^{\mu}+\max\{N_{BWP}{}^{start,\mu},$$
$$N_{carrier,1}{}^{start,\mu}\}\mu n_{PRB}{}^{\mu}N_{RB}{}^{\mu}N_{BWP}{}^{start,\mu}$$
$$N_{carrier,1}{}^{start,\mu}\{\ \}N_{carrier,1}{}^{size,\mu}-1N_{carrier,1}{}^{size,\mu},$$

$$n_{RB}{}^{\mu}=n_{PRB}{}^{\mu}+\max\{N_{BWP}{}^{start,\mu},$$
$$N_{carrier,1}{}^{start,\mu}\}\mu n_{PRB}{}^{\mu}N_{RB}{}^{\mu}N_{BWP}{}^{start,\mu}$$
$$N_{carrier,1}{}^{start,\mu}\{\ \}N_{carrier,1}{}^{size,\mu}-1N_{carrier,1}{}^{size,\mu}$$

where there is a correspondence between and a subcarrier spacing on the BWP, indicates the physical resource block index location on the first carrier, is a common resource block RB index location determined based on the reference frequency domain location, is a common resource block index that is determined based on the reference frequency domain location and that is relative to the start resource block on the BWP, is a common resource block index that is determined based on the reference frequency domain location and that is relative to a start resource block on the first carrier, max indicates that a maximum value is taken, and the physical resource block index range on the first carrier is [0,], where indicates a quantity of available resource blocks on the first carrier that is determined based on the subcarrier spacing and a bandwidth size.

$$n_{RB}{}^{\mu}=n_{PRB}{}^{\mu}+N_{carrier,2}{}^{start,\mu}\mu n_{PRB}{}^{\mu}n_{RB}{}^{\mu}$$
$$N_{carrier,2}{}^{start,\mu}N_{carrier,2}{}^{size,\mu}-1N_{carrier,2}{}^{size,\mu}$$

In a possible implementation, the physical resource block index location on the second carrier satisfies:

$$n_{RB}{}^{\mu}=n_{PRB}{}^{\mu}+N_{carrier,2}{}^{start,\mu}\mu n_{PRB}{}^{\mu}n_{RB}{}^{\mu}$$
$$N_{carrier,2}{}^{start,\mu}N_{carrier,2}{}^{size,\mu}-1N_{carrier,2}{}^{size,\mu},$$

$$n_{RB}{}^{\mu}=n_{PRB}{}^{\mu}+N_{carrier,2}{}^{start,\mu}\mu n_{PRB}{}^{\mu}n_{RB}{}^{\mu}$$
$$N_{carrier,2}{}^{start,\mu}N_{carrier,2}{}^{size,\mu}-1N_{carrier,2}{}^{size,\mu}$$

where there is a correspondence between and a subcarrier spacing on the BWP, indicates the physical resource block index location on the second carrier, is a common resource block RB index location determined based on the reference frequency domain location, is a common resource block index that is determined based on the reference frequency domain location and that is relative to a start resource block on the second carrier, and the physical resource block index range on the second carrier is [0,], where indicates a quantity of available resource blocks on the second carrier that is determined based on the subcarrier spacing and a bandwidth size.

According to a third aspect, this application provides a communications method, including: receiving configuration information of a bandwidth part BWP; and determining the configuration information of the BWP. The BWP includes at least one resource block, the at least one resource block is located on at least one carrier, location information of different carriers in a system is determined based on a reference frequency domain location, and the configuration information of the BWP is used to indicate a location of the at least one resource block based on the reference frequency domain location.

The method may be performed by a second communications apparatus, and the second communications apparatus is a receiving end apparatus. For example, the second communications apparatus may be a terminal device. The second communications apparatus may be a communications device, or a communications apparatus, for example, a chip, that can support the communications device in implementing a function required in the method. For example, the second communications apparatus may be a terminal device, a chip that is disposed in the terminal device and that is configured to implement a function of the terminal device, or another component configured to implement the function of the terminal device. When the communications method is applied to a vehicle, the second communications apparatus may be a vehicle-mounted device, a chip that is disposed in the vehicle-mounted device and that is configured to implement a function of the vehicle-mounted device, or another component configured to implement the function of the vehicle-mounted device.

In this embodiment of this application, an ultra-high bandwidth may be implemented by aggregating a plurality of radio frequency carriers. Resource division is performed on the aggregated carriers based on a same reference frequency domain location, and then the BWP is configured by using the reference frequency domain location as a reference point. In different BWP configuration manners, the terminal device does not need to first determine a configured bandwidth of the carrier and then configure the BWP on the configured bandwidth of the carrier, but may directly determine the configuration information of the BWP based on the reference frequency domain location. This reduces BWP understanding complexity and possible signaling overheads and power consumption of the second communications apparatus during resource scheduling.

In a possible implementation, the at least one resource block is contiguous, and the configuration information of the BWP includes an offset of a start resource block on the BWP relative to the reference frequency domain location and a quantity of the at least one resource block.

According to the foregoing method, considering that the resource blocks on the BWP are contiguous resource blocks, the terminal device may determine all the resource blocks included in the complete BWP by indicating the offset of the start resource block on the BWP relative to the reference frequency domain position and the quantity of the at least one resource block, and does not need to determine the resource blocks on the BWP with reference to carrier configuration. This reduces BWP configuration complexity and power consumption of the second communications apparatus.

In a possible implementation, the BWP includes N resource block sets, resource blocks in each of the N resource block sets are contiguous, and the configuration information of the BWP includes an offset of a start resource block in each of the N resource block sets relative to the reference frequency domain location and a quantity of resource blocks in each of the N resource block sets, where N is a positive integer.

According to the foregoing method, considering that the resource blocks on the BWP are non-contiguous resource blocks, the N resource block sets in the resource blocks on the BWP may be determined based on the configuration information of the BWP, so that the non-contiguous resources on the BWP can be determined. The configuration information of the BWP indicates a resource block set, which is not limited to a manner in which the configuration information of the BWP indicates contiguous resource blocks on the carrier. This improves flexibility of the configuration information of the BWP, and reduces power consumption of the second communications apparatus.

In a possible implementation, the configuration information of the BWP is a bitmap, where a start bit in the bitmap indicates a resource block corresponding to the reference frequency domain location, each bit in the bitmap corresponds to one of the at least one resource block, and the bit is used to indicate whether the corresponding resource block belongs to the BWP.

A location of each resource block on the BWP relative to the reference frequency domain location is indicated by using the bitmap, so that the terminal device can determine indexes of all resource blocks included in the BWP relative to the reference frequency domain location based on the bitmap, to determine a location of each resource block on the BWP. In this way, the second communications apparatus does not need to further determine the resource block on the BWP based on the carrier configuration. This improves BWP configuration flexibility, and reduces complexity of understanding the BWP by the second communications apparatus and power consumption of the second communications apparatus.

In a possible implementation, the configuration information of the BWP is a bitmap, where the BWP includes M resource block subsets, each resource block subset includes a plurality of resource blocks, a start bit in the bitmap indicates a resource block subset corresponding to the reference frequency domain location, one bit in the bitmap corresponds to one of the M resource block subsets, and the bit is used to indicate whether the corresponding resource block subset belongs to the BWP, where M is a positive integer.

A location of each resource block subset on the BWP relative to the reference frequency domain location is indicated by using the bitmap. This can reduce BWP configuration understanding complexity, and reduce bitmap overheads.

In a possible implementation, the configuration information of the BWP further includes an offset of a start resource block on the at least one carrier relative to the reference frequency domain location.

According to the foregoing method, a plurality of carriers used for carrier aggregation can correspond to a same reference frequency domain location, so that resource rasters of the plurality of carriers used for carrier aggregation are the same. This helps subsequent uniform understanding of the BWP configured based on the reference frequency domain location. In addition, the configuration information of the BWP is used to indicate offsets of start resource blocks on different carriers relative to the reference frequency domain location, and there is no need to indicate a corresponding offset relative to the reference frequency domain location for each carrier. This reduces signaling overheads and power consumption of the second communications apparatus.

In a possible implementation, the method further includes: receiving carrier configuration information, where the carrier configuration information includes an offset of a start resource block on the at least one carrier relative to the reference frequency domain location.

According to the foregoing method, a plurality of carriers used for carrier aggregation can correspond to a same reference frequency domain location, so that resource rasters of the plurality of carriers used for carrier aggregation are the same. This helps subsequent uniform understanding of the BWP configured based on the reference frequency domain location. In addition, the carrier configuration information can be indicated based on a requirement, and the offset of the start resource block on the at least one carrier relative to the reference frequency domain location does not need to be carried in the configuration information of the BWP. This improves indication flexibility.

According to a fourth aspect, this application provides a communications method, including: receiving configuration information of a guard band; and determining the configuration information of the guard band. The guard band is located on a bandwidth part BWP, the BWP includes at least one resource block, the at least one resource block is located on at least one carrier, and location information of different carriers in a system is determined based on a reference frequency domain location. The configuration information of the guard band is used to indicate a location of the guard band on the BWP.

The method may be performed by a second communications apparatus, and the second communications apparatus is a receiving end apparatus. For example, the second communications apparatus may be a terminal device. The second communications apparatus may be a communications device, or a communications apparatus, for example, a chip, that can support the communications device in implementing a function required in the method. For example, the second communications apparatus may be a terminal device, a chip that is disposed in the terminal device and that is configured to implement a function of the terminal device, or another component configured to implement the function of the terminal device. When the communications method is applied to a vehicle, the second communications apparatus may be a vehicle-mounted device, a chip that is disposed in the vehicle-mounted device and that is configured to implement a function of the vehicle-mounted device, or another component configured to implement the function of the vehicle-mounted device.

In this embodiment of this application, an ultra-high bandwidth may be implemented by aggregating a plurality of radio frequency carriers. Resource division is performed on the aggregated carriers based on a same reference frequency domain location, and then the BWP is configured by using the reference frequency domain location as a reference point. This improves BWP configuration flexibility, and reduces BWP configuration complexity and possible signaling overheads during resource scheduling. Further, when a network device performs resource scheduling, the BWP covers all or some resources on one or more carriers. Therefore, in some scenarios, when a signal is sent only on resource blocks on some carriers on the BWP, to avoid interference to another system deployed on a neighboring carrier, the guard band may be set on the BWP by using the foregoing method. The terminal device may determine, by using the configuration information of the guard band, an available resource block on the BWP that is configured by the network device for the terminal device. This ensures performance of the BWP.

In a possible implementation, the configuration information of the guard band is used to indicate a location of the guard band relative to a start resource block on the BWP.

According to the foregoing method, the configuration information of the guard band may be configured based on the start resource block on the BWP. Therefore, a location of a resource block on the guard band relative to the start resource block on the BWP may be used as the configuration information of the guard band, to indicate the location of the guard band. This reduces complexity of configuring guard bands on different BWPs and power consumption of the second communications apparatus.

In a possible implementation, resource blocks included in the guard band are contiguous, and the configuration information of the guard band includes an offset of a start resource block on the guard band relative to the start resource block on the BWP and a quantity of resource blocks included in the guard band.

Considering that the resource blocks included in the guard band on the BWP are contiguous, to reduce signaling overheads and power consumption of the second communications apparatus, the location of the guard band on the BWP may be determined by using the offset of the start resource block on the guard band relative to the start resource block on the BWP and the quantity of resource blocks included in the guard band.

In a possible implementation, the configuration information of the guard band includes offsets of all resource blocks on the guard band relative to the start resource block on the BWP.

According to the foregoing method, locations of all the resource blocks on the guard band can be directly indicated. Complexity of understanding configuration of the guard band by the second communications apparatus can be effectively reduced, and power consumption of the second communications apparatus can be reduced, especially when the quantity of resource blocks on the guard band is relatively small.

In a possible implementation, the guard band includes A guard band resource block sets, resource blocks in each of the A guard band resource block sets are contiguous, and the configuration information of the guard band includes an offset of a start resource block in each of the A guard band resource block sets relative to the start resource block on the BWP and a quantity of resource blocks in each of the A guard band resource block sets, where A is a positive integer.

According to the foregoing method, considering that the resource blocks on the guard band are non-contiguous resource blocks, the resource blocks on the guard band can be classified into the A guard band resource block sets, so that the non-contiguous resources on the guard band can be indicated. This can effectively reduce complexity of understanding configuration of the guard band by the second communications apparatus, and reduce power consumption of the second communications apparatus.

In a possible implementation, the configuration information of the guard band is a bitmap, and a start bit in the bitmap indicates the start resource block on the BWP, where one bit in the bitmap corresponds to one of all resource blocks on the guard band, and the bit is used to indicate whether the corresponding resource block belongs to the guard band.

A location of each resource block on the guard band relative to the start resource block on the BWP is indicated by using the bitmap, so that the terminal device can determine indexes of all resource blocks included in the guard band relative to the start resource block on the BWP, to determine a location of each resource block on the guard band. This improves flexibility of understanding the configuration information of the guard band by the second communications apparatus.

In a possible implementation, the configuration information of the guard band is a bitmap, where the guard band includes B resource block subsets, each resource block subset includes a plurality of resource blocks, each bit in the bitmap corresponds to one of the B resource block subsets, and the bit is used to indicate whether the corresponding resource block subset belongs to the guard band, where B is a positive integer.

A location of each resource block subset on the guard band relative to the start resource block on the BWP is indicated by using the bitmap, so that the location of each resource block subset on the guard band relative to the start resource block on the BWP can be determined. In this way, flexibility of configuring the guard band can be improved, overheads of the bitmap can be reduced, and power consumption of the second communications apparatus can be reduced.

In a possible implementation, the configuration information of the guard band is used to indicate a location of the guard band relative to the reference frequency domain location.

According to the foregoing method, the location of the guard band can be indicated based on the reference frequency domain location. This improves flexibility of configuring the guard band.

In a possible implementation, resource blocks included in the guard band are contiguous, and the configuration information of the guard band includes a location of a start resource block on the guard band relative to the reference frequency domain location and a quantity of resource blocks included in the guard band.

Considering that the resource blocks included in the guard band on the BWP are contiguous, to reduce signaling overheads and power consumption of the second communications apparatus, the location of the guard band on the BWP may be determined by using the offset of the start resource block on the guard band relative to the reference frequency domain location and the quantity of resource blocks included in the guard band.

In a possible implementation, the configuration information of the guard band includes locations of all resource blocks on the guard band relative to the reference frequency domain location.

According to the foregoing method, locations of all the resource blocks on the guard band can be directly indicated. Complexity of understanding the configuration information of the guard band by the second communications apparatus can be effectively reduced, and power consumption of the second communications apparatus can be reduced, especially when the quantity of resource blocks on the guard band is relatively small.

In a possible implementation, the guard band includes A guard band resource block sets, resource blocks in each of the A guard band resource block sets are contiguous, and the configuration information of the guard band includes an offset of a start resource block in each of the A contiguous guard band resource block sets relative to the reference frequency domain location and a quantity of resource blocks in each of the A guard band resource block sets, where A is a positive integer.

According to the foregoing method, considering that the resource blocks on the guard band are non-contiguous resource blocks, the resource blocks on the guard band can be classified into the A guard band resource block sets, so that the non-contiguous resources on the guard band can be indicated. This improves flexibility of understanding the configuration information of the guard band.

In a possible implementation, the configuration information of the guard band is a bitmap, where a start bit in the bitmap indicates a resource block corresponding to the reference frequency domain location, one bit in the bitmap corresponds to one of all resource blocks on the guard band, and the bit is used to indicate whether the corresponding resource block belongs to the guard band.

A location of each resource block on the guard band relative to the reference frequency domain location is indicated by using the bitmap. The terminal device may determine indexes of all resource blocks included in the guard band relative to the reference frequency domain location, to determine the location of each resource block on the guard band. This improves flexibility of understanding the configuration information of the guard band.

In a possible implementation, the configuration information of the guard band is a bitmap, where the guard band includes B resource block subsets, each resource block subset includes a plurality of resource blocks, a start bit in the bitmap indicates a resource block subset corresponding to the reference frequency domain location, each bit in the bitmap corresponds to one of the B resource block subsets, and the bit is used to indicate whether the corresponding resource block subset belongs to the guard band, where B is a positive integer.

A location of each resource block subset on the guard band relative to the reference frequency domain location is indicated by using the bitmap, so that the terminal device can determine a location of each resource block on the guard band based on indexes of all resource block subsets included in the guard band relative to the reference frequency domain location. This improves flexibility of understanding the configuration information of the guard band.

In a possible implementation, a physical resource block index range on the BWP is determined based on a quantity of resource blocks on the BWP; and a physical resource block index location is determined by using a resource block index location on the BWP and the resource block on the BWP based on the reference frequency domain location.

According to the foregoing method, the physical resource block on the BWP can be configured based on the reference frequency domain location. This reduces complexity of understanding configuration of the physical resource block on the BWP by the second communications apparatus.

$$n_{RB}{}^{\mu}=n_{PRB}{}^{\mu}+N_{BWP}{}^{start,\mu}\mu n_{PRB}{}^{\mu}n_{RB}{}^{\mu}$$
$$N_{BWP}{}^{start,\mu}N_{BWP}{}^{size,\mu}-1N_{BWP}{}^{size,\mu}$$

In a possible implementation, the physical resource block index location satisfies:

$$n_{RB}{}^{\mu}=n_{PRB}{}^{\mu}+N_{BWP}{}^{start,\mu}\mu n_{PRB}{}^{\mu}n_{RB}{}^{\mu}$$
$$N_{BWP}{}^{start,\mu}N_{BWP}{}^{size,\mu}-1N_{BWP}{}^{size,\mu},$$

$$n_{RB}{}^{\mu}=n_{PRB}{}^{\mu}+N_{BWP}{}^{start,\mu}\mu n_{PRB}{}^{\mu}n_{RB}{}^{\mu}$$
$$N_{BWP}{}^{start,\mu}N_{BWP}{}^{size,\mu}-1N_{BWP}{}^{size,\mu}$$

where there is a correspondence between and a subcarrier spacing on the BWP, indicates the physical resource block index location on the BWP, is a common resource block RB index location determined based on the reference frequency domain location, is a common resource block index that is determined based on the reference frequency domain location and that is relative to the start resource block on the BWP, and the physical resource block index range on the BWP is [0,], where indicates a quantity of available resource blocks on the BWP that is determined based on the subcarrier spacing and a bandwidth size.

In a possible implementation, the at least one carrier includes a first carrier and a second carrier, where a physical resource block index range on the BWP includes a physical resource block index range on the first carrier and a physical resource block index range on the second carrier, the physical resource block index range on the first carrier is determined based on a quantity of resource blocks on the first carrier, the physical resource block index range on the second carrier is determined based on a quantity of resource blocks on the second carrier, and a frequency domain location of the first carrier is less than a frequency domain location of the second carrier; a physical resource block index location on the first carrier is determined based on the following locations: a resource block index location on the BWP; and a common resource block index location that is determined based on the reference frequency domain location and that is relative to the resource block on the BWP or a common resource block index location that is determined based on the reference frequency domain location and that is relative to the resource block on the first carrier; and a physical resource block index location the on the second carrier is determined based on the following locations: the resource block index location on the BWP and a common resource block index location that is determined based on the reference frequency domain location and that is relative to the resource block on the second carrier.

According to the foregoing method, physical resource blocks can be configured for different carriers based on different carriers on the BWP. This implements applicability of configuration of the physical resource block on the BWP, and is compatible with existing configuration of the physical resource block.

$$n_{RB}{}^{\mu}=n_{PRB}{}^{\mu}+\max\{N_{BWP}{}^{start,\mu}, N_{carrier,1}{}^{start,\mu}\}, \mu n_{PRB}{}^{\mu} n_{RB}{}^{\mu} N_{BWP}{}^{start,\mu} N_{carrier,1}{}^{start,\mu}\{\ \}N_{carrier,1}{}^{size,\mu}-1 N_{carrier,1}{}^{size,\mu}$$

In a possible implementation, the physical resource block index location on the first carrier satisfies:

$$n_{RB}{}^{\mu}=n_{PRB}{}^{\mu}+\max\{N_{BWP}{}^{start,\mu}, N_{carrier,1}{}^{start,\mu}\}, \mu n_{PRB}{}^{\mu} n_{RB}{}^{\mu} N_{BWP}{}^{start,\mu} N_{carrier,1}{}^{start,\mu}\{\ \}N_{carrier,1}{}^{size,\mu}-1 N_{carrier,1}{}^{size,\mu},$$

$$n_{RB}{}^{\mu}=n_{PRB}{}^{\mu}+\max\{N_{BWP}{}^{start,\mu}, N_{carrier,1}{}^{start,\mu}\}, \mu n_{PRB}{}^{\mu} n_{RB}{}^{\mu} N_{BWP}{}^{start,\mu} N_{carrier,1}{}^{start,\mu}\{\ \}N_{carrier,1}{}^{size,\mu}-1 N_{carrier,1}{}^{size,\mu}$$

where there is a correspondence between and a subcarrier spacing on the BWP, indicates the physical resource block index location on the first carrier, is a common resource block RB index location determined based on the reference frequency domain location, is a common resource block index that is determined based on the reference frequency domain location and that is relative to the start resource block on the BWP, is a common resource block index that is determined based on the reference frequency domain location and that is relative to a start resource block on the first carrier, max indicates that a maximum value is taken, and the physical resource block index range on the first carrier is [0,], where indicates a quantity of available resource blocks on the first carrier that is determined based on the subcarrier spacing and a bandwidth size.

$$n_{RB}{}^{\mu}=n_{PRB}{}^{\mu}+\max\{N_{BWP}{}^{start,\mu}, N_{carrier,2}{}^{start,\mu}\}, \mu n_{PRB}{}^{\mu} n_{RB}{}^{\mu} N_{BWP}{}^{start,\mu} N_{carrier,2}{}^{start,\mu}\{\ \}N_{carrier,2}{}^{size,\mu}-1 N_{carrier,2}{}^{size,\mu}$$

In a possible implementation, the physical resource block index location on the second carrier satisfies:

$$n_{RB}{}^{\mu}=n_{PRB}{}^{\mu}+\max\{N_{BWP}{}^{start,\mu}, N_{carrier,2}{}^{start,\mu}\}, \mu n_{PRB}{}^{\mu} n_{RB}{}^{\mu} N_{BWP}{}^{start,\mu} N_{carrier,2}{}^{start,\mu}\{\ \}N_{carrier,2}{}^{size,\mu}-1 N_{carrier,2}{}^{size,\mu},$$

$$n_{RB}{}^{\mu}=n_{PRB}{}^{\mu}+\max\{N_{BWP}{}^{start,\mu}, N_{carrier,2}{}^{start,\mu}\}, \mu n_{PRB}{}^{\mu} n_{RB}{}^{\mu} N_{BWP}{}^{start,\mu} N_{carrier,2}{}^{start,\mu}\{\ \}N_{carrier,2}{}^{size,\mu}-1 N_{carrier,2}{}^{size,\mu}$$

where there is a correspondence between and a subcarrier spacing on the BWP, indicates the physical resource block index location on the second carrier, is a common resource block RB index location determined based on the reference frequency domain location, is a common resource block index that is determined based on the reference frequency domain location and that is relative to a start resource block on the second carrier, and the physical resource block index range on the second carrier is [0,], where indicates a quantity of available resource blocks on the second carrier that is determined based on the subcarrier spacing and a bandwidth size.

According to a fifth aspect, this application provides a communications apparatus. For example, the communications apparatus is the first communications apparatus described above. The first communications apparatus is configured to perform the method in the implementations of the first aspect or the second aspect. Specifically, the first communications apparatus may include modules configured to perform the method in the implementations of the first aspect or the second aspect, for example, a processing module and a sending module.

For example, the sending module may further include a receiving module. The sending module and the receiving module may be different functional modules, or may be a same functional module, but can implement different functions (the sending module is configured to implement a signal sending function, and the receiving module is configured to implement a signal receiving function). For example, the first communications apparatus is a communications device, or is a chip or another component disposed in the communications device. For example, the first communications apparatus may be a network device, or may be a chip or another component disposed in the network device. For example, the sending module may also be implemented by using a transceiver, and the processing module may also be implemented by using a processor. Alternatively, the sending module may be implemented by using a transmitter, and the receiving module may be implemented by using a receiver. The transmitter and the receiver may be different functional modules, or may be a same functional module, but can implement different functions (the transmitter is configured to implement a signal sending function, and the receiver is configured to implement a signal receiving function). If the first communications apparatus is the communications device, the transceiver is implemented, for example, by using an antenna, a feeder, and a codec in the communications device. Alternatively, if the first communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component.

According to a sixth aspect, a communications apparatus is provided. For example, the communications apparatus is the second communications apparatus described above. The second communications apparatus is configured to perform the method in the implementations of the third aspect or the fourth aspect. Specifically, the second communications apparatus may include modules configured to perform the method in the implementations of the third aspect or the fourth aspect, for example, a processing module and a receiving module. For example, the receiving module may further include a sending module. The sending module and the receiving module may be different functional modules, or may be a same functional module, but can implement different functions (the sending module is configured to implement a signal sending function, and the receiving module is configured to implement a signal receiving function). For example, the second communications apparatus is a communications device, or is a chip or another component disposed in the communications device. For example, the communications device is a terminal device or a vehicle-mounted device. For example, the second communications apparatus may be a vehicle-mounted device, or may be a chip or another component disposed in the vehicle-mounted device. For example, the receiving module may also be implemented by using a transceiver, and the processing module may also be implemented by using a processor. Alternatively, the sending module may be implemented by using a transmitter, and the receiving module may be implemented by using a receiver. The transmitter and the receiver may be different functional modules, or may be a same functional module, but can implement different functions (the transmitter is configured to implement a signal sending function, and the receiver is configured to implement a signal receiving function). If the second communications apparatus is the communications device, the transceiver is implemented, for example, by using an antenna, a feeder, and a codec in the communications device. Alternatively, if the second communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component.

According to a seventh aspect, a communications apparatus is provided. For example, the communications apparatus is the first communications apparatus described above. The communications apparatus includes a processor and a communications interface (or an interface circuit). The communications interface may be configured to communicate with another apparatus or device. Optionally, the communications apparatus may further include a memory, configured to store computer instructions. The processor and the memory are coupled to each other, to implement the method described in the implementations of the first aspect or the second aspect. Alternatively, the first communications apparatus may not include a memory, and the memory may be located outside the first communications apparatus. The processor, the memory, and the communications interface are coupled to each other, to implement the method described in the implementations of the first aspect or the second aspect. For example, when the processor executes the computer instructions stored in the memory, the first communications apparatus is enabled to perform the method in the implementations of the first aspect or the second aspect. For example, the first communications apparatus is a communications device, or is a chip or another component disposed in the communications device. For example, the communications device is a network device. For example, the first communications apparatus may be a network device, or may be a chip or another component disposed in the network device.

If the first communications apparatus is the communications device, the communications interface is implemented, for example, by using a transceiver (or a transmitter and a receiver) in the communications device, and the transceiver is implemented, for example, by using an antenna, a feeder, and a codec in the communications device. Alternatively, if the first communications apparatus is the chip disposed in the communications device, the communications interface is, for example, an input/output interface such as an input/output pin in the chip, and the communications interface is connected to a radio frequency transceiver component in the communications device, to implement information receiving and sending by using the radio frequency transceiver component.

According to an eighth aspect, a communications apparatus is provided. For example, the communications apparatus is the second communications apparatus described above. The communications apparatus includes a processor and a communications interface (or an interface circuit). The communications interface may be configured to communicate with another apparatus or device. Optionally, the communications apparatus may further include a memory, configured to store computer instructions. The processor and the memory are coupled to each other, to implement the method described in the implementations of the third aspect or the fourth aspect. Alternatively, the second communications apparatus may not include a memory, and the memory may be located outside the second communications apparatus. The processor, the memory, and the communications interface are coupled to each other, to implement the method described in the implementations of the third aspect or the fourth aspect. For example, when the processor executes the computer instructions stored in the memory, the second communications apparatus is enabled to perform the method in the implementations of the third aspect or the fourth aspect. For example, the second communications apparatus is a communications device, or is a chip or another component disposed in the communications device. For example, the communications device is a terminal device or a vehicle-mounted device. For example, the second communications apparatus may be a terminal device, or may be a chip or another component disposed in the terminal device.

If the second communications apparatus is the communications device, the communications interface is implemented, for example, by using a transceiver (or a transmitter and a receiver) in the communications device, and the transceiver is implemented, for example, by using an antenna, a feeder, and a codec in the communications device. Alternatively, if the second communications apparatus is the chip disposed in the communications device, the communications interface is, for example, an input/output interface such as an input/output pin in the chip, and the communications interface is connected to a radio frequency transceiver component in the communications device, to implement information receiving and sending by using the radio frequency transceiver component.

According to a ninth aspect, a chip is provided. The chip includes a processor and a communications interface. The processor and the communications interface are coupled to each other, to implement the method in the implementations of the first aspect or the second aspect.

Optionally, the chip may further include a memory. For example, the processor may read and execute a software program stored in the memory, to implement the method provided in the implementations of the first aspect or the second aspect. Alternatively, the memory may not be included in the chip, but is located outside the chip. This is equivalent to that the processor may read and execute a software program stored in the external memory, to implement the method provided in the implementations of the first aspect or the second aspect.

According to a tenth aspect, a chip is provided. The chip includes a processor and a communications interface. The processor and the communications interface are coupled to each other, to implement the method in the implementations of the third aspect or the fourth aspect.

Optionally, the chip may further include a memory. For example, the processor may read and execute a software program stored in the memory, to implement the method provided in the implementations of the third aspect or the fourth aspect. Alternatively, the memory may not be included in the chip, but is located outside the chip. This is equivalent to that the processor may read and execute a software program stored in the external memory, to implement the method provided in the implementations of the third aspect or the fourth aspect.

According to an eleventh aspect, a communications system is provided. The communications system includes the communications apparatus in the fifth aspect, the communications apparatus in the seventh aspect or the communications apparatus in the ninth aspect, and the communications apparatus in the sixth aspect, the communications apparatus in the eighth aspect, or the communications apparatus in the tenth aspect.

According to a twelfth aspect, a computer-readable storage medium is provided. The computer-readable storage medium is configured to store a computer program, and when the computer program is run on a computer, the computer is enabled to perform the method in the implementations of the first aspect or the second aspect.

According to a thirteenth aspect, a computer-readable storage medium is provided. The computer-readable storage medium is configured to store a computer program, and when the computer program is run on a computer, the computer is enabled to perform the method in the implementations of the third aspect or the fourth aspect.

According to a fourteenth aspect, a computer program product including instructions is provided. The computer program product is configured to store a computer program, and when the computer program is run on a computer, the computer is enabled to perform the method in the implementations of the first aspect or the second aspect.

According to a fifteenth aspect, a computer program product including instructions is provided. The computer program product is configured to store a computer program, and when the computer program is run on a computer, the computer is enabled to perform the method in the implementations of the third aspect or the fourth aspect.

BRIEF DESCRIPTION OF THE DRAWINGS

FIG. 3B to FIG. 3F are schematic diagrams of configuring a BWP according to an embodiment of this application;

FIG. 4B to FIG. 4G are schematic diagrams of configuring a guard band according to an embodiment of this application;

DETAILED DESCRIPTION OF ILLUSTRATIVE EMBODIMENTS

Figure 1:
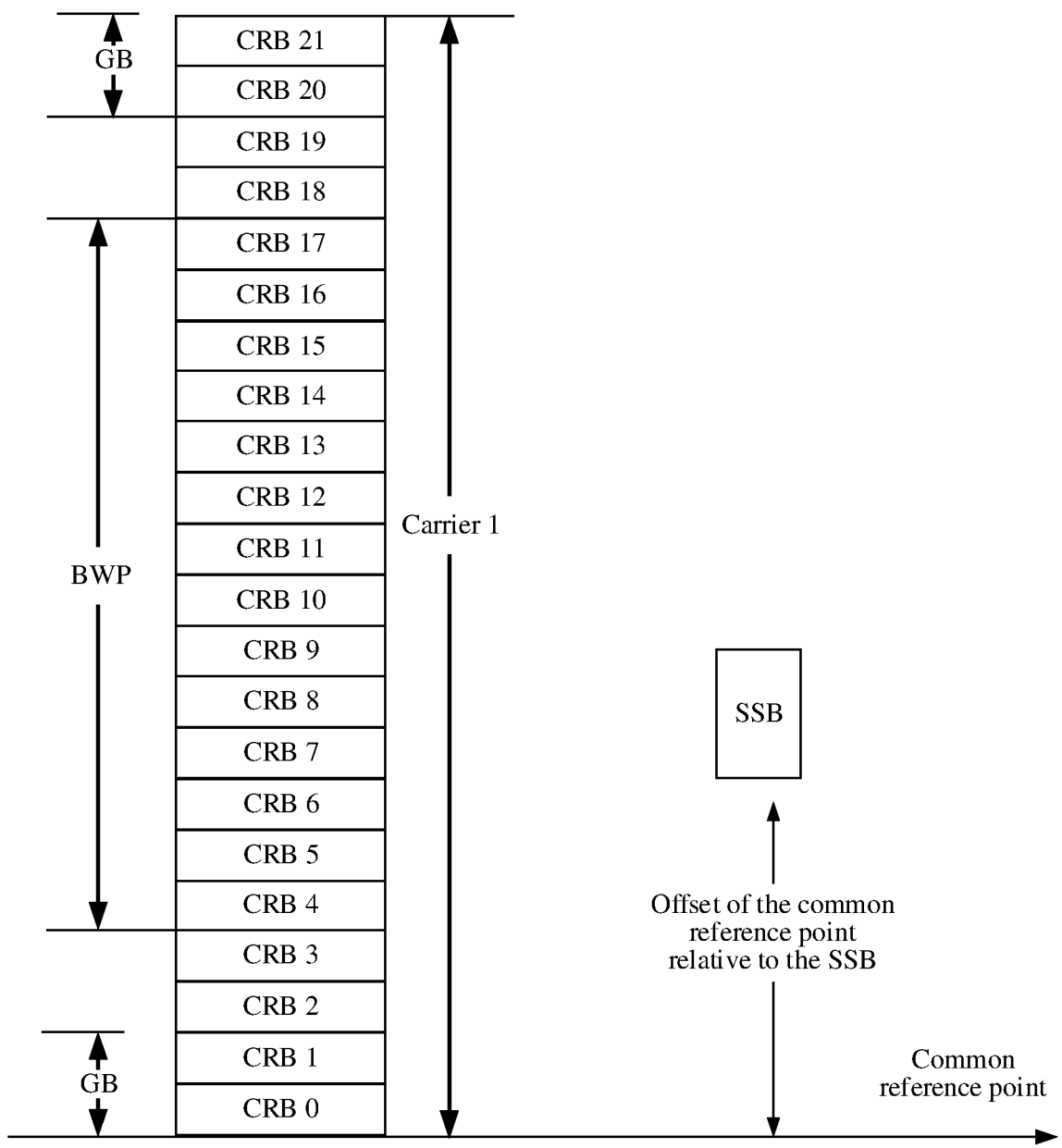
FIG. 1 is a schematic diagram of configuring a BWP in the conventional technology.

The following describes in detail embodiments of this application with reference to accompanying drawings.

Embodiments of this application may be applied to various mobile communications systems, for example, a new radio (NR) system, a long term evolution (LTE) system, an advanced long term evolution (LTE-A) system, an evolved long term evolution (eLTE) system, and another communications system. This is not specifically limited herein.

The following describes some terms in embodiments of this application, to facilitate understanding of a person skilled in the art.

Carrier aggregation (CA): The CA technology can aggregate a plurality of component carriers (CC) to provide services for one terminal device, so as to achieve a larger transmission bandwidth, and effectively improve uplink and downlink transmission rates. The plurality of carriers usually include one primary carrier and one or more secondary carriers. A cell working on the primary carrier is a primary cell (PCell). The PCell is a cell that a terminal initially accesses, and a base station in which the PCell is located is responsible for performing radio resource control (RRC) communication with the terminal. A cell working on the secondary carrier is a secondary cell (SCell). The SCell may provide an additional radio resource for the terminal.

In a new radio (NR) system specified in the 3rd Generation Partnership Project (3GPP) protocol, a frequency range of wireless transmission is divided into an FR1 band and an FR2 band. Two frequency ranges are introduced in Release-15 (R-15), as shown in Table 1, which are respectively referred to as FR1 and FR2 for short.

TABLE 1

| Frequency range designation | Corresponding frequency range |
| --- | --- |
| FR1 | 410 MHz to 7,125 MHz |
| FR2 | 24,250 MHz to 52,600 MHz |

The frequency range of the FR1 band is 410 MHz to 7,125 MHz, and the frequency range of the FR2 band is 24.25 GHz to 52.6 GHz. The FR2 band is located on a high band, and is usually referred to as a millimeter wave (mmWave). According to NR protocol specifications, beamforming is applicable to a sub-6 GHz band and an mmWave band. In a carrier aggregation scenario, a plurality of carriers may be configured for one terminal device, and each configured carrier is referred to as a subcarrier (CC). A subcarrier in FR1 may be configured for a terminal device that can work in FR1. A subcarrier in FR2 may be configured for a terminal device that can work in FR2. A subcarrier in FR1, a subcarrier in FR2, or both a subcarrier in FR1 and a subcarrier in FR2 may be configured for a terminal device that can work in FR1 and FR2.

Transmission Unit

An NR system is used as an example. In the NR system, a resource element (RE) is a minimum resource unit used for data transmission, and corresponds to one time domain symbol in time domain and one subcarrier in frequency domain. A physical resource block (PRB) is a basic unit used for resource scheduling, and corresponds to a plurality of consecutive time domain symbols in time domain and a plurality of contiguous subcarriers in frequency domain, or corresponds to a plurality of contiguous subcarriers in frequency domain.

A time domain resource includes a time unit. The time unit may be one radio frame, one subframe, one slot, one mini-slot, or one orthogonal frequency division multiplexing (OFDM) symbol or an SC-FDMA symbol, or may be a resource including a plurality of radio frames, a plurality of subframes, a plurality of slots, a plurality of mini-slots, or a plurality of OFDM symbols, or may be another time domain granularity (for example, a radio frame or a subframe). One radio frame may include a plurality of subframes, one subframe may include one or more slots, and one slot may include at least one symbol, for example, 14 symbols or 12 symbols. It should be noted that, in embodiments of this application, one OFDM symbol may also be referred to as one symbol for short. A transmission time interval (TTI) is a time domain granularity used to carry data information or service information. For example, one data packet is carried on a time-frequency resource including one TTI in time domain and at least one physical resource block in frequency domain.

Symbol lengths may be different based on different subcarrier spacings. Therefore, slot lengths may be different. In other words, that slot lengths may be different may be understood as that different slots may include different quantities of symbols. In NR, one slot may include at least one of a symbol used for downlink transmission, a flexible symbol, a symbol used for uplink transmission, and the like. In this way, slot compositions are referred to as different slot formats (SF), and there may be a maximum of 256 slot formats. A length of one TTI may be S time domain symbols, or may be less than S time domain symbols. There may be slots in different slot types, and slots in different slot types may include different quantities of symbols. For example, a TTI whose length is S time domain symbols may be referred to as a slot or a full slot, and a TTI whose length is less than S time domain symbols may be referred to as a mini-slot or a non-slot. Herein, S=12 or 14. For example, for a normal cyclic prefix (normal CP), S=14, and for an extended cyclic prefix (extended CP), S=12. In this application, a slot is used as an example for description. However, this application is not limited to an implementation of the slot.

A subcarrier spacing (SCS) is a value of a spacing between center locations or peak locations of two adjacent subcarriers in frequency domain in an OFDM system. In NR, a plurality of subcarrier spacings are introduced, and different carriers may have different subcarrier spacings. For example, a baseline is 15 kHz. The subcarrier spacing may be 15 kHz×2n, and n is an integer of 15 kHz, 30 kHz, . . . , and 480 kHz. A larger subcarrier spacing may alternatively be supported, for example, 960 kHz, 1,920 kHz, or another value. This is not limited in this application. For example, for the subcarrier spacing, refer to Table 2.

TABLE 2

| μ | Subcarrier spacing $\Delta f = 2^\mu \cdot 15$[kHz] |
|---|---|
| 0 | 15 |
| 1 | 30 |
| 2 | 60 |
| 3 | 120 |
| 4 | 240 |
| 5 | 480 |
| 6 | 960 |
| 7 | 1,920 |

Herein, μ is used to indicate the subcarrier spacing. In a specific implementation process, a network device may indicate a value of p by using a system message or signaling, so that a terminal device determines a subcarrier spacing between carriers. For example, when μ=0, the subcarrier spacing is 15 kHz; or when μ=1, the subcarrier spacing is 30 kHz. Different subcarrier spacings correspond to different slot lengths. A subcarrier spacing of 15 kHz corresponds to a slot length of 0.5 ms, a subcarrier spacing of 60 kHz corresponds to a slot length of 0.125 ms, and the like. Correspondingly, different subcarrier spacings also correspond to different symbol lengths.

In an NR system, as shown in FIG. 1, a channel bandwidth channel bandwidth is a bandwidth of a single radio frequency carrier of a base station or UE, and is also referred to as a carrier bandwidth.

After a terminal device enters an RRC connected state or an RRC inactive state, the base station may configure, for the terminal device, a frequency domain resource range that matches a bandwidth capability of the terminal device, to ensure subsequent data transmission between the base station and the terminal device. The base station configures a channel bandwidth (or referred to as a carrier) for the terminal device by using RRC dedicated signaling. The channel bandwidth is less than or equal to the bandwidth capability of the terminal device. Different terminal devices may have different channel bandwidth configurations. The different channel bandwidth configurations include: center frequencies corresponding to channel bandwidths and/or frequency widths of channel bandwidths are different. Therefore, even if bandwidth capabilities of the different terminal devices are the same, the base station may configure different channel bandwidths for the different terminal devices.

In a general scenario, a transmission bandwidth is an available bandwidth size on a carrier corresponding to the base station or the terminal device. The transmission bandwidth is usually an available bandwidth size obtained after guard bands at the edges of two ends of the carrier is subtracted. A size of the transmission bandwidth may be represented by a quantity of resource blocks, for example, $N_{RB}$ in FIG. 1. The transmission bandwidth is usually a bandwidth configured by a network device for the terminal device or the base station. Therefore, the transmission bandwidth may also be referred to as a configured bandwidth.

In frequency domain, because a bandwidth of a single NR carrier can reach 400 MHz, a bandwidth part (BWP) is defined on a carrier, and may also be referred to as a carrier bandwidth part. The BWP includes several contiguous resource units such as resource blocks (RB) in frequency domain. The bandwidth part may be a downlink bandwidth part or an uplink bandwidth part. A base station may complete data transmission with a terminal device by using a configured bandwidth part (BWP) on a configured transmission bandwidth corresponding to the terminal device.

The bandwidth part may be a segment of contiguous resources in frequency domain. The bandwidth part may also be referred to as a subband, a subband bandwidth, a narrowband, or a narrowband bandwidth, or may have another name. A name of the bandwidth part is not limited in embodiments of this application. For brevity, in this specification, an example in which the name is the BWP is used.

Each BWP includes contiguous resource blocks (RB) in frequency domain. One RB includes 12 subcarriers. Frequency resources included in different BWPs may overlap or may not overlap.

For example, one BWP includes K (K>0) contiguous resource blocks, or includes K (K>0) contiguous subcarriers. Alternatively, one BWP is a frequency domain resource on which N non-overlapping contiguous resource blocks (RB) are located, or one BWP is a frequency domain resource on which M non-overlapping contiguous resource block groups (RBG) are located. One RBG includes P (P>0) contiguous RBs, and a subcarrier spacing (SCS) between RBs may be 15 kHz, 30 kHz, 60 kHz, 120 kHz, 240 kHz, 480 kHz, or another value, for example, an integer multiple of 2.

One BWP is related to one specific numerology, and the numerology includes a subcarrier spacing, a cyclic prefix (CP), or a subcarrier spacing and a CP. Further, the bandwidth part may alternatively be a plurality of segments of non-contiguous resources in frequency domain.

For example, the bandwidth part in this specification may be a downlink bandwidth part, and is used by the terminal device to perform downlink receiving. In this case, a bandwidth of the bandwidth part does not exceed a bandwidth receiving capability of the terminal device. Alternatively, the bandwidth part may be an uplink bandwidth part, and is used by the terminal device to perform uplink sending. In this case, a bandwidth of the bandwidth part does not exceed a bandwidth sending capability of the terminal device. The bandwidth part is a self-contained structure. For example, the terminal device does not expect to perform downlink receiving on a bandwidth other than the downlink bandwidth part, and does not expect to perform uplink sending on an uplink bandwidth other than the uplink bandwidth part.

In terms of performance, costs, and flexibility of the terminal device, the BWP may be flexibly configured on a carrier bandwidth by using a concept of the BWP, so that terminal devices having different bandwidth capabilities can be compatible. Alternatively, a size of the BWP may be flexibly configured based on a service requirement. For example, when the service requirement is relatively small, a relatively small BWP is configured, so as to reduce energy consumption of the terminal device. In an NR system, for uplink transmission or downlink transmission, a maximum of four BWPs may be configured for a terminal device on each carrier used for a cellular link. Only one BWP can be activated on one carrier at a same moment, and transmission is performed on the activated BWP. Therefore, a transmission bandwidth actually used for data transmission may also be referred to as an active transmission bandwidth or an active BWP, and corresponds to an active resource block in FIG. 1. The transmission bandwidth is usually less than or equal to a configured bandwidth.

In a wireless communications system mentioned in this application, a network device may indicate, by using control information, configuration information such as a time-frequency resource that is configured by the network device for the terminal device or the network device and that is used to transmit data. For example, the configuration information may include information such as a time-frequency resource, a modulation and coding scheme, and pilot information. Alternatively, the configuration information may be configured by the network device by using higher layer signaling, or may be notified by the network device to the terminal device by using a semi-static sidelink (SL) grant indication. Alternatively, the configuration information may be radio resource control (RRC) signaling, or may be media access control (MAC) signaling. Certainly, the configuration information may alternatively be other signaling. This is not limited herein.

Common Reference Point A

To support flexible BWP configuration, a common reference point side link A is defined in an NR system, and the common reference point side link A may correspond to an absolute frequency. A resource grid may be determined based on the point A. Therefore, a common resource block (CRB) may be determined based on the resource grid obtained through division and the point A. A location of the point A is a center of a subcarrier 0 of a $0^{th}$ common resource block CRB #0. For example, as shown in FIG. 1, an absolute frequency point at a carrier edge is used as the point A, that is, corresponds to the subcarrier #0 of the CRB #0.

Correspondingly, a terminal device may determine the point A in a plurality of manners. The following uses a manner A1 and a manner A2 as examples for description.

Manner A1: A network device sends indication information to the terminal.

The indication information indicates absolute frequency information (absoluteFrequencyPointA) corresponding to the point A. The indication information may be a system message, or may be control signaling (for example, RRC signaling). This is not limited herein.

The indication information may be obtained by the terminal device by using the signaling or the system message. The signaling may be downlink control information sent by the network device to the terminal device, so that the terminal device determines the indication information based on the downlink control information. The signaling may alternatively be higher layer RRC signaling or SIB signaling. In this way, the terminal device may determine, by using the indication information, the absolute frequency information corresponding to the point A, that is, determine a location of the point A.

Manner A2: The terminal device determines a location of the point A by using a location of an SSB and an offset between the SSB and the point A.

In an initial access phase, the terminal device needs to blindly detect, on a synchronization signal grid, a synchronization signal block (SSB) sent by a base station. The terminal device detects the SSB at a frequency location. In this case, the terminal device knows the frequency location of the SSB. The SSB includes a primary synchronization signal (PSS), a secondary synchronization signal (SSS), and a physical broadcast channel (PBCH). The PBCH carries a master information block (MIB). If the MIB further indicates configuration information of a system information block type 1 (SIB1), a network device may indicate offset information (offsetToPointA) of the SSB of the terminal relative to the point A in the SIB1. The terminal device may obtain the location of the point A based on the offset information.

It should be noted that the MIB may further indicate configuration information of a control resource set 0 (CORESET0) of a cell, or indicate configuration information of a CORESET0 and configuration information of search space (SS) associated with the CORESET0. The terminal device may obtain, by detecting the SSB, system information necessary for accessing the cell. Based on the necessary system information, the terminal device may initiate random access to the base station, to establish a data transmission connection to the base station. After establishing a data transmission channel with the base station, the terminal device may perform data transmission specific to the terminal device, including downlink data receiving and/ or uplink data sending, with the base station. That the terminal device establishes a data transmission channel with the base station may be understood as that the terminal device enters a radio resource control (RRC) connected state or an RRC inactive state.

Carrier Bandwidth Configuration

After determining a common reference location point A, a network device may configure a transmission bandwidth and a bandwidth of a BWP based on a common resource block.

The network device may indicate configuration information of a carrier bandwidth to a terminal device. Therefore, the terminal device determines, based on a location of the point A with reference to the configuration information of the carrier bandwidth that is indicated by the network device to the terminal device, a configured carrier bandwidth indicated by the network device to the terminal device.

In a possible implementation, the network device may indicate a specific location of a carrier configured for the terminal device and a configured bandwidth of the carrier by using higher layer signaling SCS-SpecificCarrier. For example, SCS-SpecificCarrier may include the following fields: a carrier offset (offsetToCarrier) field, a subcarrier spacing (subcarrierSpacing) field, and a carrier bandwidth (carrierBandwidth) field.

The carrier offset field may indicate an offset between a first available subcarrier on the carrier and the point A, and a location of a first RB on the configured bandwidth may be determined based on the carrier offset field. In a possible implementation, a carrier offset may be described by using a quantity of RBs between a first available subcarrier and the point A. A quantity of RBs on a carrier may be determined by using a subcarrier spacing corresponding to the carrier.

For example, as shown in FIG. 1, a quantity of RBs on a carrier is 12. When a carrier offset field indicates that offsetToCarrier=2, it indicates that a distance between the first available subcarrier and the point A is two RBs, which correspond to a CRB #2 in FIG. 1. The terminal device may determine the first available subcarrier on the carrier, or referred to as a lowest available subcarrier, based on the location of the point A and the carrier offset field. Therefore, the first available PRB on the carrier may be determined as the CRB #2.

A carrier bandwidth field may indicate a size of a configured bandwidth. In a possible implementation, the carrier bandwidth indicates a quantity of PRBs on a configured bandwidth. A quantity of PRBs on a carrier may be determined by using a subcarrier spacing corresponding to the carrier.

For example, locations of all available PRBs on the entire carrier may be determined based on a carrier bandwidth (carrierBandwidth) field. A size of the configured bandwidth shown in the figure is 20 PRBs. Numbers of the PRBs may be shown in the figure, including a PRB #0 to a PRB #19. A resource block of the PRB #0 corresponds to a resource block of the CRB #2.

BWP Configuration

After determining a common reference location point A, a network device may configure a bandwidth of a BWP based on a common resource block and a configured transmission bandwidth. That is, the network device may indicate configuration information of the BWP on the configured bandwidth to a terminal device. Therefore, the terminal device may determine, based on a location of the point A with reference to the configuration information of the BWP that is indicated by the network device to the terminal device, a location of the BWP and a size of the BWP that are indicated by the network device to the terminal device.

In a possible implementation, the configuration information of the BWP may be configured by using higher layer signaling BWP. The higher layer signaling may include a subcarrier spacing (subcarrierSpacing) field and a BWP location and bandwidth (locationAndBandwidth) field.

The subcarrier spacing field is used to indicate a subcarrier spacing corresponding to the BWP, and the BWP location and bandwidth field is used to indicate a location and a bandwidth of the BWP in frequency domain. The BWP location and bandwidth field corresponds to a resource indicator value (RIV).

A start location $RB_{start}$ of an RB and a size $L_{RB}$ of the RB are determined by using the resource indicator value.

For example, as shown in the figure, $RB_{start}=2$, and $L_{RB}=16$. Therefore, it may be determined that a quantity of contiguous RBs included in the BWP satisfies: $N_{BWP}^{size}=L_{RB}$. For example, as shown in the figure, $L_{RB}=16$. Therefore, the quantity of contiguous RBs included in the BWP is 16.

$N_{BWP}^{start}$ With reference to information about the configured bandwidth and the configuration information of the BWP, it may be uniquely determined that a start RB index on the BWP satisfies:

$$N_{BWP}^{start}N_{BWP}^{start}=O_{carrier}+RB_{start},$$

$N_{BWP}^{start}$ where $O_{carrier}$ is determined by a carrier offset. As shown in the figure, the carrier offset is 2. With reference to the fact that $RB_{start}=2$, it may be determined that =4. That is, a start resource block on the BWP is a CRB #4, and the size of the BWP is 16.

In conclusion, to obtain resource grid information and resource configuration information, the terminal device needs to complete the following steps.

Step 1: Obtain location information of the point A based on the system message or the RRC signaling.

Step 2: Obtain the information about the configured bandwidth based on configuration information of the carrier, that is, a location and a bandwidth size of the configured bandwidth in frequency domain.

Step 3: Obtain information about the location and bandwidth of the BWP in frequency domain based on the configuration information of the BWP.

According to the foregoing three steps, the terminal device may learn of a division manner, a location, and bandwidth information of a resource in each dimension.

The reference point A defined in the foregoing resource division solution is a common reference point for each carrier. Therefore, a common resource block on each carrier is determined, and resource division is performed based on the common resource block on each carrier. Then, a configured bandwidth of the carrier is defined based on the common resource block on each carrier, and a BWP is further defined on the configured bandwidth of the carrier. Therefore, resource scheduling is implemented on the BWP.

This application provides a communications method, to divide a resource and configure a BWP, so as to implement cross-carrier configuration of the BWP. For example, in an ultra-high bandwidth scenario, especially in a high-frequency scenario, even if a configured bandwidth of a single radio frequency carrier is limited because a bandwidth of the single radio frequency carrier is limited by a device capability constraint, the method in embodiments of this application may provide a special design, to configure some or all bandwidths of one or more carriers included in the BWP. It may be understood that the BWP in embodiments of this application is not only a bandwidth part on a carrier, but also a bandwidth part obtained after a plurality of carriers are aggregated. In view of this, it should be noted that the term BWP mentioned below is only used to indicate a bandwidth part used for resource scheduling. The BWP is configured in a new configuration manner. It may be understood that, with continuous evolution of a communications system, the term may change, which is not intended to limit this application.

The technical solutions provided in embodiments of this application may be applied to a 5G system, or may be applied to a future communications system or another similar communications system. In addition, the technical solutions provided in embodiments of this application may be applied to a cellular link, or may be applied to a link between devices, for example, a device-to-device (D2D) link.

Figure 2A:
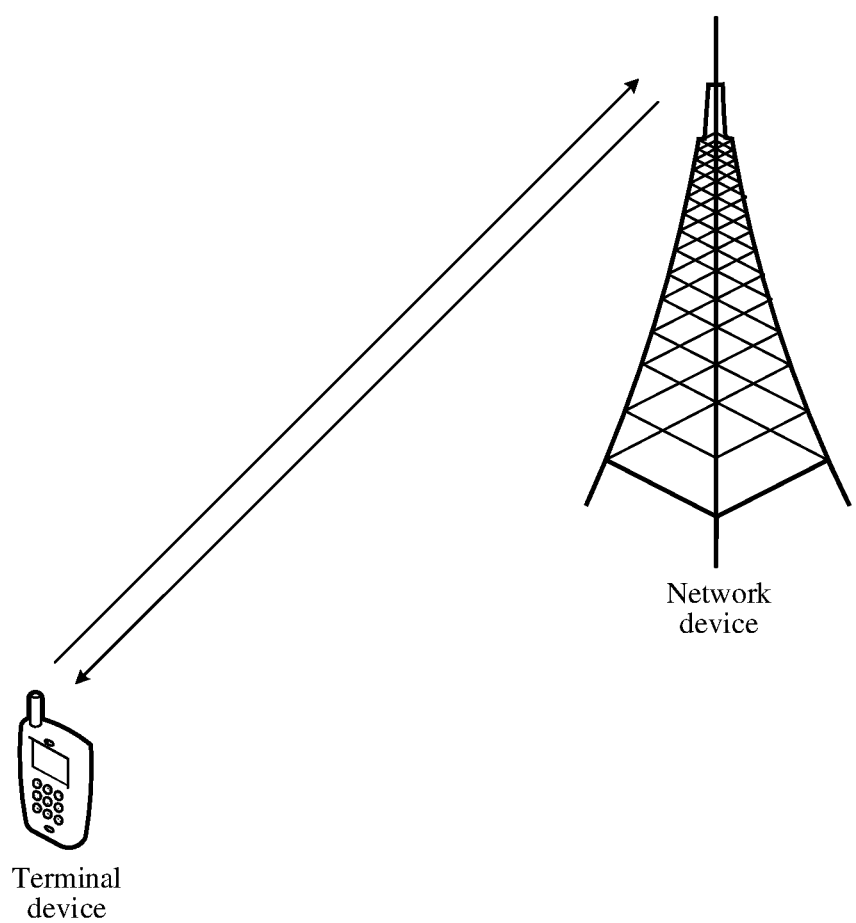
FIG. 2A to FIG. 2C are schematic diagrams of a network architecture according to an embodiment of this application.

The following describes a network architecture used in embodiments of this application. FIG. 2A shows a network architecture to which an embodiment of this application is applied. FIG. 2A includes a network device and a terminal device, and the terminal device is connected to one network device. Certainly, a quantity of terminal devices in FIG. 2A is merely an example. In actual application, the network device may provide services for a plurality of terminal devices.

The network device in FIG. 2A may be a network-side entity configured to transmit or receive a signal. For example, the network device includes an access network (AN) device, for example, a base station (for example, an access point), and may be a device that communicates with a wireless terminal device over an air interface in an access network by using one or more cells. The network device may be configured to perform mutual conversion between a received over-the-air frame and an internet protocol (IP) packet, to serve as a router between the terminal device and the rest of the access network. The rest of the access network may include an IP network. The network device may further coordinate attribute management of the air interface. For example, the network device may include an evolved NodeB (NodeB, eNB, or e-NodeB, evolved NodeB) in a long term evolution (LTE) system or an evolved LTE (LTE-Advanced, LTE-A) system, or may include a next generation NodeB (gNB) in an NR system, or may include a central unit (CU) and a distributed unit (DU) in a cloud radio access network (CloudRAN) system. This is not limited in this embodiment of this application. The access network device corresponds to different devices in different systems. For example, the access network device may correspond to an eNB in a 4th generation (4G) system, and correspond to a 5G access network device, such as a gNB, in a 5G system.

The terminal device in FIG. 2A may be a user-side entity configured to receive or transmit a signal. The terminal device includes a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile console, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, or a smart wearable device. For example, the terminal device may be a device such as a personal communications service (PCS) phone, a cordless phone, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner. By way of example, and not limitation, in this embodiment of this application, the terminal device may alternatively be a vehicle-mounted terminal device or a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that are dedicated to only one type of application function and need to collaboratively work with other devices such as smartphones, for example, various smart bands, smart helmets, or smart jewelry for monitoring physical signs.

Figure 2B:
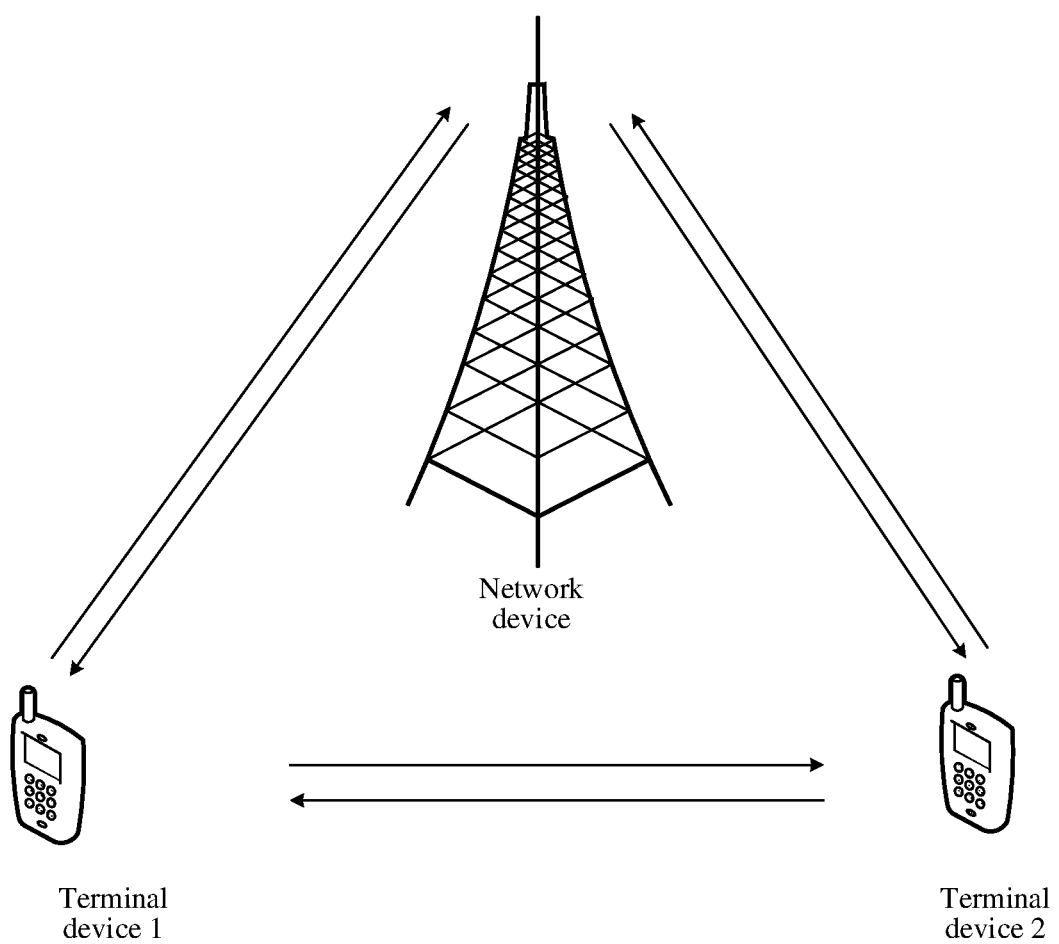

FIG. 2B shows another network architecture to which an embodiment of this application is applied. FIG. 2B includes a network device and two terminal devices: a terminal device 1 and a terminal device 2. Both the two terminal devices may be connected to the network device. In addition, the two terminal devices may also communicate with each other by using a sidelink. Certainly, a quantity of terminal devices in FIG. 2B is merely an example. In actual application, the network device may provide services for a plurality of terminal devices. The network device in FIG. 2B is, for example, an access network device such as a base station. The access network device corresponds to different devices in different systems. For example, the access network device may correspond to an eNB in a 4G system, and correspond to an access network device such as a gNB in a 5G system. Both the terminal device in FIG. 2A and the terminal device in FIG. 2B are, for example, vehicle-mounted terminal devices. However, the terminal device in embodiments of this application is not limited thereto.

Figure 2C:
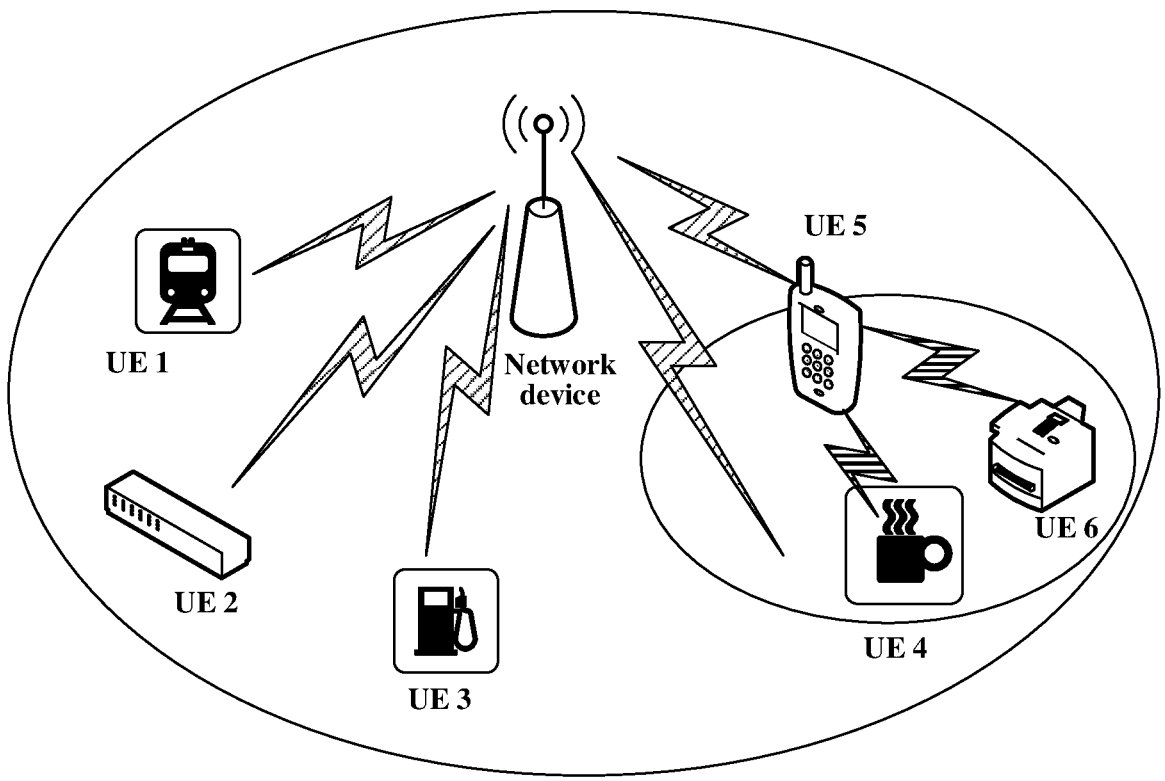

FIG. 2C shows a communications system to which an embodiment of this application is applied. The communications system includes a network device (for example, a base station) and terminal devices UE 1 to UE 6. The UE 1 to the UE 6 may send uplink data to the base station, and the base station needs to receive the uplink data sent by the UE 1 to the UE 6. The base station may also send downlink data to the UE 1 to the UE 6, and the UE 1 to the UE 6 need to send HARQ feedback of the downlink data to the base station. In addition, the UE 4 to the UE 6 may also form a communications system. In the communications system, the UE 5 may also send information to the UE 4 and the UE 6, and the UE 4 and the UE 6 may also send information to the UE 5.

The technical solutions provided in embodiments of this application are described below in detail with reference to the accompanying drawings.

An embodiment of this application provides a communications method. In the following description process, an example in which the method is applied to the network architectures shown in FIG. 2A to FIG. 2C is used. In addition, the method may be performed by two communications apparatuses. The two communications apparatuses are, for example, a first communications apparatus and a second communications apparatus. The first communications apparatus may be a network device or a communications apparatus that can support the network device in implementing a function required in the method. Alternatively, the first communications apparatus may be a terminal device or a communications apparatus that can support the terminal device in implementing a function required in the method. Certainly, the first communications apparatus may alternatively be another communications apparatus, for example, a chip system. Similarly, the second communications apparatus may be a network device or a communications apparatus that can support the network device in implementing a function required in the method. Alternatively, the second communications apparatus may be a terminal device or a communications apparatus that can support the terminal device in implementing a function required in the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device. Alternatively, both the first communications apparatus and the second communications apparatus are network devices. Alternatively, both the first communications apparatus and the second communications apparatus are terminal devices. Alternatively, the first communications apparatus is a network device, and the second communications apparatus is a communications apparatus that can support a terminal device in implementing a function required in the method. The network device is, for example, a base station.

Figure 3A:
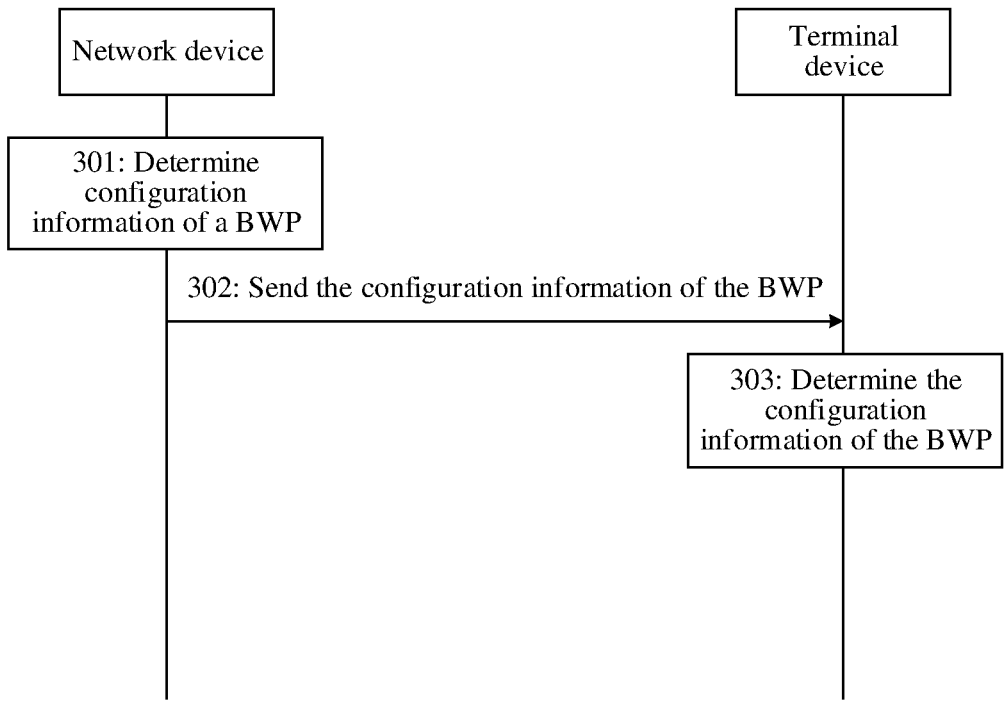
FIG. 3A is a schematic flowchart of a communications method according to an embodiment of this application.

For ease of description, an example in which the method is performed by a network device and a terminal device is used below, that is, an example in which the first communications apparatus is a network device and the second communications apparatus is a terminal device. FIG. 3A is a flowchart of the method. In this embodiment, the network architecture shown in FIG. 2A or FIG. 2B is used as an example. Therefore, if this embodiment is applied to the network architecture shown in FIG. 2A, the following network device may be the network device in the network architecture shown in FIG. 2A, and the following terminal device may be the terminal device in the network architecture shown in FIG. 2A. Alternatively, if this embodiment is applied to the network architecture shown in FIG. 2B, the following network device may be the network device in the network architecture shown in FIG. 2B, and the following terminal device may be the terminal device 1 or the terminal device 2 in the network architecture shown in FIG. 2B. The method specifically includes the following steps.

Step 301: The network device determines configuration information of a BWP.

It should be noted that the configuration information of the BWP may be used to configure a BWP for the terminal device, or may be used to configure a BWP for the network device. This is not limited herein.

The BWP includes at least one resource block, and the at least one resource block is located on at least one carrier. In other words, the BWP may be on one carrier, or may span a plurality of carriers. Location information of different carriers in a system is determined based on a reference frequency domain location, and the configuration information of the BWP is used to indicate a location of the at least one resource block based on the reference frequency domain location.

Step 302: The network device sends the configuration information of the BWP.

Correspondingly, the terminal device receives the configuration information of the BWP.

The configuration information of the BWP may be obtained by the terminal device by using signaling or a system message. The signaling may be downlink control information sent by the network device to the terminal device, so that the terminal device determines the configuration information of the BWP based on the downlink control information. The signaling may alternatively be higher layer RRC signaling or SIB signaling. Therefore, the terminal device may determine, by using the configuration information of the BWP, a BWP configured by the network device for the terminal device, to perform communication by using the BWP. Alternatively, the terminal device may determine a BWP for the network device by using the configuration information of the BWP, to perform communication with the network device by using the BWP.

Step 303: The terminal device determines the configuration information of the BWP.

In this embodiment, an ultra-high bandwidth may be implemented by aggregating a plurality of radio frequency carriers. To implement aggregation of the plurality of radio frequency carriers, unified resource configuration may be performed on the plurality of carriers. For example, a same resource grid is set for the aggregated carriers. That is, the location information of the different carriers in the system is determined based on the reference frequency domain location. Therefore, in this embodiment of this application, resource division is performed, based on a same reference frequency domain location (point A'), on the carriers that need to be aggregated, and then the BWP is configured by using the reference frequency domain location as a reference point.

Figure 3B:
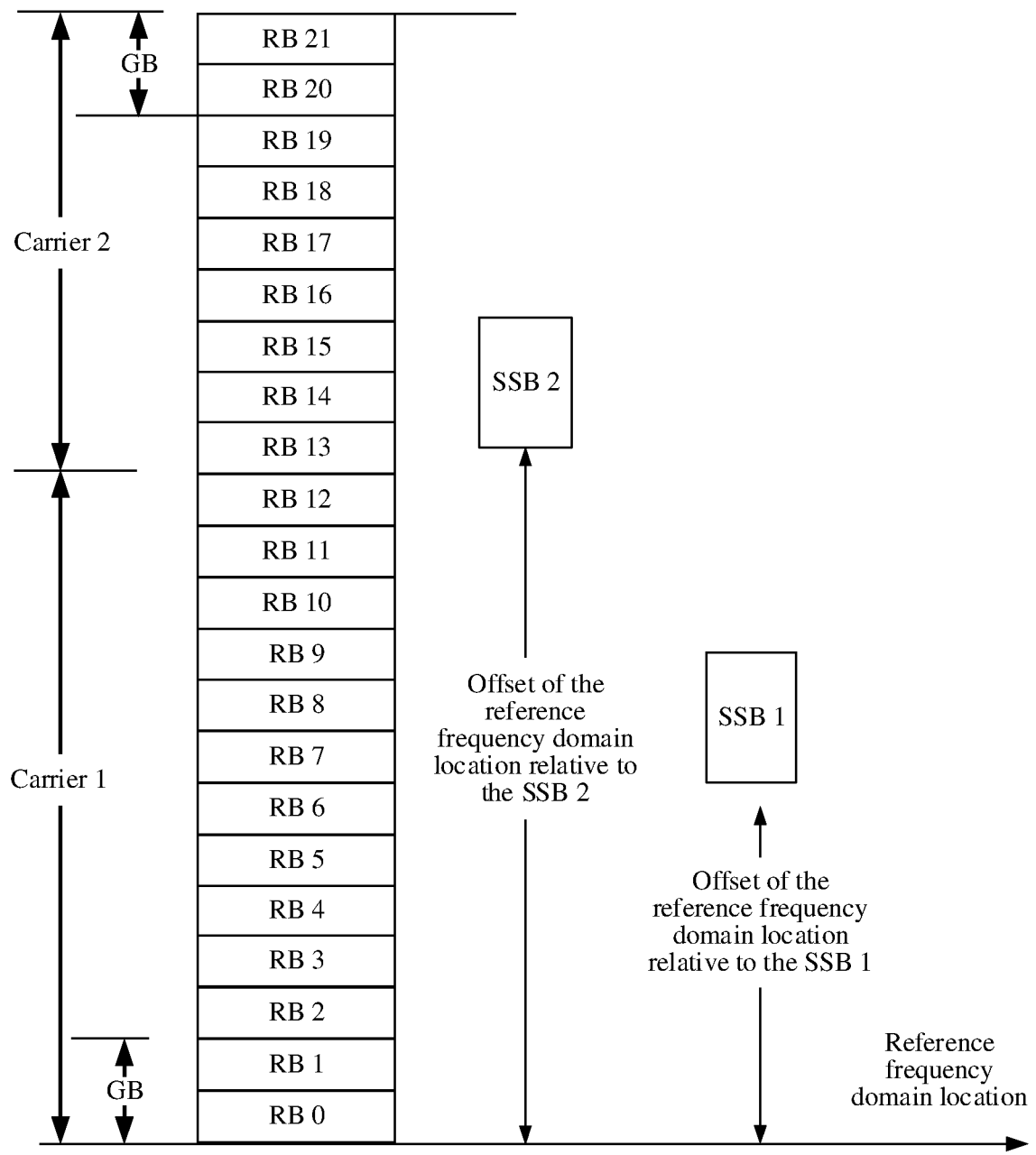

For example, carriers that may be aggregated are a carrier 1 and a carrier 2. As shown in FIG. 3B, the carrier 1 and the carrier 2 use a same reference frequency domain location as a reference frequency to define a resource block, and the carrier 1 and the carrier 2 use a same resource grid. That is, RB definitions are the same for the carrier 1 and the carrier 2. Regardless of whether the carrier 1 or the carrier 2 is used, a center frequency of a first subcarrier (a subcarrier #0) of an RB #0 is the reference frequency domain location point A' in the figure. Similarly, a same resource block RB grid may be determined by performing resource division for the same reference frequency domain location point A'. It may be understood that, in some scenarios, a resource block determined based on the reference frequency domain location is also referred to as a common resource block CRB. That is, when no conflict occurs, the RB in this application may be understood as the CRB. A configured bandwidth of each carrier may be further configured based on the reference frequency domain location. For example, a resource block number range on the carrier 1 may be an RB #0 to an RB #12, and a resource block number range on the carrier 2 may be an RB #13 to an RB #21. In this way, a BWP configuration is decoupled from a carrier configuration.

In a possible scenario, the BWP includes at least one resource block on one carrier. For example, the carrier is the carrier 2. In this case, a reference frequency domain location of the carrier 2 is the same as a reference frequency domain location of the carrier 1. Therefore, the BWP configured by the network device may be location information that is of at least one resource block on the carrier 2 and that is determined based on the reference frequency domain location. For example, if it is determined that the at least one resource block included in the BWP is a third resource block and a fourth resource block on the carrier 2, the configuration information of the BWP may be indicated based on locations of the third resource block and the fourth resource block on the carrier 2 relative to the reference frequency domain location. For example, by using a number of a common resource block determined based on the reference frequency domain location as an example, it may be determined that the third resource block on the carrier 2 is the RB #15, and the fourth resource block on the carrier 2 is the RB #16. Therefore, the configuration information of the BWP may be used to indicate that the BWP includes the resource blocks RB #15 and the RB #16.

In another possible scenario, the BWP includes one resource block on the carrier 1 and one resource block on the carrier 2. In this case, a reference frequency domain location of the carrier 1 is the same as a reference frequency domain location of the carrier 2. Therefore, the BWP configured by the network device may be one resource block on the carrier 1 and one resource block on the carrier 2 that are determined based on the reference frequency domain location. For example, by using a number of a resource block determined based on the reference frequency domain location as an example, it may be determined that one resource block on the carrier 1 is the RB #10, and one resource block on the carrier 2 is the RB #13. Therefore, the configuration information of the BWP may be used to indicate that the BWP includes the resource blocks RB #10 and the RB #13.

It can be learned from the foregoing examples that, in different BWP configuration manners, there is no need to first determine a configured bandwidth of the carrier and then configure the BWP on the configured bandwidth of the carrier, but the configuration information of the BWP may be directly determined based on the reference frequency domain location. This improves BWP configuration flexibility, and reduces BWP configuration complexity and possible signaling overheads during resource scheduling.

Before determining the configuration information of the BWP, the network device may indicate the reference frequency domain location point A' by using the system message or the RRC signaling. In this embodiment of this application, in a possible implementation, signaling is set for the reference frequency domain location, to indicate the reference frequency domain location. The reference frequency domain location is used to classify resource grids of a plurality of carriers for carrier aggregation. That is, the signaling may be used to indicate the reference frequency domain location and the plurality of carriers. In another possible implementation, with reference to an indication manner of a common reference point A on a carrier, a common reference point may be indicated for each of a plurality of carriers used for carrier aggregation, and the common reference point is the reference frequency domain location. The following uses a manner B1 and a manner B2 as examples for description.

Manner B1: Configure absolute frequency information of the reference frequency domain location for each carrier.

For example, an absolute frequency of the point A (absoluteFrequencyPointA) may be configured as absolute frequency information of the reference frequency domain location for the carrier 1, and an absolute frequency of the point A (absoluteFrequencyPointA) may be configured as absolute frequency information of the reference frequency domain location for the carrier 2.

Manner B2: Configure corresponding offsets (offsetToPointA) for different carriers, where the offsets are relative to SSBs corresponding to the carriers, for example, may be start subcarriers of the carriers and start subcarriers of the SSBs.

In this way, after SSBs corresponding to different carriers are correspondingly offset, the point A is determined, and the point A is used as the reference frequency domain location.

For example, as shown in FIG. 3B, the carrier 1 may indicate an offset offsetToPointA1 of the carrier 1 by using an SSB 1. Therefore, after receiving offsetToPointA1 on a SIB 1 on the SSB 1 corresponding to the carrier 1, the terminal device may determine the reference frequency domain location based on locations of offsetToPointA1 and the SSB 1.

The carrier 2 may indicate an offset offsetToPointA2 of the carrier 2 by using an SSB 2. Therefore, after receiving offsetToPointA2 on a SIB 2 on the SSB 2 corresponding to the carrier 2, the terminal device may determine the reference frequency domain location based on locations of offsetToPointA2 and the SSB 2.

According to the foregoing method, a plurality of carriers used for carrier aggregation can correspond to a same reference frequency domain location, so that resource rasters of the plurality of carriers used for carrier aggregation are the same. This helps subsequent uniform BWP configuration.

In the manner B2, an upper limit of a value range of an offset offsetToPointA corresponding to the plurality of aggregated carriers may be greater than 2,199. For example, the value range of the offset offsetToPointA is 0 to 4,399, or the value range of the offset offsetToPointA is 0 to 8,799. In this way, aggregation of a plurality of carriers in an ultra-high bandwidth scenario can be supported, so as to ensure that the plurality of carriers correspond to a same reference frequency domain location.

In step 301, the network device may indicate a resource location and a bandwidth size of the BWP based on the reference frequency domain location point A', so as to configure the BWP. Specifically, the configuration information of the BWP may be implemented in a plurality of manners. The following uses manners C1 to C4 as examples for description.

Manner C1: The at least one resource block on the BWP is contiguous. In this case, the configuration information of the BWP includes an offset of a start resource block on the BWP relative to the reference frequency domain location and a quantity of the at least one resource block.

In a possible implementation, in the manner C1, configuration information of a BWP in NR R15 may be reused as the configuration information of the BWP in this application. That is, a start resource block index $RB_{start}$ and a quantity $L_{RB}$ of resource blocks on the BWP may be indicated by using an RIV value in a location and bandwidth (locationAndBandwidth) field of the BWP. The start resource block index $RB_{start}$ of the BWP is a start resource block index value determined based on the reference frequency domain location.

Figure 3C:
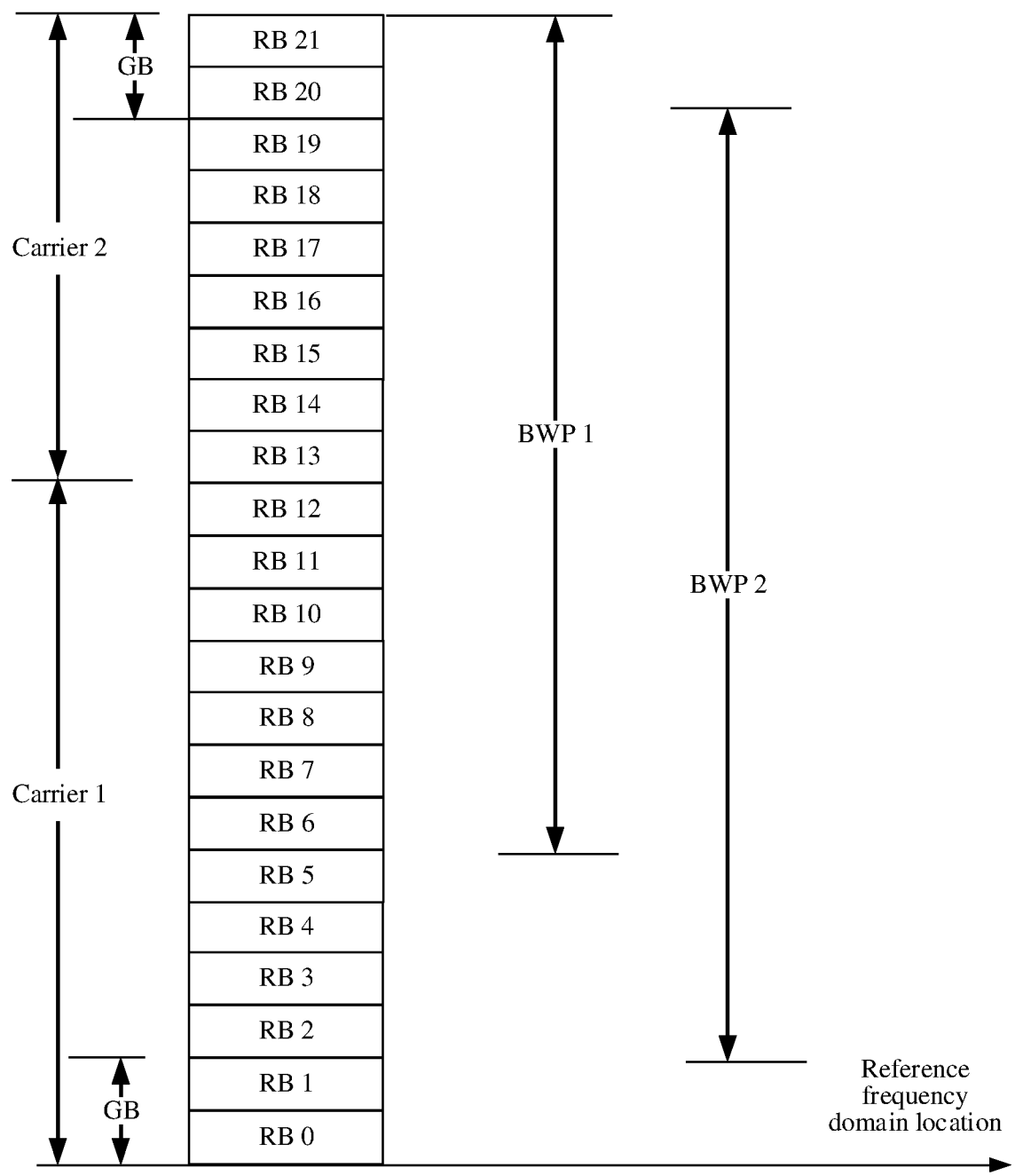

For example, as shown in FIG. 3C, the network device may directly indicate, by using the location and bandwidth (locationAndBandwidth) field of the BWP, that a start RB index on a BWP 1 is that $RB_{start}$=6 and a quantity of resource blocks on the BWP 1 is that $L_{RB}$=16. The network device may directly indicate, by using the location and bandwidth (locationAndBandwidth) field of the BWP, that a start RB index on a BWP 2 is that $RB_{start}$=2 and a quantity of resource blocks on the BWP 2 is that $L_{RB}$=18.

The start RB index indicated in the configuration information of the BWP is determined based on the reference frequency domain location, and the quantity $L_{RB}$ of resource blocks is also based on the complete BWP. Therefore, in the manner C1, although an indication manner of the configuration information of the BWP in NR R15 is reused, BWP configuration is not limited to the carrier in the manner C1. The configuration information of the BWP indicates all resource blocks included in the BWP, and an upper limit of a value range of a bandwidth field corresponding to the BWP is greater than an upper limit of a quantity of resource blocks included in a carrier bandwidth, for example, greater than 275.

In another possible implementation, in the manner C1, new signaling may be further used to indicate the offset of the start resource block on the BWP relative to the reference frequency domain location and the quantity of the at least one resource block. For example, a BWP 1 is used as an example. The signaling may separately indicate a start RB index on the BWP 1 and a quantity of resource blocks on the BWP 1. The signaling may be specifically RRC signaling, DCI, or a system message. This is not limited in this application.

It should be noted that an offset of a center resource block on the BWP relative to the reference frequency domain location or an offset of an end resource block on the BWP relative to the reference frequency domain location may be further set in the configuration information of the BWP. A specific setting manner may be set based on an actual requirement. In the manner C1, the offset of the start resource block on the BWP relative to the reference frequency domain location is merely used as an example for description.

Manner C2: The at least one resource block on the BWP is contiguous in segments. For example, the BWP includes N resource block sets, resource blocks in each of the N resource block sets are contiguous, and the configuration information of the BWP includes an offset of a start resource block in the resource block set relative to the reference frequency domain location and a quantity of resource blocks in each of the N resource block sets, where N is a positive integer. Therefore, in a possible implementation, a resource location and a bandwidth size of the BWP may be indicated in segments.

In a possible implementation, in the manner C2, the configuration information of the BWP in this application may include N fields of the configuration information of the BWP corresponding to NR R15. That is, an RIV value in a location and bandwidth (locationAndBandwidth) field of the BWP may be used to indicate a start resource block index $RB_{start}$ of a resource block set and a quantity $L_{RB}$ of resource blocks in the resource block set on the BWP. A start resource block index $RB_{start}$ of each of the N resource block sets is a start resource block index value determined based on the reference frequency domain location.

Figure 3D:
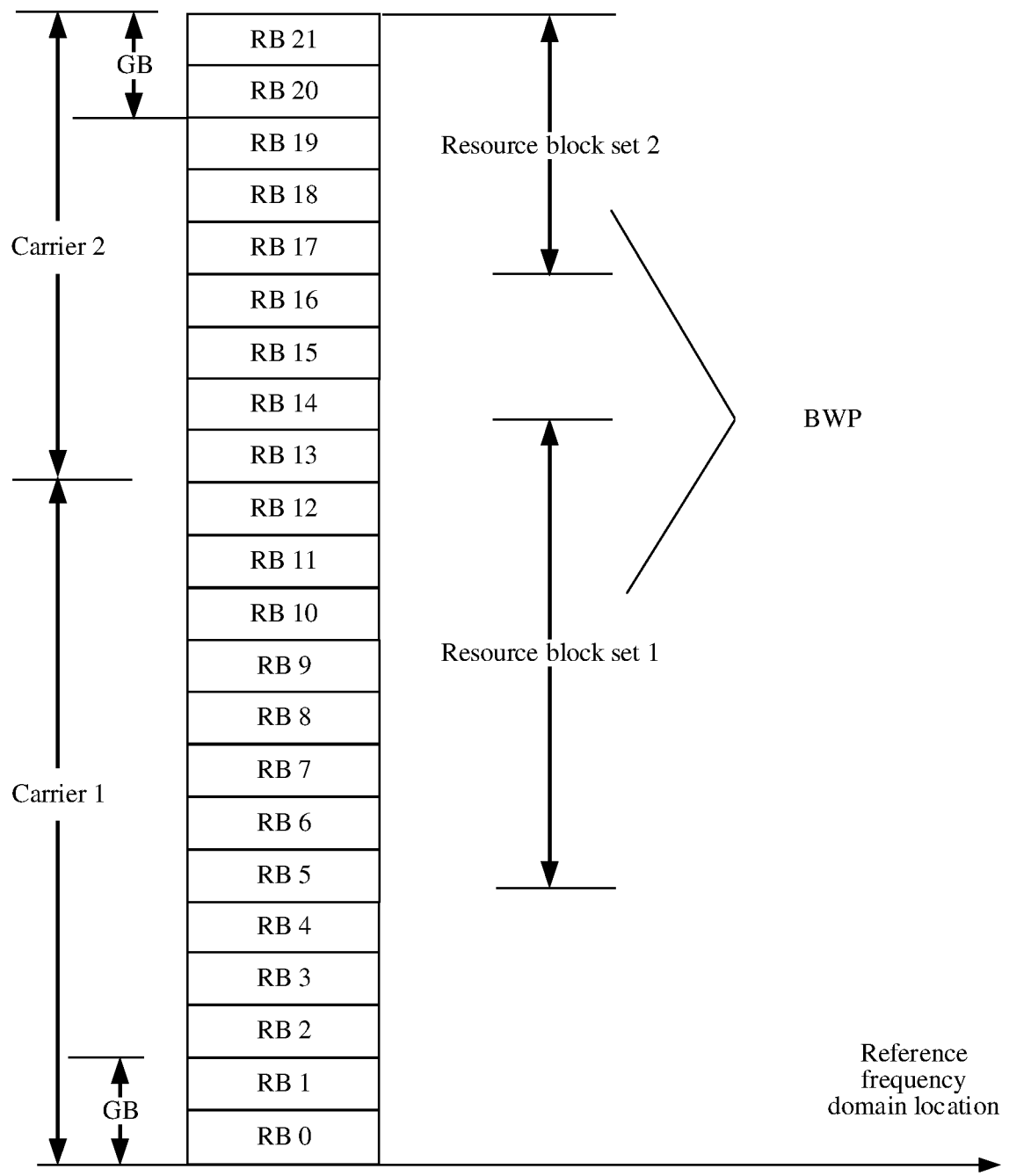

For example, as shown in FIG. 3D, an example in which N is 2 and the BWP includes a resource block set 1 and a resource block set 2 is used. A start resource block index $RB_{start}$ of the resource block set 1 is determined based on the reference frequency domain location, that is $RB_{start,1}$=5, and a start resource block index $RB_{start}$ of the resource block set 2 is determined based on the reference frequency domain location, that is, $RB_{start,2}$=17. A quantity $L_{RB,1}$ of resource blocks included in the resource block set 1 is equal to 9, and a quantity $L_{RB,2}$ of resource blocks included in the resource block set 2 is equal to 5. Therefore, the configuration information of the BWP may include a location and bandwidth field 1 (locationAndBandwidth1) of the BWP and a location and bandwidth field 2 (locationAndBandwidth2) of the BWP. Herein, locationAndBandwidth1 is used to indicate the start resource block index $RB_{start,1}$ of the resource block set 1 and the quantity $L_{RB,1}$ of resource blocks included in the resource block set 1, and locationAndBandwidth2 is used to indicate the start resource block index $RB_{start,2}$ of the resource block set 2 and the quantity $L_{RB,2}$ of resource blocks included in the resource block set 2.

Therefore, the terminal device may determine $RB_{start,1}$ $L_{RB,1}$ and $RB_{start,2}$ $L_{RB,2}$ based on the configuration information of the BWP. In this way, the terminal device may obtain a resource location and a bandwidth size of the resource block set 1 on the BWP based on $RB_{start,1}$ $L_{RB,1}$, and the terminal device may obtain a resource location and a bandwidth size of the resource block set 2 on the BWP based on $RB_{start,2}$ $L_{RB,2}$.

According to the foregoing method, the non-contiguous resources on the BWP can be indicated with reference to an existing manner of the configuration information of the BWP. The configuration information of the BWP indicates a resource block set, which is not limited to a manner in which the configuration information of the BWP indicates contiguous resource blocks on the carrier. This improves flexibility of the configuration information of the BWP.

In another possible implementation, in the manner C2, new signaling may be further used to indicate the offset of the start resource block in each of the N resource block sets on the BWP relative to the reference frequency domain location and the quantity of resource blocks in each of the N resource block sets. For example, the BWP includes two resource sets. The signaling may separately indicate a start RB index in a resource set 1, a quantity of resource blocks in the resource set 1, a start RB index in a resource set 2, and a quantity of resource blocks in the resource set 2.

Further, it is considered that quantities of resource blocks in the N resource sets may be the same, or quantities of resource blocks in some resource sets may be the same. Therefore, in the signaling, for resource sets with a same quantity of resource blocks, a quantity of resource blocks included in one resource block set may be indicated. For example, the BWP includes two resource sets. A quantity of resource blocks in a resource set 1 is the same as a quantity of resource blocks in a resource set 2. The signaling may indicate a start RB index in the resource set 1, a start RB index in the resource set 2, and the quantity of resource blocks in the resource set. This saves signaling overheads. The signaling may be specifically RRC signaling, DCI, or a system message. This is not limited in this application.

It should be noted that, in the configuration information of the BWP, the offset of the start resource block in each of the N resource sets relative to the reference frequency domain location may alternatively be replaced with an offset of a center resource block in each of the N resource sets relative to the reference frequency domain location or an offset of an end resource block in each of the N resource sets relative to the reference frequency domain location. A specific setting manner may be set based on an actual requirement. In the manner C2, the offset of the start resource block in each of the N resource sets relative to the reference frequency domain location is merely used as an example for description.

Manner C3: The configuration information of the BWP is a bitmap, where a start bit in the bitmap indicates a resource block corresponding to the reference frequency domain location.

Specifically, each bit in the bitmap corresponds to one of the at least one resource block, and the bit is used to indicate whether the corresponding resource block belongs to the BWP. For example, if a value of the bit is "o", it indicates that the corresponding resource block does not belong to the BWP; or if a value of the bit is "1", it indicates that the corresponding resource block belongs to the BWP. Alternatively, if a value of the bit is "1", it indicates that the corresponding resource block does not belong to the BWP; or if a value of the bit is "0", it indicates that the corresponding resource block belongs to the BWP.

Therefore, a location of each resource block on the BWP relative to the reference frequency domain location is indicated by using the bitmap.

For example, with reference to FIG. 3B, as shown in (a) in FIG. 3E, each bit corresponds to one RB in FIG. 3B. A first bit in the bitmap is used to indicate a first RB relative to the reference frequency domain location, that is, an RB #0. An $i^{th}$ bit in the bitmap is used to indicate an $i^{th}$ RB relative to the reference frequency domain location, that is, an RB #(i−1), and a $16^{th}$ bit in the bitmap is used to indicate whether a $16^{th}$ RB corresponding to the reference frequency domain location belongs to the BWP, that is, an RB #15. Herein, i may be any bit in the bitmap. A range of i is related to a size of the bitmap.

For example, it is assumed that a total quantity of RBs on a plurality of carriers used for carrier aggregation is 100 in the system. In this case, a 100-bit bitmap may be used to indicate resource locations of BWPs on the plurality of carriers used for carrier aggregation. For example, if the first five bits in the bitmap are "10100", it indicates that the resource blocks included in the BWP include the first RB relative to the reference frequency domain location and a third RB relative to the reference frequency domain location. That is, it indicates that the BWP includes the RB #0 and an RB #2.

According to the indication of the bitmap, the terminal device may determine indexes of all RBs included in the BWP, to determine the location of each resource block on the BWP. For example, with reference to FIG. 3B, a bitmap corresponding to the BWP 1 may be shown in (b) in FIG. 3E, and a bitmap corresponding to the BWP 2 may be shown in (c) in FIG. 3E.

According to the foregoing method, the location of the resource block on the BWP relative to the reference frequency domain location can be indicated, which is not limited to a manner in which the configuration information of the BWP indicates contiguous resource blocks on the carrier. This improves flexibility of the configuration information of the BWP.

Manner C4: The BWP includes M resource block subsets, each resource block subset includes a plurality of resource blocks, the configuration information of the BWP is a bitmap, and a start bit in the bitmap indicates a resource block subset corresponding to the reference frequency domain location.

Each bit in the bitmap corresponds to one of the M resource block subsets, and the bit is used to indicate whether the corresponding resource block subset belongs to the BWP, where M is a positive integer.

Therefore, a location of each resource block subset on the BWP relative to the reference frequency domain location is indicated by using the bitmap.

Each bit corresponds to one resource block subset (which may also be referred to as one group of RBs, an RB group, or an RB set), each resource block subset includes a plurality of resource blocks, and quantities of resource blocks included in all resource block subsets may be the same or different. In a possible implementation, to save signaling sending and avoid indicating a quantity of resource blocks in each resource block subset, it may be set that quantities of resource blocks included in all resource block subsets are the same. For example, with reference to FIG. 3B, as shown in (a) in FIG. 3F, it indicates that each bit in the bitmap is used to indicate whether a resource block subset belongs to the BWP. A resource block included in each resource block subset may be a resource block in FIG. 3B. For example, a quantity of resource blocks included in each resource block subset is 2. In this case, a ninth bit correspondingly indicates whether a tenth resource block subset (RB 16 and RB 17) including a $17^{th}$ resource block and an $18^{th}$ resource block belongs to the BWP. A bitmap corresponding to the BWP 1 may be shown in (b) in FIG. 3F, and a bitmap corresponding to the BWP 2 may be shown in (c) in FIG. 3F.

In another possible implementation, another bitmap may be used to indicate a quantity of resource blocks included in each resource block subset.

For example, quantities of resource blocks included in all resource block subsets are the same. A bit in the bitmap is used to indicate each of the M resource block subsets. For example, if a bit is "1", it indicates that a resource block subset corresponding to the bit belongs to the BWP. The terminal device may determine, according to the indication of the bitmap, indexes of all resource block subsets included in the BWP, and further determine a location of a resource block in a resource block subset indicated by an index in the resource block subset, for example, a location of a start resource block in the resource block subset indicated by the index in the resource block subset, a location of a middle resource block in the resource block subset indicated by the index in the resource block subset, or a location of a last resource block in the resource block subset indicated by the index in the resource block subset. Then, locations of all resource blocks in the BWP are determined based on a quantity of resource blocks included in the resource block subset.

According to the configuration of the BWP in this embodiment of this application, when the network device performs resource scheduling, because the BWP covers all or some resources on one or more carriers, the network device may perform flexible resource scheduling on the entire BWP, and does not need to perform scheduling for each carrier. This can reduce scheduling complexity, and effectively reduce signaling overheads. In this way, when obtaining the configuration information of the BWP, the terminal does not need to perform understanding with reference to carrier configuration information.

In this embodiment of this application, the BWP includes some or all resource blocks on one or more radio frequency carriers. In some scenarios, when a signal is sent only on resource blocks on some radio frequency carriers on the BWP, to avoid interference to another system deployed on a neighboring carrier, a guard band needs to be reserved.

Figure 4A:
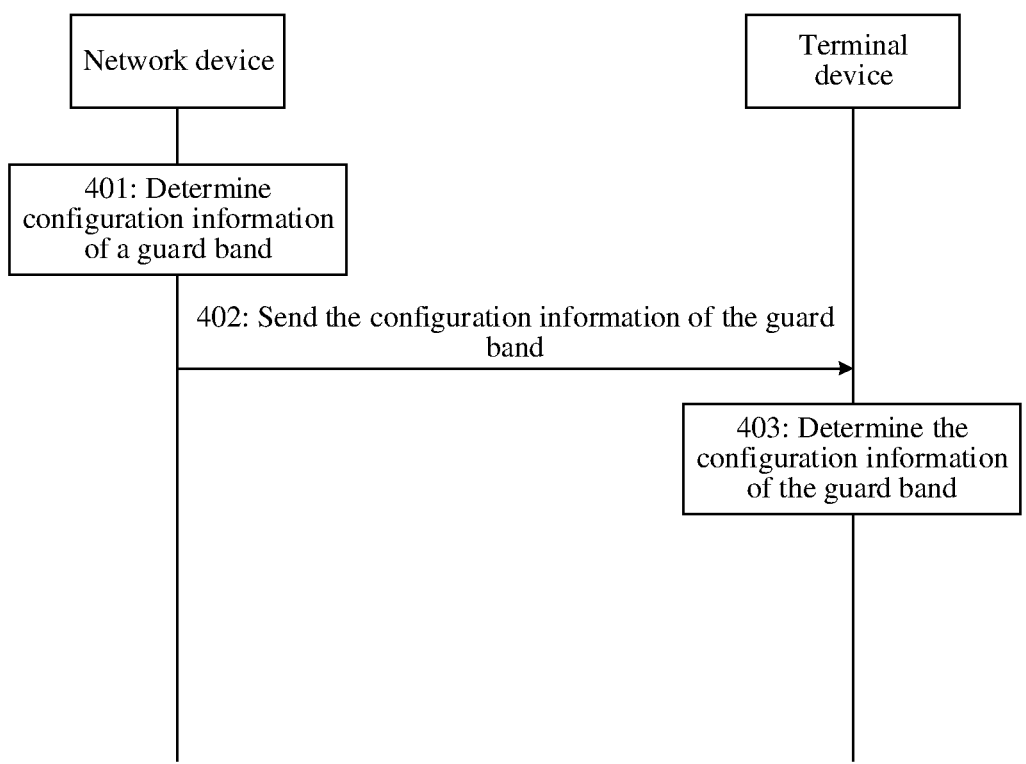
FIG. 4A is a schematic flowchart of a communications method according to an embodiment of this application.

An embodiment provides a communications method, as shown in FIG. 4A, to implement dynamic configuration of a guard band between neighboring carriers on a BWP. The method includes the following steps.

Step 401: A network device determines configuration information of a guard band.

The guard band is located on a BWP, the BWP includes at least one resource block, the at least one resource block is located on at least one carrier, and location information of different carriers in a system is determined based on a reference frequency domain location.

Step 402: The network device sends the configuration information of the guard band.

The configuration information of the guard band is used to indicate a location of the guard band on the BWP.

Correspondingly, a terminal device receives the configuration information of the guard band.

The configuration information of the guard band may be obtained by the terminal device by using configured signaling or preconfigured signaling; or the configuration information of the guard band is information configured in a resource pool. The configured signaling may be downlink control information sent by the network device to the terminal device, so that the terminal device determines the configuration information of the guard band based on the downlink control information. Alternatively, the configured signaling may be preconfigured by using higher layer RRC signaling, or may be preconfigured by the network device in the resource pool of the terminal device. Therefore, the terminal device may determine, by using the configuration information of the guard band, an available resource block on the BWP that is configured by the network device for the terminal device.

Optionally, the network device indicates configuration information of the BWP and the configuration information of the guard band in a combined indication manner. For details, refer to step 302. This reduces signaling overheads. Certainly, in a specific implementation process, the configuration information of the BWP and the configuration information of the guard band may be separately sent, and a sending manner may be determined based on an actual requirement. This is not limited herein.

Step 403: The terminal device determines the configuration information of the guard band.

In this embodiment of this application, the configuration information of the guard band may be determined in a plurality of manners. The following uses a manner D and a manner E as examples for description.

Manner D: The configuration information of the guard band is determined based on a location of a resource block on the BWP relative to a start resource block on the BWP, so that the configuration information of the guard band is used to indicate a location of the guard band relative to the start resource block on the BWP.

Figure 4B:
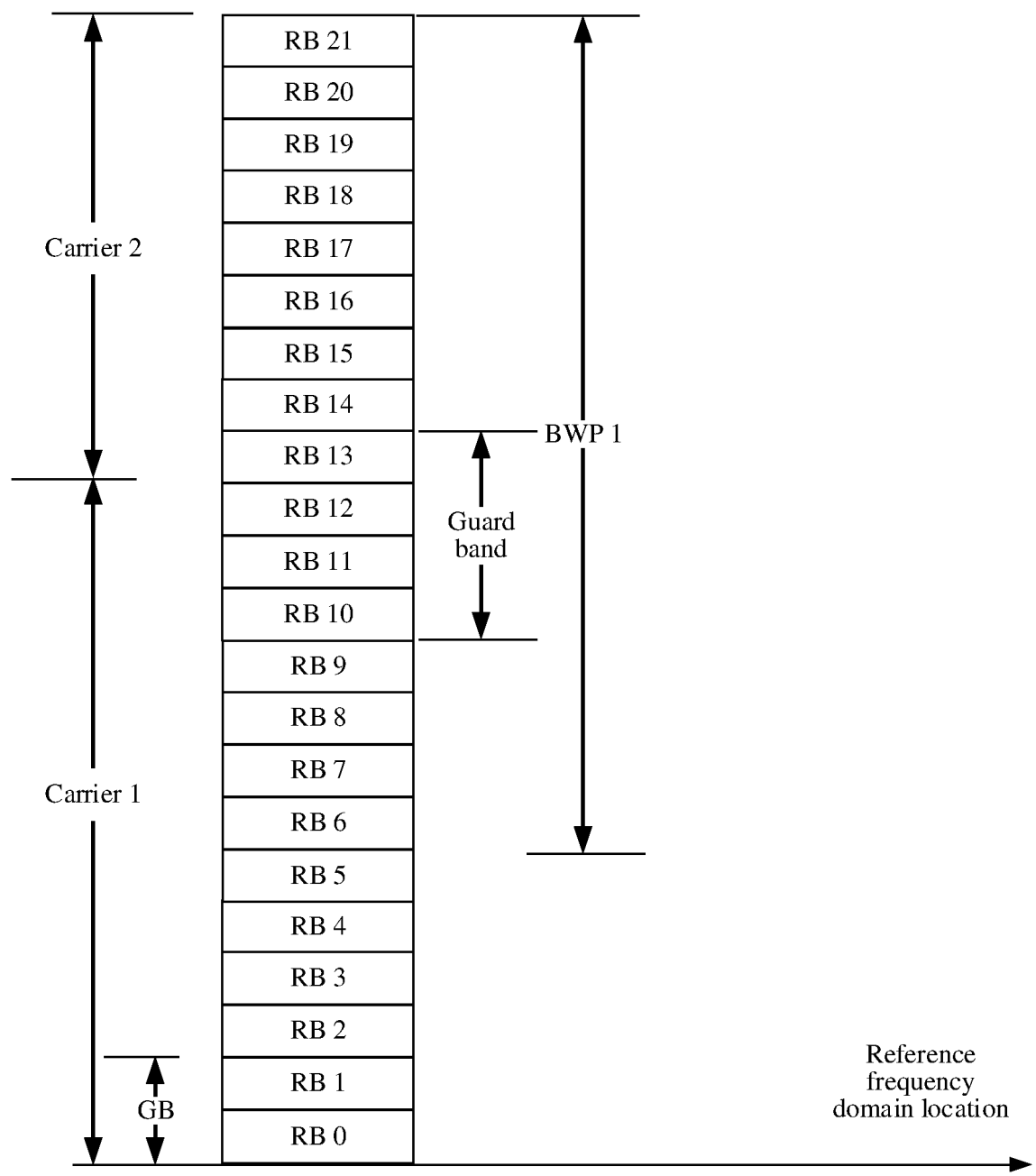

For example, as shown in FIG. 4B, it is assumed that a BWP 1 includes 16 resource blocks, and a fifth resource block to an eighth resource block on the BWP 1 constitute a guard band. The following uses a manner D1 to a manner D5 as examples to describe a manner of determining the configuration information of the guard band relative to the location of the start resource block on the BWP.

Manner D1: The guard band includes one segment of contiguous resource blocks. In this case, the configuration information of the guard band includes an offset of a start resource block on the guard band relative to the start resource block on the BWP and a quantity of resource blocks included in the guard band.

With reference to FIG. 4B, an offset of a start resource block on the guard band on the BWP 1 relative to the start resource block on the BWP is 5. A quantity size of resource blocks included in the guard band is equal to 4. Therefore, it may be indicated that the fifth resource block to the eighth resource block on the BWP 1 constitute the guard band.

According to the foregoing method, when the guard band includes one segment of contiguous resource blocks on the BWP, a relationship between the guard band and the carrier does not need to be considered, and configuration may be performed based on the location of the guard band on the BWP. This effectively reduces signaling overheads.

It should be noted that, in the configuration information of the guard band, the offset of the start resource block on the guard band relative to the start resource block on the BWP may alternatively be replaced with an offset of a center resource block on the guard band relative to a center resource block on the BWP or an offset of an end resource block on the guard band relative to an end resource block on the BWP. Alternatively, the offset of the start resource block on the guard band relative to the start resource block on the BWP may be replaced with an offset of a center resource block on the guard band relative to the start resource block on the BWP or an offset of an end resource block on the guard band relative to the start resource block on the BWP. Alternatively, another manner may be used. A specific setting manner may be set based on an actual requirement. In the manner D1, the offset of the start resource block on the guard band relative to the start resource block on the BWP is merely used as an example for description.

Manner D2: The configuration information of the guard band includes offsets of all resource blocks on the guard band relative to the start resource block on the BWP.

With reference to FIG. 4B, the guard band on the BWP 1 includes four resource blocks (the fifth resource block to the eighth resource block). Therefore, the configuration information of the guard band includes an index #4, an index #5, an index #6, and an index #7. It should be noted that, in this embodiment, a resource block index range on the BWP 1 is [0, 15].

According to the foregoing indication method, the location of the guard band on the BWP may be flexibly indicated, and a relationship between the guard band and the carrier does not need to be considered. Therefore, the guard band is dynamically configured based on an actual deployment status, and does not need to be configured for each carrier. This can reduce configuration complexity, and effectively reduce signaling overheads.

Manner D3: The guard band includes a plurality of segments of contiguous resource blocks. In this case, the guard band may include A guard band resource block sets, resource blocks in each of the A guard band resource block sets are contiguous, and quantities of resource blocks in different guard band resource block sets may be the same or different. When the guard band resource block sets include a same quantity of resource blocks, only one quantity of resource blocks may be indicated for the guard band resource block sets. When the guard band resource block set include different quantities of resource blocks, a quantity of resource blocks needs to be indicated for each guard band resource block set.

In this case, corresponding configuration information of each guard band resource block set may be configured for the guard band. For example, the configuration information of the guard band includes an offset of a start resource block in each of the A guard band resource block sets relative to the start resource block on the BWP and a quantity of resource blocks in each of the A guard band resource block sets, where A is a positive integer.

Figure 4C:
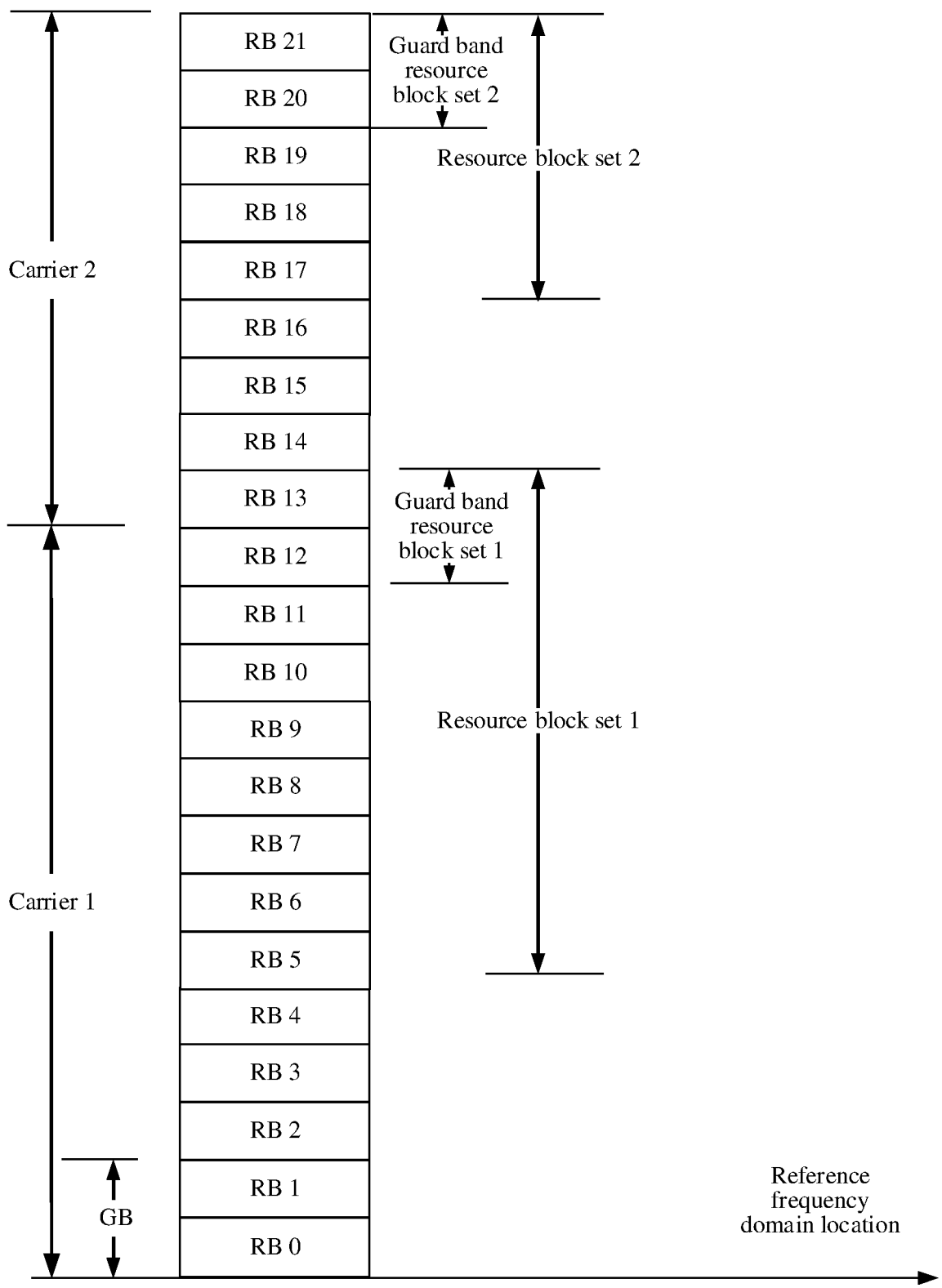

With reference to FIG. 3D, as shown in FIG. 4C, an example in which the guard band on the BWP 1 includes two guard band resource block sets is used. In this case, a guard band resource block set 1 and a guard band resource block set 2 are included. An offset of a start resource block on the guard band resource block set 1 relative to the start resource block on the BWP is an index #8, and a quantity of resource blocks included in the guard band resource block set 1 is 2. An offset of a start resource block on the guard band resource block set 2 relative to the start resource block on the BWP is an index #13, and a quantity of resource blocks included in the guard band resource block set 2 is 2.

Therefore, the configuration information of the guard band may include the index #8 and the quantity 2 of resource blocks that correspond to the guard band resource block set 1, and the index #13 and the quantity 2 of resource blocks that correspond to the guard band resource block set 2.

Considering a scenario in which a guard band resource block set is set during actual resource allocation to avoid interference to another device on a neighboring carrier, in the foregoing indication method, non-contiguous guard bands on the BWP may be indicated based on the guard band resource block set. This improves flexibility of guard band configuration.

It should be noted that, in the configuration information of the guard band, the offset of the start resource block in each of the A guard band resource block sets relative to the start resource block on the BWP may alternatively be replaced with an offset of a center resource block in each of the A guard band resource block sets relative to a center resource block on the BWP or an offset of an end resource block in each of the A guard band resource block sets relative to an end resource block on the BWP. Alternatively, the offset of the start resource block in each of the A guard band resource block sets relative to the start resource block on the BWP may be replaced with an offset of a center resource block in each of the A guard band resource block sets relative to the start resource block on the BWP or an offset of an end resource block in each of the A guard band resource block sets relative to the start resource block on the BWP. Alternatively, another manner may be used. A specific setting manner may be set based on an actual requirement. In the manner D2, the offset of the start resource block in each of the A guard band resource block sets relative to the start resource block on the BWP is merely used as an example for description.

Manner D4: The configuration information of the guard band is a bitmap, and a start bit in the bitmap indicates the start resource block on the BWP.

One bit in the bitmap corresponds to one of all resource blocks on the guard band, and the bit is used to indicate whether the corresponding resource block belongs to the guard band.

For example, if a bit is 1, it indicates that a resource block corresponding to the bit is a resource block on the guard band.

(a) in FIG. 4D shows a bitmap, and each bit is used to indicate whether a resource block (a BWP-RB 0 to a BWP-RB 15) on the BWP 1 belongs to the guard band. BWP-RB i represents an $i^{th}$ resource block on the BWP 1, where i is a positive integer, and a value range of i is [0, 15]. A $16^{th}$ bit is used to indicate whether a $16^{th}$ resource block (a BWP-RB 15) on the BWP 1 belongs to the guard band. As shown in (b) in FIG. 4D, a bitmap corresponding to the guard band on the BWP 1 may be represented as "0000111100000000". That is, it indicates that resource blocks #4, #5, #6, and #7 on the BWP 1 constitute the guard band.

According to the foregoing method, the location of the guard band relative to the BWP can be flexibly configured by using the bitmap. This reduces configuration complexity.

Manner D5: The guard band includes B resource block subsets, each resource block subset includes a plurality of resource blocks, the configuration information of the guard band is a bitmap, and a start bit in the bitmap indicates a start resource block subset on the BWP. One bit in the bitmap corresponds to one of the B resource block subsets, and the bit is used to indicate whether the corresponding resource block subset belongs to the guard band, where B is a positive integer.

For example, if a bit is 1, it indicates that a resource block corresponding to the bit is a resource block subset on the guard band.

(a) in FIG. 4E shows a bitmap, and each bit is used to indicate whether a resource block subset on the BWP 1 belongs to the guard band. For example, the resource block subset includes two resource blocks. A fifth bit is used to indicate whether a sixth resource block subset (a BWP-RB 8 and a BWP-RB 9) including a ninth resource block and a tenth resource block on the BWP 1 belongs to the guard band.

As shown in (b) in FIG. 4D, a bitmap corresponding to the guard band on the BWP 1 may be represented as "00110000". That is, the first two bits are used to indicate that #0 to #3 on the BWP 1 do not belong to the guard band. A third bit is used to indicate that resource blocks #4 and #5 on the BWP 1 belong to the guard band. A fourth bit is used to indicate that resource blocks #6 and #7 on the BWP 1 belong to the guard band. A fifth bit to an eighth bit are used to indicate that resource blocks #8 to #15 on the BWP 1 do not belong to the guard band.

According to the foregoing method, when the BWP and the guard band may be divided into resource block subsets, overheads of the bitmap corresponding to the guard band can be reduced.

Manner E: The location of the guard band on the BWP may be determined based on the reference frequency domain location, so that the configuration information of the guard band is used to indicate a location of the guard band relative to the reference frequency domain location.

In the manner E, both the BWP and the guard band are configured by using the reference frequency domain location, so that a unified configuration manner can be used to reduce configuration complexity. In addition, the network device may indicate the configuration information of the BWP and the configuration information of the guard band in a combined indication manner. This reduces signaling overheads. Certainly, in a specific implementation process, the configuration information of the BWP and the configuration information of the guard band may be separately sent, and a sending manner may be determined based on an actual requirement. This is not limited herein.

FIG. 4B is still used as an example. The BWP 1 includes 16 resource blocks. Based on the reference frequency domain location, the BWP 1 includes 16 resource blocks with resource block indexes RB #6 to RB #21 that are determined based on the reference frequency domain location. A fifth resource block to an eighth resource block on the BWP 1 constitute the guard band. Therefore, it may be determined, based on the reference frequency domain location, that the guard band on the BWP 1 includes the RB #10 to the RB #13.

Manner E1: The guard band includes one segment of contiguous resource blocks. In this case, the configuration information of the guard band includes an offset of a start resource block on the guard band relative to the reference frequency domain location and a quantity of resource blocks included in the guard band.

A location of the start resource block on the guard band relative to the reference frequency domain location may be an RB index that is of the start resource block on the guard band and that is determined based on the reference frequency domain location, and the index is a relative index relative to the reference frequency domain location.

With reference to the example in FIG. 4B, the configuration information of the guard band may include an RB index #10 of the start resource block on the guard band, and a quantity size 4 of resource blocks included in the guard band.

It should be noted that, in the configuration information of the guard band, the offset of the start resource block on the guard band relative to the reference frequency domain location may alternatively be replaced with an offset of a center resource block on the guard band relative to the reference frequency domain location or an offset of an end resource block on the guard band relative to the reference frequency domain location. Alternatively, another manner may be used. A specific setting manner may be set based on an actual requirement. In the manner E1, the offset of the start resource block on the guard band relative to the reference frequency domain location is merely used as an example for description.

Manner E2: RB indexes that are of all resource blocks included in the guard band on the BWP and that are determined based on the reference frequency domain location and may be indicated.

With reference to the example in FIG. 4B, the configuration information of the guard band may include indexes of RBs that are of all resource blocks included in the guard band and that are determined based on the reference frequency domain location: an RB #10, an RB #11, an RB #12, and an RB #13.

Manner E3: The guard band includes A guard band resource block sets, resource blocks in each of the A guard band resource block sets are contiguous, and the configuration information of the guard band includes an offset of a start resource block in each of the A guard band resource block sets relative to the reference frequency domain location and a quantity of resource blocks in each of the A guard band resource block sets, where A is a positive integer.

With reference to FIG. 4C, an example in which the guard band on the BWP 1 includes two guard band resource block sets is used. In this case, a guard band resource block set 1 and a guard band resource block set 2 are included. It may be determined, based on an offset (for example, a value of the offset is 12, indicating an offset of 12 RBs) of a start resource block in the guard band resource block set 1 relative to the reference frequency domain location, that a location of the start resource block in the guard band resource block set 1 is an RB index RB #12, and a quantity of resource blocks included in the guard band resource block set 1 is 2. It may be determined, based on an offset (for example, a value of the offset is 12, indicating an offset of 12 RBs) of a start resource block in the guard band resource block set 2 relative to the reference frequency domain location, that a location of the start resource block in the guard band resource block set 2 is an RB index RB #20, and a quantity of resource blocks included in the guard band resource block set 2 is 2.

Therefore, the configuration information of the guard band may include the start index RB #12 and the quantity 2 of resource blocks that correspond to the guard band resource block set 1, and the RB index RB #20 and the quantity 2 of resource blocks that correspond to the guard band resource block set 2.

It should be noted that, in the configuration information of the guard band, the offset of the start resource block in each of the A guard band resource block sets relative to the reference frequency domain location may alternatively be replaced with an offset of a center resource block in each of the A guard band resource block sets relative to the reference frequency domain location or an offset of an end resource block in each of the A guard band resource block sets relative to the reference frequency domain location. Alternatively, another manner may be used. A specific setting manner may be set based on an actual requirement. In the manner E2, the offset of the start resource block in each of the A guard band resource block sets relative to the reference frequency domain location is merely used as an example for description.

Manner E4: The configuration information of the guard band is a bitmap, where a start bit in the bitmap indicates a resource block corresponding to the reference frequency domain location, one bit in the bitmap corresponds to one of all resource blocks on the guard band, and the bit is used to indicate whether the corresponding resource block belongs to the guard band.

For example, if a bit is 1, it indicates that a resource block corresponding to the bit is a resource block on the guard band. With reference to FIG. 4B, (a) in FIG. 4F shows a resource block corresponding to the BWP 1 based on the reference frequency domain location, and each bit corresponds to one RB on the BWP 1 in FIG. 3B. A first bit in the bitmap is used to indicate whether a first RB relative to the reference frequency domain location on the BWP 1, that is, an RB #0, belongs to the guard band. An $i^{th}$ bit in the bitmap is used to indicate whether an $i^{th}$ RB relative to the reference frequency domain location on the BWP 1, that is, an RB #(i−1), belongs to the guard band. A $16^{th}$ bit is used to indicate whether a $16^{th}$ RB (an RB #15) corresponding to the reference frequency domain location belongs to the guard band. Herein, i may be any bit in the bitmap. A range of i is related to a size of the bitmap. As shown in (b) in FIG. 4F, a bitmap corresponding to the guard band on the BWP 1 may be represented as "0000000000111100000000". That is, it indicates that resource blocks: an RB #10, an RB #11, an RB #12, and an RB #13 on the BWP 1 constitute the guard band.

Manner E5: The configuration information of the guard band is a bitmap, where the guard band includes B resource block subsets, each resource block subset includes a plurality of resource blocks, a start bit in the bitmap indicates a resource block subset corresponding to the reference frequency domain location, each bit in the bitmap corresponds to one of the B resource block subsets, and the bit is used to indicate whether the corresponding resource block subset belongs to the guard band, where B is a positive integer.

For example, if a bit is 1, it indicates that a resource block corresponding to the bit is a resource block subset on the guard band.

With reference to FIG. 4B, (a) in FIG. 4G shows a resource block subset corresponding to the BWP 1 based on the reference frequency domain location, and each bit corresponds to two RBs on the BWP 1 in FIG. 3B. A first bit in the bitmap is used to indicate whether a first RB and a second RB relative to the reference frequency domain location on the BWP 1 belong to the guard band. An $i^{th}$ bit in the bitmap is used to indicate whether a $(2i-2)^{th}$ RB and a $(2i-1)^{th}$ RB relative to the reference frequency domain location on the BWP 1 belong to the guard band. A ninth bit is used to indicate whether a $16^{th}$ RB and a 17th RB corresponding to the reference frequency domain location belong to the guard band. Herein, i may be any bit in the bitmap. A range of i is related to a size of the bitmap.

As shown in (b) in FIG. 4G, a bitmap corresponding to the guard band on the BWP 1 may be represented as "0000011000". The resource block subset includes two resource blocks. That is, the first five bits are used to indicate that an RB #0 to an RB #9 do not belong to the guard band. A sixth bit is used to indicate that resource blocks: an RB #10 and an RB #11 belong to the guard band. A seventh bit is used to indicate that resource blocks: an RB #12 and an RB #13 belong to the guard band. An eighth bit to a tenth bit are used to indicate that resource blocks: an RB #14 and an RB #21 do not belong to the guard band.

According to the foregoing method, when the BWP and the guard band may be divided into resource block subsets, overheads of the bitmap corresponding to the guard band can be reduced.

In this embodiment of this application, BWP configuration is decoupled from carrier configuration. Because one BWP covers all or some resources on one or more carriers, flexible resource scheduling may be performed on the entire BWP, and scheduling does not need to be performed for each carrier. This can reduce scheduling complexity, and effectively reduce signaling overheads.

Further, a configured bandwidth of the carrier may be determined based on a relationship between a physical resource block PRB on the configured bandwidth of the carrier and a common resource block RB determined based on the reference frequency domain location. For a specific determining manner, refer to a configuration manner of the configured bandwidth of the carrier in the conventional technology. Details are not described herein.

The following describes, in a manner F1 and a manner F2, a configuration manner of a relationship that may be set between a physical resource block PRB and a common resource block RB determined based on the reference frequency domain location in this embodiment of this application.

Manner F1: The physical resource block is defined based on the BWP.

Specifically, a physical resource block index range on the BWP is determined based on a quantity of resource blocks on the BWP. Physical resource blocks on an $i^{th}$ BWP are numbered from an index 0, and an index range is $[0, N_{BWP,i}^{size,\mu}-1]$. In this case, $N_{BWP,i}^{size,\mu}$ is a quantity of available resource blocks determined on the $i^{th}$ BWP based on a subcarrier spacing and a bandwidth size.

With reference to FIG. 4B, for example, there are 16 available physical resource blocks on the BWP 1. Therefore, a physical resource block index range on the BWP 1 may be [0, 15].

$$n_{RB}^{\mu}=n_{PRB}^{\mu}+N_{BWP}^{start,\mu}$$

A physical resource block index location is determined by using a resource block index location on the BWP and an RB index location that is determined based on the reference frequency domain location and that is relative to the start resource block on the BWP. In a possible implementation, the physical resource block index location on the BWP satisfies:

$$n_{RB}^{\mu}=n_{PRB}^{\mu}+N_{BWP}^{start,\mu}.$$

Refer to Table 2. There is a correspondence between y and a subcarrier spacing on the BWP, $n_{PRB}^{\mu}$ indicates the physical resource block index location on the BWP, $n_{RB}^{\mu}$ is a common resource block RB index location determined based on the reference frequency domain location, and $N_{BWP}^{start,\mu}$ is a common resource block index that is determined based on the reference frequency domain location and that is relative to the start resource block on the BWP.

Figure 5A:
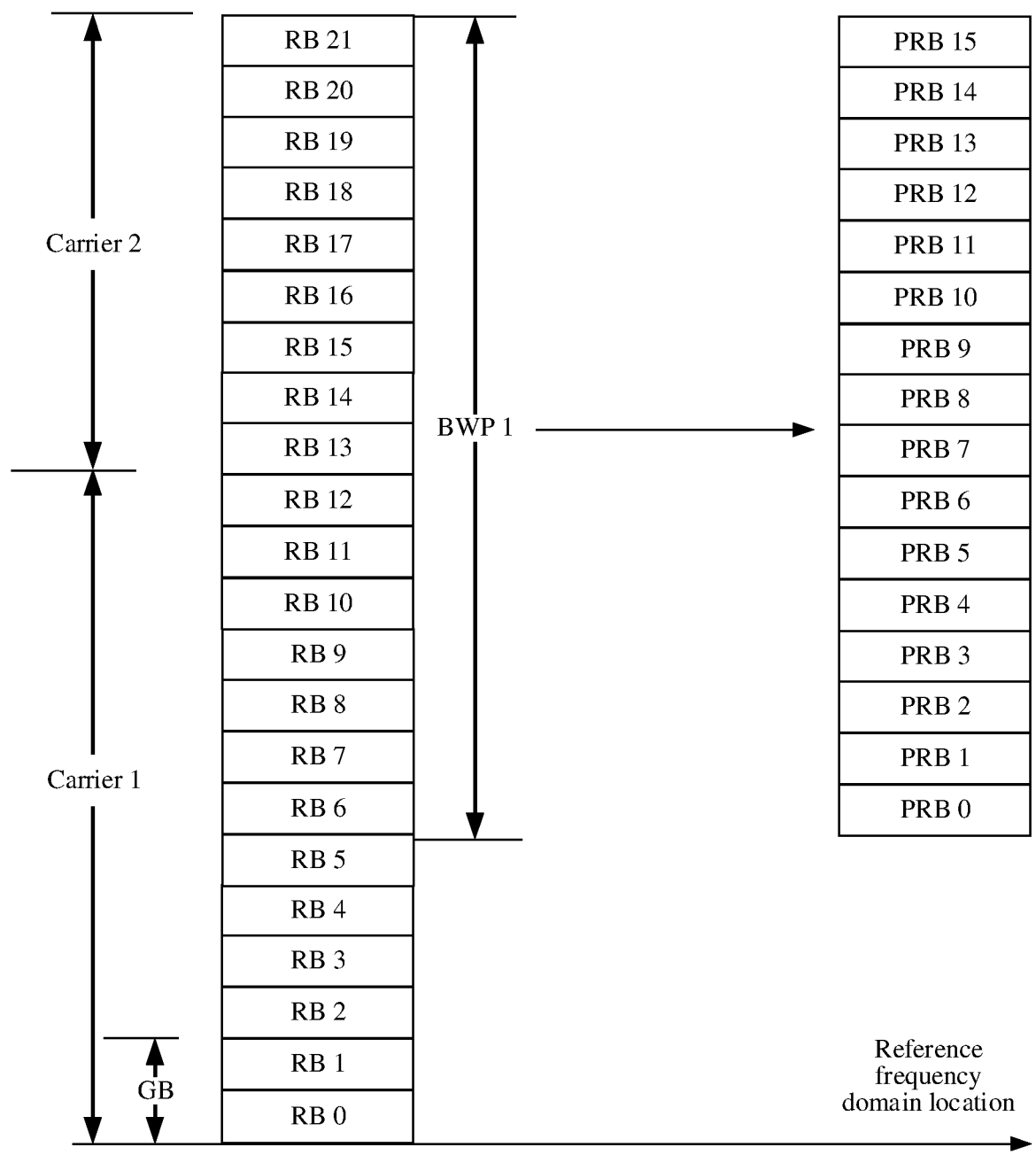
FIG. 5A and FIG. 5B are schematic diagrams of configuring a physical resource block according to an embodiment of this application.

With reference to FIG. 4B, as shown in FIG. 5A, indexes of common resource blocks RBs that are determined based on the reference frequency domain location on the BWP 1 include an RB #6 to an RB #21. $n_{RB}^{\mu}$ may be an RB #0 to the RB #21, and $n_{PRB}^{\mu}$ may be [0, 15]. A first PRB (a PRB #0) corresponds to the RB #6, a second PRB (a PRB #1) corresponds to the RB #7, a third PRB (a PRB #2) corresponds to the RB #8, . . . , and a $16^{th}$ PRB (a PRB #15) corresponds to the RB #21.

According to the foregoing method, the configured bandwidth of the carrier on the BWP and the location of the physical resource block on the carrier may be determined based on the configured BWP, so that the physical resource block can be scheduled, thereby improving applicability of this embodiment of this application.

Manner F2: The physical resource block is defined based on each carrier. In this case, it may be determined that a physical resource block index range is determined based on each carrier. With reference to FIG. 4B, a physical resource block index range on the BWP includes a physical resource block index range on a first carrier and a physical resource block index range on a second carrier, the physical resource block index range on the first carrier is determined based on a quantity of resource blocks on the first carrier, the physical resource block index range on the second carrier is determined based on a quantity of resource blocks on the second carrier, and a frequency domain location of the first carrier is less than a frequency domain location of the second carrier.

For example, the BWP includes two carriers. A physical resource block index range on a first carrier on the BWP is $[0, N_{carrier,1}^{size,\mu}-1]$, and a physical resource block index range on a second carrier on the BWP is $[0, N_{carrier,2}^{size,\mu}-1]$.

$$n_{RB}^{\mu}=n_{PRB}^{\mu}+\max\{N_{BWP}^{start,\mu},N_{carrier,1}^{start,\mu}\}$$

Figure 5B:
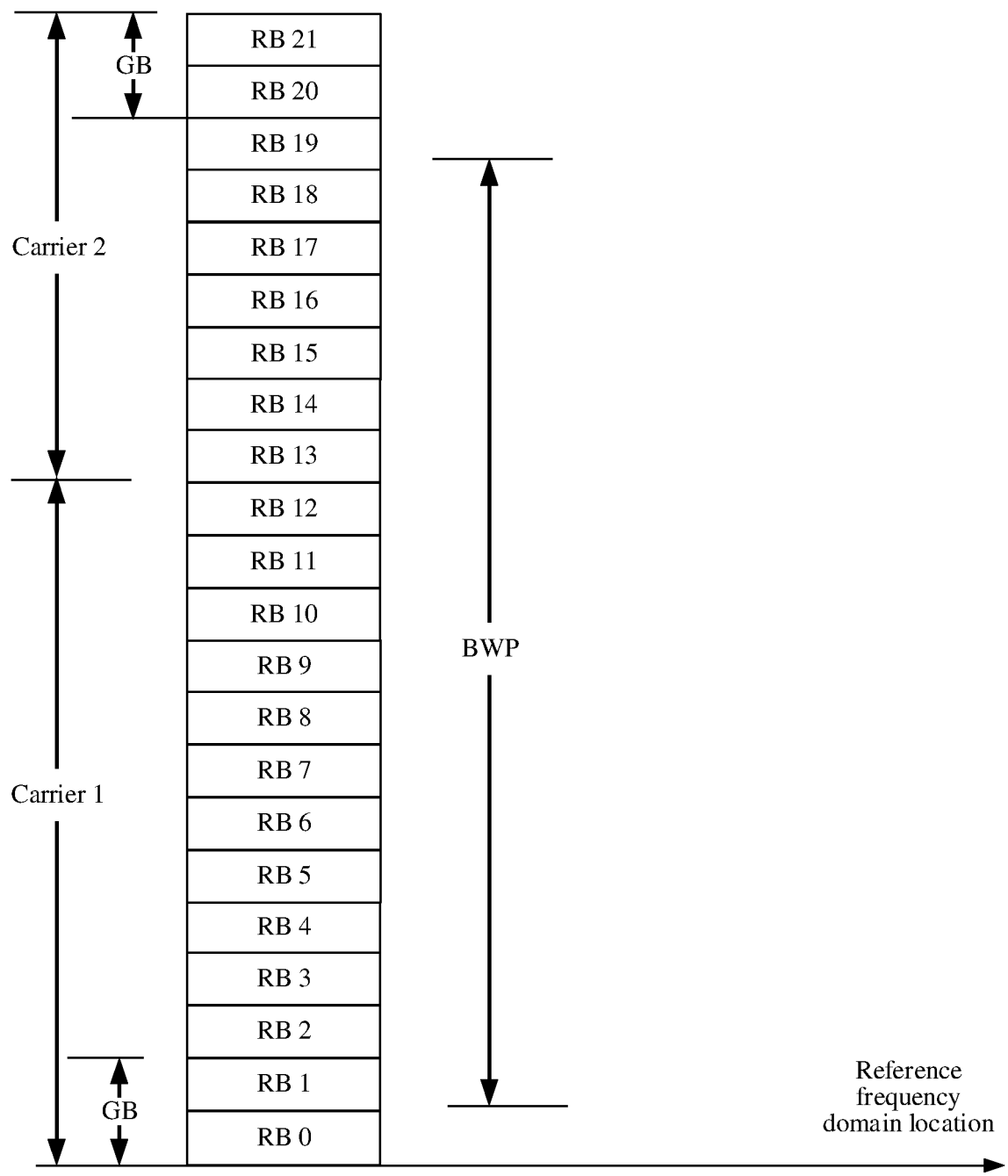

As shown in FIG. 5B, the configured BWP includes some resource blocks on a carrier 1 and a carrier 2. An RB index range included in the BWP obtained through division based on the reference frequency domain location is an RB #1 to an RB #18. The BWP includes the carrier 1 and the carrier 2 that are aggregated. Therefore, the physical resource block on the first carrier in the two carriers that need to be aggregated satisfies:

$$n_{RB}^{\mu}=n_{PRB}^{\mu}+\max\{N_{BWP}^{start,\mu},N_{carrier,1}^{start,\mu}\}.$$

A start resource block on the first carrier (carrier, 1) is closest to the reference frequency domain location. Considering that the start resource block on the BWP falls within the guard band, $N_{BWP,2}^{start,\mu}$ is an RB #1, and $N_{carrier,1}^{start,\mu}$ is an RB #2. Therefore, a larger one of a start resource block index on the carrier and a start resource block index on the BWP needs to be selected to determine an index on the physical resource block on the first carrier.

In this case, the index on the physical resource block on the first carrier (the carrier 1 in FIG. 5B) on the BWP is as follows: A first PRB (a PRB #0) corresponds to an RB #2, a second PRB (a PRB #1) corresponds to an RB #3, a third PRB (a PRB #2) corresponds to an RB #4, . . . , and an $11^{th}$ PRB (a PRB #10) corresponds to an RB #12.

$$\text{carrier}, j n_{RB}{}^{\mu} = n_{PRB}{}^{\mu} + N_{\text{carrier},j}{}^{\text{start},\mu}$$
$$N_{\text{carrier},j}{}^{\text{start},\mu}\text{carrier},j$$

For a carrier ( ) other than the first carrier in the plurality of carriers that need to be aggregated satisfies:

$$\text{carrier}, j n_{RB}{}^{\mu} = n_{PRB}{}^{\mu} + N_{\text{carrier},j}{}^{\text{start},\mu}$$
$$N_{\text{carrier},j}{}^{\text{start},\mu}\text{carrier},j,$$

$$\text{carrier}, j n_{RB}{}^{\mu} = n_{PRB}{}^{\mu} + N_{\text{carrier},j}{}^{\text{start},\mu}$$
$$N_{\text{carrier},j}{}^{\text{start},\mu}\text{carrier},j$$

where is a common resource block RB index that is determined based on the reference frequency domain location and that is relative to the carrier) other than the first carrier.

$$n_{RB}{}^{\mu} = n_{PRB}{}^{\mu} + N_{\text{carrier},2}{}^{\text{start},\mu}$$

For example, the carrier other than the first carrier is the second carrier. A physical resource block index location on the second carrier is determined based on the following locations: a resource block index location on the BWP and a common resource block index location that is determined based on the reference frequency domain location and that is relative to the resource block on the second carrier. For example, the physical resource block index location on the second carrier satisfies:

$$n_{RB}{}^{\mu} = n_{PRB}{}^{\mu} + N_{\text{carrier},2}{}^{\text{start},\mu}.$$

Refer to Table 2. There is a correspondence between y and a subcarrier spacing on the BWP, $n_{PRB}{}^{\mu}$ indicates the physical resource block index location on the second carrier, $n_{RB}{}^{\mu}$ is a common resource block RB index location determined based on the reference frequency domain location, $N_{\text{carrier},2}{}^{\text{start},\mu}$ is a common resource block index that is determined based on the reference frequency domain location and that is relative to a start resource block on the second carrier, and the physical resource block index range on the second carrier is [0, $N_{\text{carrier},2}{}^{\text{size},\mu}-1$], where $N_{\text{carrier},2}{}^{\text{size},\mu}$ indicates a quantity of available resource blocks on the second carrier that is determined based on the subcarrier spacing p and a bandwidth size.

With reference to FIG. 5B, the second carrier is the carrier 2, a quantity of physical resource blocks on the carrier 2 included in the BWP is 6, and a physical resource block index range on the carrier 2 is [0, 5]. On the carrier 2, a first PRB (a PRB #0) corresponds to an RB #13, a second PRB (a PRB #1) corresponds to an RB #14, a third PRB (a PRB #2) corresponds to an RB #15, . . . , and a sixth PRB (a PRB #5) corresponds to an RB #18.

According to the foregoing method, the configured bandwidth of the carrier on the BWP and the location of the physical resource block on the carrier may be determined based on the configured BWP, so as to be compatible with scheduling of the physical resource block on the carrier in the conventional technology, thereby improving applicability of this embodiment of this application.

With reference to the accompanying drawings, the following describes apparatuses configured to implement the foregoing methods in embodiments of this application. Therefore, all the foregoing content may be used in the following embodiments. Repeated content is not described again.

Figure 6:
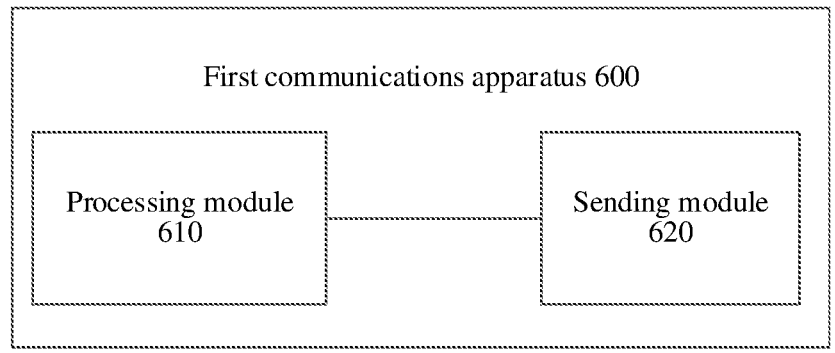
FIG. 6 is a schematic diagram of a structure of a communications apparatus according to an embodiment of this application.

FIG. 6 is a schematic block diagram of a first communications apparatus 600 according to an embodiment of this application.

The first communications apparatus 600 includes a processing module 610 and a sending module 620. For example, the first communications apparatus 600 may be a network device, or may be a chip applied to the network device, or another combined device or component that has a function of the network device. When the first communications apparatus 600 is the network device, the sending module 620 may be a transceiver. The transceiver may include an antenna, a radio frequency circuit, and the like. The processing module 610 may be a processor, for example, a baseband processor, and the baseband processor may include one or more central processing units (CPU). When the first communications apparatus 600 is the component that has the function of the network device, the sending module 620 may be a radio frequency unit, and the processing module 610 may be a processor, for example, a baseband processor. When the first communications apparatus 600 is the chip system, the sending module 620 may be an input/output interface of the chip (for example, a baseband chip), and the processing module 610 may be a processor of the chip system, and may include one or more central processing units. It should be understood that, in this embodiment of this application, the processing module 610 may be implemented by a processor or a processor-related circuit component, and the sending module 620 may be implemented by a transceiver or a transceiver-related circuit component.

For example, the processing module 610 may be configured to perform all operations, other than receiving and sending operations, performed by the network device in the embodiment shown in FIG. 3A or FIG. 4A, for example, an operation such as determining configuration information of a BWP, or determining configuration information of a guard band, and/or another process used to support the technology described in this specification. The sending module 620 may be configured to perform all receiving and sending operations performed by the network device in the embodiment shown in FIG. 3A or FIG. 4A, and/or another process used to support the technology described in this specification.

In addition, the sending module 620 may be one function module, and the function module can complete both a sending operation and a receiving operation. For example, the sending module 620 may be configured to perform all sending operations and receiving operations performed by the network device in the embodiment shown in FIG. 3A or FIG. 4A. For example, when performing a sending operation, the sending module 620 may be considered as a sending module, and when performing a receiving operation, the sending module 620 may be considered as a receiving module. Alternatively, the sending module 620 may be two function modules. The sending module 620 may be considered as a general term of the two function modules. The two function modules are a sending module and a receiving module. The sending module is configured to complete a sending operation. For example, the sending module may be configured to perform all sending operations performed by the network device in the embodiment shown in FIG. 3A or FIG. 4A. The receiving module is configured to complete a receiving operation. For example, the receiving module may be configured to perform all receiving operations performed by the network device in the embodiment shown in FIG. 3A or FIG. 4A.

The processing module 610 is configured to determine configuration information of a bandwidth part BWP, where the BWP includes at least one resource block, the at least one resource block is located on at least one carrier, location information of different carriers in a system is determined based on a reference frequency domain location, and the configuration information of the BWP is used to indicate a location of the at least one resource block based on the reference frequency domain location. The sending module 620 is configured to send the configuration information of the BWP.

In a possible implementation, the at least one resource block is contiguous, and the configuration information of the BWP includes an offset of a start resource block on the BWP relative to the reference frequency domain location and a quantity of the at least one resource block.

In a possible implementation, the BWP includes N resource block sets, resource blocks in each of the N resource block sets are contiguous, and the configuration information of the BWP includes an offset of a start resource block in each of the N resource block sets relative to the reference frequency domain location and a quantity of resource blocks in each of the N resource block sets, where N is a positive integer.

In a possible implementation, the configuration information of the BWP is a bitmap, where a start bit in the bitmap indicates a resource block corresponding to the reference frequency domain location, each bit in the bitmap corresponds to one of the at least one resource block, and the bit is used to indicate whether the corresponding resource block belongs to the BWP; or the BWP includes M resource block subsets, each resource block subset includes a plurality of resource blocks, a start bit in the bitmap indicates a resource block subset corresponding to the reference frequency domain location, one bit in the bitmap corresponds to one of the M resource block subsets, and the bit is used to indicate whether the corresponding resource block subset belongs to the BWP, where M is a positive integer.

In a possible implementation, the configuration information of the BWP further includes an offset of a start resource block on the at least one carrier relative to the reference frequency domain location.

In a possible implementation, the method further includes: sending carrier configuration information, where the carrier configuration information includes an offset of a start resource block on the at least one carrier relative to the reference frequency domain location.

In another possible embodiment, the processing module 610 is configured to determine configuration information of a guard band. The sending module 620 is configured to send the configuration information of the guard band. The guard band is located on a bandwidth part BWP, the BWP includes at least one resource block, the at least one resource block is located on at least one carrier, and location information of different carriers in a system is determined based on a reference frequency domain location. The configuration information of the guard band is used to indicate a location of the guard band on the BWP.

In a possible implementation, the configuration information of the guard band is used to indicate a location of the guard band relative to a start resource block on the BWP.

In a possible implementation, resource blocks included in the guard band are contiguous, and the configuration information of the guard band includes an offset of a start resource block on the guard band relative to the start resource block on the BWP and a quantity of resource blocks included in the guard band.

In a possible implementation, the configuration information of the guard band includes offsets of all resource blocks on the guard band relative to the start resource block on the BWP.

In a possible implementation, the guard band includes A guard band resource block sets, resource blocks in each of the A guard band resource block sets are contiguous, and the configuration information of the guard band includes an offset of a start resource block in each of the A guard band resource block sets relative to the start resource block on the BWP and a quantity of resource blocks in each of the A guard band resource block sets, where A is a positive integer.

In a possible implementation, the configuration information of the guard band is a bitmap, and a start bit in the bitmap indicates the start resource block on the BWP, where one bit in the bitmap corresponds to one of all resource blocks on the guard band, and the bit is used to indicate whether the corresponding resource block belongs to the guard band.

In a possible implementation, the configuration information of the guard band is a bitmap, where the guard band includes B resource block subsets, each resource block subset includes a plurality of resource blocks, each bit in the bitmap corresponds to one of the B resource block subsets, and the bit is used to indicate whether the corresponding resource block subset belongs to the guard band, where B is a positive integer.

In a possible implementation, the configuration information of the guard band is used to indicate a location of the guard band relative to the reference frequency domain location.

In a possible implementation, resource blocks included in the guard band are contiguous, and the configuration information of the guard band includes a location of a start resource block on the guard band relative to the reference frequency domain location and a quantity of resource blocks included in the guard band.

In a possible implementation, the configuration information of the guard band includes locations of all resource blocks on the guard band relative to the reference frequency domain location.

In a possible implementation, the guard band includes A guard band resource block sets, and resource blocks in each of the A guard band resource block sets are contiguous; and the configuration information of the guard band includes an offset of a start resource block in each of the A contiguous guard band resource block sets relative to the start resource block on the BWP and a quantity of resource blocks in each of the A guard band resource block sets, where A is a positive integer.

In a possible implementation, the configuration information of the guard band is a bitmap, where a start bit in the bitmap indicates a resource block corresponding to the reference frequency domain location, one bit in the bitmap corresponds to one of all resource blocks on the guard band, and the bit is used to indicate whether the corresponding resource block belongs to the guard band.

In a possible implementation, the configuration information of the guard band is a bitmap, where the guard band includes B resource block subsets, each resource block subset includes a plurality of resource blocks, a start bit in the bitmap indicates a resource block subset corresponding to the reference frequency domain location, each bit in the bitmap corresponds to one of the B resource block subsets, and the bit is used to indicate whether the corresponding resource block subset belongs to the guard band, where B is a positive integer.

In a possible implementation, a physical resource block index range on the BWP is determined based on a quantity of resource blocks on the BWP; and a physical resource block index location is determined by using a resource block index location on the BWP and the resource block on the BWP based on the reference frequency domain location.

$$n_{RB}^\mu = n_{PRB}^\mu + N_{BWP}^{start,\mu} \mu n_{PRB}^\mu n_{RB}^\mu$$
$$N_{BWP}^{start,\mu} N_{BWP}^{size,\mu} - 1 N_{BWP}^{size,\mu}$$

In a possible implementation, the physical resource block index location satisfies:

$$n_{RB}^\mu = n_{PRB}^\mu + N_{BWP}^{start,\mu} \mu n_{PRB}^\mu n_{RB}^\mu$$
$$N_{BWP}^{start,\mu} N_{BWP}^{size,\mu} - 1 N_{BWP}^{size,\mu},$$

$$n_{RB}^\mu = n_{PRB}^\mu + N_{BWP}^{start,\mu} \mu n_{PRB}^\mu n_{RB}^\mu$$
$$N_{BWP}^{start,\mu} N_{BWP}^{size,\mu} - 1 N_{BWP}^{size,\mu}$$

where there is a correspondence between and a subcarrier spacing on the BWP, indicates the physical resource block index location on the BWP, is a common resource block RB index location determined based on the reference frequency domain location, is a common resource block index that is determined based on the reference frequency domain location and that is relative to the start resource block on the BWP, and the physical resource block index range on the BWP is [0,], where indicates a quantity of available resource blocks on the BWP that is determined based on the subcarrier spacing and a bandwidth size.

In a possible implementation, the at least one carrier includes a first carrier and a second carrier, where a physical resource block index range on the BWP includes a physical resource block index range on the first carrier and a physical resource block index range on the second carrier, the physical resource block index range on the first carrier is determined based on a quantity of resource blocks on the first carrier, the physical resource block index range on the second carrier is determined based on a quantity of resource blocks on the second carrier, and a frequency domain location of the first carrier is less than a frequency domain location of the second carrier; a physical resource block index location on the first carrier is determined based on the following locations: a resource block index location on the BWP; and a common resource block index location that is determined based on the reference frequency domain location and that is relative to the resource block on the BWP or a common resource block index location that is determined based on the reference frequency domain location and that is relative to the resource block on the first carrier; and a physical resource block index location on the second carrier is determined based on the following locations: the resource block index location on the BWP and a common resource block index location that is determined based on the reference frequency domain location and that is relative to the resource block on the second carrier.

$$n_{RB}^\mu = n_{PRB}^\mu + \max\{N_{BWP}^{start,\mu},$$
$$N_{carrier,1}^{start,\mu}\} \mu n_{PRB}^\mu n_{RB}^\mu N_{BWP}^{start,\mu}$$
$$N_{carrier,1}^{start,\mu}\{ \} N_{carrier,1}^{size,\mu} - 1 N_{carrier,1}^{size,\mu}$$

In a possible implementation, the physical resource block index location on the first carrier satisfies:

$$n_{RB}^\mu = n_{PRB}^\mu + \max\{N_{BWP}^{start,\mu},$$
$$N_{carrier,1}^{start,\mu}\} \mu n_{PRB}^\mu n_{RB}^\mu N_{BWP}^{start,\mu}$$
$$N_{carrier,1}^{start,\mu}\{ \} N_{carrier,1}^{size,\mu} - 1 N_{carrier,1}^{size,\mu},$$

$$n_{RB}^\mu = n_{PRB}^\mu + \max\{N_{BWP}^{start,\mu},$$
$$N_{carrier,1}^{start,\mu}\} \mu n_{PRB}^\mu n_{RB}^\mu N_{BWP}^{start,\mu}$$
$$N_{carrier,1}^{start,\mu}\{ \}$$
$$N_{carrier,1}^{size,\mu} - 1 N_{carrier,1}^{size,\mu}$$

where there is a correspondence between and a subcarrier spacing on the BWP, indicates the physical resource block index location on the first carrier, is a common resource block RB index location determined based on the reference frequency domain location, is a common resource block index that is determined based on the reference frequency domain location and that is relative to the start resource block on the BWP, is a common resource block index that is determined based on the reference frequency domain location and that is relative to a start resource block on the first carrier, max indicates that a maximum value is taken, and the physical resource block index range on the first carrier is [0,], where indicates a quantity of available resource blocks on the first carrier that is determined based on the subcarrier spacing and a bandwidth size.

$$n_{RB}^\mu = n_{PRB}^\mu + \max\{N_{BWP}^{start,\mu},$$
$$N_{carrier,2}^{start,\mu}\} \mu n_{PRB}^\mu n_{RB}^\mu N_{BWP}^{start,\mu}$$
$$N_{carrier,2}^{start,\mu}\{ \} N_{carrier,2}^{size,\mu} - 1 N_{carrier,2}^{size,\mu}$$

In a possible implementation, the physical resource block index location on the second carrier satisfies:

$$n_{RB}^\mu = n_{PRB}^\mu + \max\{N_{BWP}^{start,\mu},$$
$$N_{carrier,2}^{start,\mu}\} \mu n_{PRB}^\mu n_{RB}^\mu N_{BWP}^{start,\mu}$$
$$N_{carrier,2}^{start,\mu}\{ \} N_{carrier,2}^{size,\mu} - 1 N_{carrier,2}^{size,\mu},$$

$$n_{RB}^\mu = n_{PRB}^\mu + \max\{N_{BWP}^{start,\mu},$$
$$N_{carrier,2}^{start,\mu}\} \mu n_{PRB}^\mu n_{RB}^\mu N_{BWP}^{start,\mu}$$
$$N_{carrier,2}^{start,\mu}\{ \} N_{carrier,2}^{size,\mu} - 1 N_{carrier,2}^{size,\mu}$$

where there is a correspondence between and a subcarrier spacing on the BWP, indicates the physical resource block index location on the second carrier, is a common resource block RB index location determined based on the reference frequency domain location, is a common resource block index that is determined based on the reference frequency domain location and that is relative to a start resource block on the second carrier, and the physical resource block index range on the second carrier is [0,], where indicates a quantity of available resource blocks on the second carrier that is determined based on the subcarrier spacing and a bandwidth size.

Figure 7:
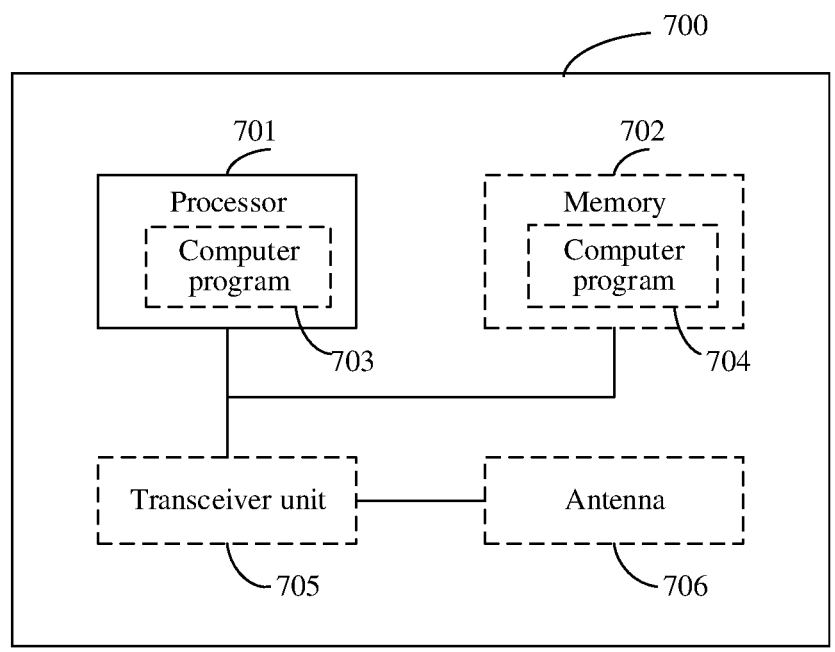
FIG. 7 is a schematic diagram of a structure of a communications apparatus according to an embodiment of this application.

Based on a same concept as the foregoing communications method, as shown in FIG. 7, an embodiment of this application further provides a communications apparatus 700. The communications apparatus 700 may be configured to implement the method performed by the network device in the foregoing method embodiments. For details, refer to the description in the foregoing method embodiments. The communications apparatus 700 may be a network device, or may be located in the network device, or may be a transmitting end device.

The communications apparatus 700 includes one or more processors 701. The processor 701 may be a general-purpose processor, a dedicated processor, or the like. For example, the processor 701 may be a baseband processor or a central processing unit. The baseband processor may be configured to process a communications protocol and communications data. The central processing unit may be configured to control the communications apparatus (for example, a network device or a chip) to execute a software program and process data of the software program. The communications apparatus 700 may include a transceiver unit, configured to input (receive) and output (send) a signal. For example, the transceiver unit may be a transceiver or a radio frequency chip.

The communications apparatus 700 includes one or more processors 701, and the one or more processors 701 may implement the method performed by the network device in the foregoing embodiments.

Optionally, in addition to the method in the foregoing embodiments, the processor 701 may further implement another function. Optionally, in an implementation, the processor 701 may execute a computer program, so that the communications apparatus 700 performs the method performed by the network device in the foregoing method embodiments. All or a part of the computer program may be stored in the processor 701, for example, a computer program 703, or all or a part of the computer program may be stored in a memory 702 coupled to the processor 701, for example, a computer program 704. Alternatively, both the computer program 703 and the computer program 704 enable the communications apparatus 700 to perform the method performed by the network device in the foregoing method embodiments.

In another possible implementation, the communications apparatus 700 may alternatively include a circuit, and the circuit may implement a function performed by the network device in the foregoing method embodiments.

In another possible implementation, the communications apparatus 700 may include one or more memories 702. The memory 702 stores a computer program 704. The computer program may be run on a processor, so that the communications apparatus 700 performs the communications method described in the foregoing method embodiments. Optionally, the memory may further store data. Optionally, the processor may alternatively store a computer program and/or data. For example, the one or more memories 702 may store the association or correspondence described in the foregoing embodiments, or the related parameter or table provided in the foregoing embodiments. The processor and the memory may be separately disposed, or may be integrated with or coupled to each other.

In another possible implementation, the communications apparatus 700 may further include a transceiver unit 705. The processor 701 may be referred to as a processing unit, and controls the communications apparatus (a network device). The transceiver unit 705 may be referred to as a transceiver machine, a transceiver circuit, a transceiver, or the like, and is configured to receive and send data or control signaling.

For example, if the communications apparatus 700 is a chip applied to the communications device or another combined device or component that has a function of the communications device, the communications apparatus 700 may include the transceiver unit 705.

In another possible implementation, the communications apparatus 700 may further include a transceiver unit 705 and an antenna 706. The processor 701 may be referred to as a processing unit, and controls the communications apparatus (a network device). The transceiver unit 705 may be referred to as a transceiver machine, a transceiver circuit, a transceiver, or the like, and is configured to implement a transceiver function of the apparatus by using the antenna 706.

Figure 8:
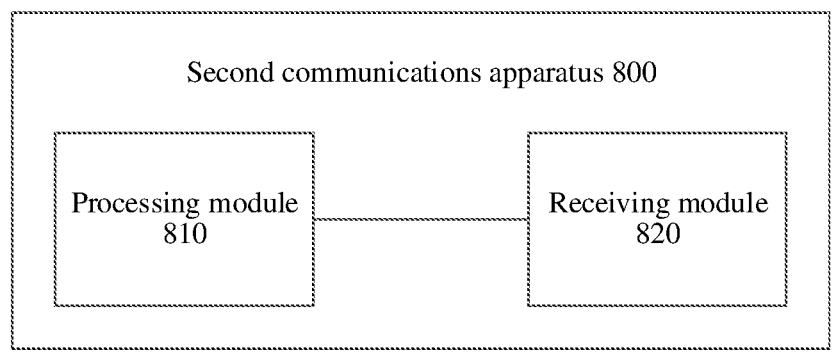
FIG. 8 is a schematic diagram of a structure of a communications apparatus according to an embodiment of this application.

FIG. 8 is a schematic block diagram of a second communications apparatus 800 according to an embodiment of this application.

The second communications apparatus 800 includes a processing module 810 and a receiving module 820. For example, the second communications apparatus 800 may be a receiving end device. For example, the second communications apparatus 800 may be a terminal device, or may be a chip applied to the terminal device, or another combined device or component that has a function of the terminal device. When the second communications apparatus 800 is the terminal device, the receiving module 820 may be a transceiver. The transceiver may include an antenna, a radio frequency circuit, and the like. The processing module 810 may be a processor, for example, a baseband processor, and the baseband processor may include one or more CPUs. When the second communications apparatus 800 is the component that has the function of the terminal device, the receiving module 820 may be a radio frequency unit, and the processing module 810 may be a processor, for example, a baseband processor. When the second communications apparatus 800 is the chip system, the receiving module 820 may be an input/output interface of the chip (for example, a baseband chip), and the processing module 810 may be a processor of the chip system, and may include one or more central processing units. It should be understood that, in this embodiment of this application, the processing module 810 may be implemented by a processor or a processor-related circuit component, and the receiving module 820 may be implemented by a transceiver or a transceiver-related circuit component.

For example, the processing module 810 may be configured to perform all operations, other than receiving and sending operations, performed by the terminal device in the embodiment shown in FIG. 3A or FIG. 4A, for example, step 303 or step 403, and/or another process used to support the technology described in this specification. The receiving module 820 may be configured to perform all receiving and sending operations performed by the terminal device in the embodiment shown in FIG. 3A or FIG. 4A, and/or another process used to support the technology described in this specification.

The receiving module 820 may be one function module, and the function module can complete both a sending operation and a receiving operation. For example, the receiving module 820 may be configured to perform all sending operations and receiving operations performed by the terminal device in the embodiment shown in FIG. 3A or FIG. 4A. For example, when performing a sending operation, the receiving module 820 may be considered as a sending module, and when performing a receiving operation, the receiving module 820 may be considered as a receiving module. Alternatively, the receiving module 820 may be two function modules. The receiving module 820 may be considered as a general term of the two function modules. The two function modules are a sending module and a receiving module. The sending module is configured to complete a sending operation. For example, the sending module may be configured to perform all sending operations performed by the terminal device in the embodiment shown in FIG. 3A or FIG. 4A. The receiving module is configured to complete a receiving operation. For example, the receiving module may be configured to perform all receiving operations performed by the terminal device in the embodiment shown in FIG. 3A or FIG. 4A.

The receiving module 820 is configured to receive configuration information of a bandwidth part BWP, and the processing module 810 determines the configuration information of the BWP. The BWP includes at least one resource block, the at least one resource block is located on at least one carrier, location information of different carriers in a system is determined based on a reference frequency domain location, and the configuration information of the BWP is used to indicate a location of the at least one resource block based on the reference frequency domain location.

In a possible implementation, the at least one resource block is contiguous, and the configuration information of the BWP includes an offset of a start resource block on the BWP relative to the reference frequency domain location and a quantity of the at least one resource block.

In a possible implementation, the BWP includes N resource block sets, resource blocks in each of the N resource block sets are contiguous, and the configuration information of the BWP includes an offset of a start resource block in each of the N resource block sets relative to the reference frequency domain location and a quantity of resource blocks in each of the N resource block sets, where N is a positive integer.

In a possible implementation, the configuration information of the BWP is a bitmap, where a start bit in the bitmap indicates a resource block corresponding to the reference frequency domain location, each bit in the bitmap corresponds to one of the at least one resource block, and the bit is used to indicate whether the corresponding resource block belongs to the BWP.

In a possible implementation, the configuration information of the BWP is a bitmap, where the BWP includes M resource block subsets, each resource block subset includes a plurality of resource blocks, a start bit in the bitmap indicates a resource block subset corresponding to the reference frequency domain location, one bit in the bitmap corresponds to one of the M resource block subsets, and the bit is used to indicate whether the corresponding resource block subset belongs to the BWP, where M is a positive integer.

In a possible implementation, the configuration information of the BWP further includes an offset of a start resource block on the at least one carrier relative to the reference frequency domain location.

In a possible implementation, the method further includes: receiving carrier configuration information, where the carrier configuration information includes an offset of a start resource block on the at least one carrier relative to the reference frequency domain location.

In another possible embodiment, the receiving module 820 is configured to receive configuration information of a guard band, and the processing module 810 is configured to determine the configuration information of the guard band. The guard band is located on a bandwidth part BWP, the BWP includes at least one resource block, the at least one resource block is located on at least one carrier, and location information of different carriers in a system is determined based on a reference frequency domain location. The configuration information of the guard band is used to indicate a location of the guard band on the BWP.

In a possible implementation, the configuration information of the guard band is used to indicate a location of the guard band relative to a start resource block on the BWP.

In a possible implementation, resource blocks included in the guard band are contiguous, and the configuration information of the guard band includes an offset of a start resource block on the guard band relative to the start resource block on the BWP and a quantity of resource blocks included in the guard band.

In a possible implementation, the configuration information of the guard band includes offsets of all resource blocks on the guard band relative to the start resource block on the BWP.

In a possible implementation, the guard band includes A guard band resource block sets, resource blocks in each of the A guard band resource block sets are contiguous, and the configuration information of the guard band includes an offset of a start resource block in each of the A guard band resource block sets relative to the start resource block on the BWP and a quantity of resource blocks in each of the A guard band resource block sets, where A is a positive integer.

In a possible implementation, the configuration information of the guard band is a bitmap, and a start bit in the bitmap indicates the start resource block on the BWP, where one bit in the bitmap corresponds to one of all resource blocks on the guard band, and the bit is used to indicate whether the corresponding resource block belongs to the guard band; or the guard band includes B resource block subsets, each resource block subset includes a plurality of resource blocks, each bit in the bitmap corresponds to one of the B resource block subsets, and the bit is used to indicate whether the corresponding resource block subset belongs to the guard band, where B is a positive integer.

In a possible implementation, the configuration information of the guard band is used to indicate a location of the guard band relative to the reference frequency domain location.

In a possible implementation, resource blocks included in the guard band are contiguous, and the configuration information of the guard band includes a location of a start resource block on the guard band relative to the reference frequency domain location and a quantity of resource blocks included in the guard band.

In a possible implementation, the configuration information of the guard band includes locations of all resource blocks on the guard band relative to the reference frequency domain location.

In a possible implementation, the guard band includes A guard band resource block sets, and resource blocks in each of the A guard band resource block sets are contiguous; and the configuration information of the guard band includes an offset of a start resource block in each of the A contiguous guard band resource block sets relative to the start resource block on the BWP and a quantity of resource blocks in each of the A guard band resource block sets, where A is a positive integer.

In a possible implementation, the configuration information of the guard band is a bitmap, where a start bit in the bitmap indicates a resource block corresponding to the reference frequency domain location, one bit in the bitmap corresponds to one of all resource blocks on the guard band, and the bit is used to indicate whether the corresponding resource block belongs to the guard band.

In a possible implementation, the configuration information of the guard band is a bitmap, where the guard band includes B resource block subsets, each resource block subset includes a plurality of resource blocks, a start bit in the bitmap indicates a resource block subset corresponding to the reference frequency domain location, each bit in the bitmap corresponds to one of the B resource block subsets, and the bit is used to indicate whether the corresponding resource block subset belongs to the guard band, where B is a positive integer.

In a possible implementation, a physical resource block index range on the BWP is determined based on a quantity of resource blocks on the BWP; and a physical resource block index location is determined by using a resource block index location on the BWP and the resource block on the BWP based on the reference frequency domain location.

$$n_{RB}^\mu = n_{PRB}^\mu + N_{BWP}^{start,\mu} \mu n_{PRB}^\mu n_{RB}^\mu$$
$$N_{BWP}^{start,\mu} N_{BWP}^{size,\mu} - 1 N_{BWP}^{size,\mu}$$

In a possible implementation, the physical resource block index location satisfies:

$$n_{RB}^\mu = n_{PRB}^\mu + N_{BWP}^{start,\mu} \mu n_{PRB}^\mu n_{RB}^\mu$$
$$N_{BWP}^{start,\mu} N_{BWP}^{size,\mu} - 1 N_{BWP}^{size,\mu},$$

$$n_{RB}^\mu = n_{PRB}^\mu + N_{BWP}^{start,\mu} \mu n_{PRB}^\mu n_{RB}^\mu$$
$$N_{BWP}^{start,\mu} N_{BWP}^{size,\mu} - 1 N_{BWP}^{size,\mu}$$

where there is a correspondence between and a subcarrier spacing on the BWP, indicates the physical resource block index location on the BWP, is a common resource block RB index location determined based on the reference frequency domain location, is a common resource block index that is determined based on the reference frequency domain location and that is relative to the start resource block on the BWP, and the physical resource block index range on the BWP is [0,], where indicates a quantity of available resource blocks on the BWP that is determined based on the subcarrier spacing and a bandwidth size.

In a possible implementation, the at least one carrier includes a first carrier and a second carrier, where a physical resource block index range on the BWP includes a physical resource block index range on the first carrier and a physical resource block index range on the second carrier, the physical resource block index range on the first carrier is determined based on a quantity of resource blocks on the first carrier, the physical resource block index range on the second carrier is determined based on a quantity of resource blocks on the second carrier, and a frequency domain location of the first carrier is less than a frequency domain location of the second carrier; a physical resource block index location on the first carrier is determined based on the following locations: a resource block index location on the BWP; and a common resource block index location that is determined based on the reference frequency domain location and that is relative to the resource block on the BWP or a common resource block index location that is determined based on the reference frequency domain location and that is relative to the resource block on the first carrier; and a physical resource block index location on the second carrier is determined based on the following locations: the resource block index location on the BWP and a common resource block index location that is determined based on the reference frequency domain location and that is relative to the resource block on the second carrier.

$$n_{RB}^{\mu}=n_{PRB}^{\mu}+\max\{N_{BWP}^{start,\mu},\\ N_{carrier,1}^{start,\mu}\}\mu n_{PRB}^{\mu}n_{RB}^{\mu}N_{BWP}^{start,\mu}\\ N_{carrier,1}^{start,\mu}\{\ \}N_{carrier,1}^{size,\mu}-1N_{carrier,1}^{size,\mu}$$

In a possible implementation, the physical resource block index location on the first carrier satisfies:

$$n_{RB}^{\mu}=n_{PRB}^{\mu}+\max\{N_{BWP}^{start,\mu},\\ N_{carrier,1}^{start,\mu}\}\mu n_{PRB}^{\mu}n_{RB}^{\mu}N_{BWP}^{start,\mu}\\ N_{carrier,1}^{start,\mu}\{\ \}N_{carrier,1}^{size,\mu}-1N_{carrier,1}^{size,\mu},$$

$$n_{RB}^{\mu}=n_{PRB}^{\mu}+\max\{N_{BWP}^{start,\mu},\\ N_{carrier,1}^{start,\mu}\}\mu n_{PRB}^{\mu}n_{RB}^{\mu}N_{BWP}^{start,\mu}\\ N_{carrier,1}^{start,\mu}\{\ \}N_{carrier,1}^{size,\mu}-1N_{carrier,1}^{size,\mu}$$

where there is a correspondence between and a subcarrier spacing on the BWP, indicates the physical resource block index location on the first carrier, is a common resource block RB index location determined based on the reference frequency domain location, is a common resource block index that is determined based on the reference frequency domain location and that is relative to the start resource block on the BWP, is a common resource block index that is determined based on the reference frequency domain location and that is relative to a start resource block on the first carrier, max indicates that a maximum value is taken, and the physical resource block index range on the first carrier is [0,], where indicates a quantity of available resource blocks on the first carrier that is determined based on the subcarrier spacing and a bandwidth size.

$$n_{RB}^{\mu}=n_{PRB}^{\mu}+\max\{N_{BWP}^{start,\mu},\\ N_{carrier,2}^{start,\mu}\}\mu n_{PRB}^{\mu}n_{RB}^{\mu}N_{BWP}^{start,\mu}\\ N_{carrier,2}^{start,\mu}\{\ \}N_{carrier,2}^{size,\mu}-1N_{carrier,2}^{size,\mu}$$

In a possible implementation, the physical resource block index location on the second carrier satisfies:

$$n_{RB}^{\mu}=n_{PRB}^{\mu}+\max\{N_{BWP}^{start,\mu},\\ N_{carrier,2}^{start,\mu}\}\mu n_{PRB}^{\mu}n_{RB}^{\mu}N_{BWP}^{start,\mu}\\ N_{carrier,2}^{start,\mu}\{\ \}N_{carrier,2}^{size,\mu}-1N_{carrier,2}^{size,\mu},$$

$$n_{RB}^{\mu}=n_{PRB}^{\mu}+\max\{N_{BWP}^{start,\mu},\\ N_{carrier,2}^{start,\mu}\}\mu n_{PRB}^{\mu}n_{RB}^{\mu}N_{BWP}^{start,\mu}\\ N_{carrier,2}^{start,\mu}\{\ \}N_{carrier,2}^{size,\mu}-1N_{carrier,2}^{size,\mu}$$

where there is a correspondence between and a subcarrier spacing on the BWP, indicates the physical resource block index location on the second carrier, is a common resource block RB index location determined based on the reference frequency domain location, is a common resource block index that is determined based on the reference frequency domain location and that is relative to a start resource block on the second carrier, and the physical resource block index range on the second carrier is [0,], where indicates a quantity of available resource blocks on the second carrier that is determined based on the subcarrier spacing and a bandwidth size.

Figure 9:
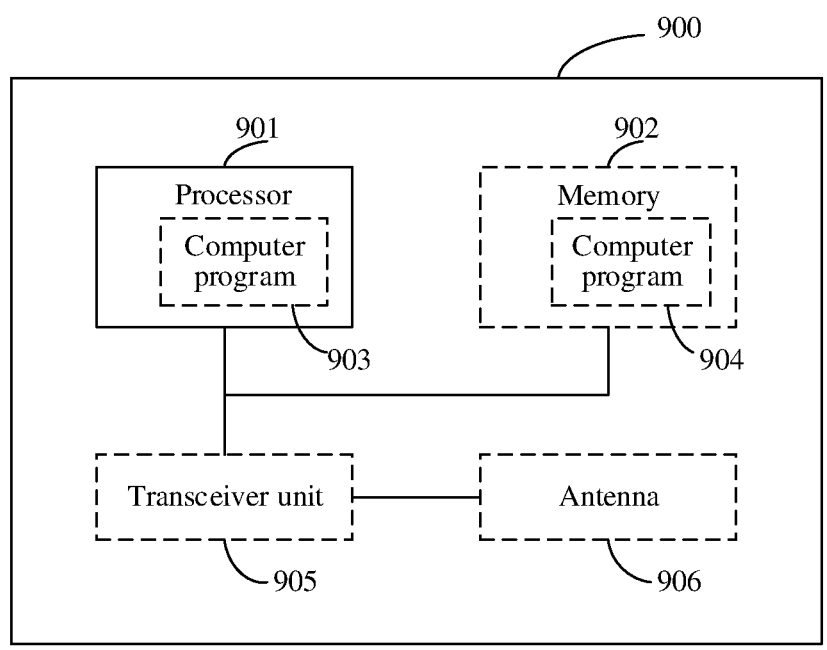
FIG. 9 is a schematic diagram of a structure of a communications apparatus according to an embodiment of this application.

Based on a same concept as the foregoing communications method, as shown in FIG. 9, an embodiment of this application further provides a communications apparatus 900. The communications apparatus 900 may be configured to implement the method performed by the terminal device in the foregoing method embodiments. For details, refer to the description in the foregoing method embodiments. The communications apparatus 900 may be a terminal device or a vehicle-mounted device, or may be located in the terminal device or the vehicle-mounted device, or may be a transmitting end device.

The communications apparatus 900 includes one or more processors 901. The processor 901 may be a general-purpose processor, a dedicated processor, or the like. For example, the processor 901 may be a baseband processor or a central processing unit. The baseband processor may be configured to process a communications protocol and communications data. The central processing unit may be configured to control the communications apparatus (for example, a terminal device, a vehicle-mounted device, or a chip) to execute a software program and process data of the software program. The communications apparatus 900 may include a transceiver unit, configured to input (receive) and output (send) a signal. For example, the transceiver unit may be a transceiver or a radio frequency chip.

The communications apparatus 900 includes one or more processors 901, and the one or more processors 901 may implement the method performed by the terminal device in the foregoing embodiments.

Optionally, in addition to the method in the foregoing embodiments, the processor 901 may further implement another function. Optionally, in an implementation, the processor 901 may execute a computer program, so that the communications apparatus 900 performs the method performed by the terminal device in the foregoing method embodiments. All or a part of the computer program may be stored in the processor 901, for example, a computer program 903, or all or a part of the computer program may be stored in a memory 902 coupled to the processor 901, for example, a computer program 904. Alternatively, both the computer program 903 and the computer program 904 enable the communications apparatus 900 to perform the method performed by the terminal device in the foregoing method embodiments.

In another possible implementation, the communications apparatus 900 may alternatively include a circuit, and the circuit may implement a function performed by the terminal device in the foregoing method embodiments.

In another possible implementation, the communications apparatus 900 may include one or more memories 902. The memory 902 stores a computer program 904. The computer program may be run on a processor, so that the communications apparatus 900 performs the communications method described in the foregoing method embodiments. Optionally, the memory may further store data. Optionally, the processor may alternatively store a computer program and/or data. For example, the one or more memories 902 may store the association or correspondence described in the foregoing embodiments, or the related parameter or table provided in the foregoing embodiments. The processor and the memory may be separately disposed, or may be integrated with or coupled to each other.

In another possible implementation, the communications apparatus 900 may further include a transceiver unit 905. The processor 901 may be referred to as a processing unit, and controls the communications apparatus (a terminal device). The transceiver unit 905 may be referred to as a transceiver machine, a transceiver circuit, a transceiver, or the like, and is configured to receive and send data or control signaling.

For example, if the communications apparatus 900 is a chip applied to the communications device or another combined device or component that has a function of the communications device, the communications apparatus 900 may include the transceiver unit 905.

In another possible implementation, the communications apparatus 900 may further include a transceiver unit 905 and an antenna 906. The processor 901 may be referred to as a processing unit, and controls the communications apparatus (a terminal device). The transceiver unit 905 may be referred to as a transceiver machine, a transceiver circuit, a transceiver, or the like, and is configured to implement a transceiver function of the apparatus by using the antenna 906.

It should be noted that, the processor in embodiments of this application may be an integrated circuit chip, and has a signal processing capability. In an implementation process, steps in the foregoing method embodiments may be implemented by using an integrated logic circuit of hardware in the processor, or by using a computer program in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware in a decoding processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), which is used as an external cache. By way of example but not of limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

An embodiment of this application further provides a computer-readable storage medium. The computer-readable storage medium stores a computer program. When the computer program is executed by a computer, the method in any method embodiment applied to the first communications apparatus or the second communications apparatus is implemented.

An embodiment of this application further provides a computer program product. When the computer program product is executed by a computer, the method in any method embodiment applied to the first communications apparatus or the second communications apparatus is implemented.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs. When the computer programs are loaded and executed on a computer, all or some of the procedure or functions according to embodiments of this application are generated. The computer may be a general-purpose computer, a dedicated computer, a computer network, or other programmable apparatuses. The computer programs may be stored in a computer-readable storage medium or may be transmitted from a computer-readable storage medium to another computer-readable storage medium. For example, the computer programs may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

An embodiment of this application further provides a communications apparatus, including a processor and an interface. The processor is configured to perform the method in any method embodiment applied to the network device or the terminal device.

It should be understood that the foregoing processing apparatus may be a chip, and the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

An embodiment of this application provides a communications system. The communications system may include the network device and the terminal device in the embodiment shown in FIG. 3A or FIG. 4A. The network device is, for example, the first communications apparatus 600 in FIG. 6 or the first communications apparatus 700 in FIG. 7, and the terminal device is, for example, the second communications apparatus 800 in FIG. 8 or the second communications apparatus 900 in FIG. 9.

An embodiment of this application further provides a computer-readable storage medium. The computer-readable storage medium stores a computer program. When the computer program is executed by a computer, the computer may implement a procedure related to the network device or the terminal device provided in the embodiment shown in FIG. 3A or FIG. 4A in the foregoing method embodiments.

An embodiment of this application further provides a computer program product. The computer program product is used to store a computer program. When the computer program is executed by a computer, the computer may implement a procedure related to the network device or the terminal device provided in the embodiment shown in FIG. 3A or FIG. 4A in the foregoing method embodiments.

The terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit items that are included. For example, if at least one of A, B, and C is included, A, B, C, A and B, A and C, B and C, or A, B, and C may be included. Alternatively, "configuring at least one" means configuring one, two, or more. For example, "configuring at least one BWP" may be understood as configuring one BWP, configuring two BWPs, or configuring more BWPs. Similarly, understanding of the description such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects. For example, a first BWP and a second BWP are merely intended to distinguish between different BWPs, but are not intended to limit priorities or importance of the two BWPs.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communications method, comprising:
determining configuration information of a bandwidth part (BWP), wherein the BWP comprises at least one resource block, the at least one resource block is located on at least one carrier, location information of different carriers in a system is determined based on a reference frequency domain location, and the configuration information of the BWP indicates a location of the at least one resource block based on the reference frequency domain location; and
sending the configuration information of the BWP, wherein the configuration information of the BWP is a bitmap, and wherein at least one of:

a start bit in the bitmap indicates a resource block corresponding to the reference frequency domain location, each bit in the bitmap corresponds to one of the at least one resource block, and each bit in the bitmap indicates whether the corresponding resource block belongs to the BWP; or the BWP comprises M resource block subsets, each resource block subset comprises a plurality of resource blocks, a start bit in the bitmap indicates a resource block subset corresponding to the reference frequency domain location, one bit in the bitmap corresponds to one of the M resource block subsets, the one bit in the bitmap indicates whether the corresponding resource block subset belongs to the BWP, and M is a positive integer.

2. The method according to claim 1, wherein the at least one resource block is contiguous, and the configuration information of the BWP comprises an offset of a start resource block on the BWP relative to the reference frequency domain location and a quantity of the at least one resource block.

3. The method according to claim 1, wherein the BWP comprises N resource block sets, resource blocks in each of the N resource block sets are contiguous, and the configuration information of the BWP comprises an offset of a start resource block in the resource block set relative to the reference frequency domain location and a quantity of resource blocks in each of the N resource block sets, wherein N is a positive integer.

4. The method according to claim 1, wherein the configuration information of the BWP further comprises:
an offset of a start resource block on the at least one carrier relative to the reference frequency domain location.

5. The method according to claim 1, wherein the method further comprises:
sending carrier configuration information, wherein the carrier configuration information comprises an offset of a start resource block on the at least one carrier relative to the reference frequency domain location.

6. The method according to claim 1, wherein the method is performed by a network device.

7. A communications method, comprising:
receiving configuration information of a bandwidth part (BWP), wherein the BWP comprises at least one resource block, the at least one resource block is located on at least one carrier, location information of different carriers in a system is determined based on a reference frequency domain location, and the configuration information of the BWP indicates a location of the at least one resource block based on the reference frequency domain location; and determining the configuration information of the BWP, wherein the configuration information of the BWP is a bitmap, and wherein at least one of:
a start bit in the bitmap indicates a resource block corresponding to the reference frequency domain location, each bit in the bitmap corresponds to one of the at least one resource block, and each bit in the bitmap indicates whether the corresponding resource block belongs to the BWP; or the BWP comprises M resource block subsets, each resource block subset comprises a plurality of resource blocks, a start bit in the bitmap indicates a resource block subset corresponding to the reference frequency domain location, one bit in the bitmap corresponds to one of the M resource block subsets, the bit in the bitmap indicates whether the corresponding resource block subset belongs to the BWP, and M is a positive integer.

8. The method according to claim 7, wherein the at least one resource block is contiguous, and the configuration information of the BWP comprises an offset of a start resource block on the BWP relative to the reference frequency domain location and a quantity of the at least one resource block.

9. The method according to claim 7, wherein the BWP comprises N resource block sets, resource blocks in each of the N resource block sets are contiguous, the configuration information of the BWP comprises an offset of a start resource block in the resource block set relative to the reference frequency domain location and a quantity of resource blocks in each of the N resource block sets, and N is a positive integer.

10. The method according to claim 7, wherein the configuration information of the BWP further comprises:
an offset of a start resource block on the at least one carrier relative to the reference frequency domain location.

11. The method according to claim 7, wherein the method further comprises:
receiving carrier configuration information, wherein the carrier configuration information comprises an offset of a start resource block on the at least one carrier relative to the reference frequency domain location.

12. The method according to claim 7, wherein the method is performed by a terminal device.

13. A communications apparatus, comprising:
at least one processor; and
a non-transitory computer-readable storage medium storing a program to be executed by the at least one processor, the program including instructions to:
receive configuration information of a bandwidth part (BWP), wherein the BWP comprises at least one resource block, the at least one resource block is located on at least one carrier, location information of different carriers in a system is determined based on a reference frequency domain location, and the configuration information of the BWP indicates a location of the at least one resource block based on the reference frequency domain location; and
determine the configuration information of the BWP,
wherein the configuration information of the BWP is a bitmap, and wherein at least one of:
a start bit in the bitmap indicates a resource block corresponding to the reference frequency domain location, each bit in the bitmap corresponds to one of the at least one resource block, and each bit in the bitmap indicates whether the corresponding resource block belongs to the BWP; or the BWP comprises M resource block subsets, each resource block subset comprises a plurality of resource blocks, a start bit in the bitmap indicates a resource block subset corresponding to the reference frequency domain location, one bit in the bitmap corresponds to one of the M resource block subsets, the bit in the bitmap indicates whether the corresponding resource block subset belongs to the BWP, and M is a positive integer.

14. The apparatus according to claim 13, wherein the at least one resource block is contiguous, and the configuration information of the BWP comprises an offset of a start resource block on the BWP relative to the reference frequency domain location and a quantity of the at least one resource block.

15. The apparatus according to claim 13, wherein the BWP comprises N resource block sets, resource blocks in each of the N resource block sets are contiguous, the configuration information of the BWP comprises an offset of a start resource block in the resource block set relative to the reference frequency domain location and a quantity of resource blocks in each of the N resource block sets, and N is a positive integer.

16. The apparatus according to claim 13, wherein the configuration information of the BWP further comprises:
   an offset of a start resource block on the at least one carrier relative to the reference frequency domain location.

17. The apparatus according to claim 13, wherein the instructions further comprise instructions to:
   receive carrier configuration information, wherein the carrier configuration information comprises an offset of a start resource block on the at least one carrier relative to the reference frequency domain location.

18. The apparatus according to claim 13, wherein the apparatus is a network device.

* * * * *